US011758499B2

(12) United States Patent
Ryu et al.

(10) Patent No.: US 11,758,499 B2
(45) Date of Patent: Sep. 12, 2023

(54) SESSION MANAGEMENT FOR AERIAL SYSTEM

(71) Applicant: Ofinno, LLC, Reston, VA (US)

(72) Inventors: Jinsook Ryu, Oakton, VA (US); Esmael Hejazi Dinan, McLean, VA (US); Kyungmin Park, Vienna, VA (US); Peyman Talebi Fard, Vienna, VA (US); Taehun Kim, Fairfax, VA (US); Weihua Qiao, Herndon, VA (US)

(73) Assignee: Ofinno, LLC, Reston, VA (US)

( * ) Notice: Subject to any disclaimer, the term of this patent is extended or adjusted under 35 U.S.C. 154(b) by 0 days.

(21) Appl. No.: 17/722,555

(22) Filed: Apr. 18, 2022

(65) Prior Publication Data
US 2022/0248363 A1   Aug. 4, 2022

Related U.S. Application Data

(63) Continuation of application No. PCT/US2021/052955, filed on Sep. 30, 2021.

(60) Provisional application No. 63/086,572, filed on Oct. 1, 2020.

(51) Int. Cl.
*H04W 12/06* (2021.01)
*H04W 8/08* (2009.01)
*H04W 60/04* (2009.01)
*H04W 76/18* (2018.01)
*H04W 12/72* (2021.01)
(Continued)

(52) U.S. Cl.
CPC .......... *H04W 60/04* (2013.01); *H04W 12/06* (2013.01); *H04W 12/72* (2021.01); *H04W 60/06* (2013.01); *H04W 76/18* (2018.02); *H04W 84/06* (2013.01)

(58) Field of Classification Search
None
See application file for complete search history.

(56) References Cited

U.S. PATENT DOCUMENTS

2019/0379530 A1* 12/2019 Suthar ................. H04L 12/14
2020/0196146 A1*  6/2020 Chen ................... H04W 8/08
2020/0336901 A1* 10/2020 Zhu .................... H04W 12/63
(Continued)

FOREIGN PATENT DOCUMENTS

WO    2021/163463 A1    8/2021

OTHER PUBLICATIONS

3GPP TS 22.125 V16.2.0 (Jun. 2019); Technical Specification; 3rd Generation Partnership Project; Technical Specification Group Services and System Aspects; Unmanned Aerial System (UAS) support in 3GPP; Stage 1; Release 16.
(Continued)

*Primary Examiner* — Gary Lafontant
(74) *Attorney, Agent, or Firm* — Peter Flanagan; Kavon Nasabzadeh; Philip R. Smith

(57) ABSTRACT

An access and mobility management function (AMF) receives, from a wireless device, a registration request message for the wireless device. The AMF performs an authentication and/or authorization procedure for an aerial service of the wireless device. The AMF receives, from the wireless device, a request to establish a session associated with the aerial service. The AMF sends, to a session management (SMF), based on the request to establish the session, a message indicating whether the aerial service of the wireless device is authenticated and/or authorized.

21 Claims, 26 Drawing Sheets

(51) Int. Cl.
*H04W 60/06* (2009.01)
*H04W 84/06* (2009.01)

(56) References Cited

U.S. PATENT DOCUMENTS

2021/0076202 A1* 3/2021 Park .................... H04W 12/08
2021/0168584 A1* 6/2021 Li ........................ H04W 28/16
2021/0368342 A1* 11/2021 Zhu ...................... H04W 12/71

OTHER PUBLICATIONS

3GPP TS 22.125 V17.1.0 (Dec. 2019); Technical Specification; 3rd Generation Partnership Project; Technical Specification Group Services and System Aspects; Unmanned Aerial System (UAS) support in 3GPP; Stage 1; Release 17.

3GPP TR 22.825 V16.0.0 (Sep. 2018); Technical Report; 3rd Generation Partnership Project; Technical Specification Group Services and System Aspects; Remote Identification of Unmanned Aerial Systems; Stage 1; (Release 16).

3GPP TR 22.829 V17.1.0 (Sep. 2019); Technical Report; 3rd Generation Partnership Project; Technical Specification Group Services and System Aspects; Enhancement for Unmanned Aerial Vehicles; Stage 1; (Release 17).

3GPP TS 23.401 V16.7.0 (Jul. 2020); Technical Specification; 3rd Generation Partnership Project; Technical Specification Group Services and System Aspects; General Packet Radio Service (GPRS) enhancements for Evolved Universal Terrestrial Radio Access Network; (E-UTRAN) access; (Release 16).

3GPP TS 23.501 V16.5.0 (Jul. 2020); Technical Specification; 3rd Generation Partnership Project; Technical Specification Group Services and System Aspects; System architecture for the 5G System (5GS); Stage 2; (Release 16).

3GPP TS 23.502 V16.5.0 (Jul. 2020); Technical Specification; 3rd Generation Partnership Project; Technical Specification Group Services and System Aspects; Procedures for the 5G System (5GS); Stage 2; (Release 16).

3GPP TS 24.301 V16.5.1 (Jul. 2020); Technical Specification; 3rd Generation Partnership Project; Technical Specification Group Core Network and Terminals; Non-Access-Stratum (NAS) protocol for Evolved Packet System (EPS); Stage 3; (Release 16).

3GPP TS 24.501 V16.5.1 (Jul. 2020); Technical Specification; 3rd Generation Partnership Project; Technical Specification Group Core Network and Terminals; Non-Access-Stratum (NAS) protocol for 5G System (5GS); Stage 3; (Release 16).

3GPP TS 29.274 V16.4.0 (Jun. 2020); Technical Specification; 3rd Generation Partnership Project; Technical Specification Group Core Network and Terminals; 3GPP Evolved Packet System (EPS); Evolved General Packet Radio Service (GPRS); Tunnelling Protocol for Control plane (GTPv2-C); Stage 3; (Release 16).

C4-100878; Revision from C4-100452; 3GPP TSG CT4 Meeting #48; San Francisco, USA; Feb. 22-26, 2010; CR-Form-v9.6; Change Request; 29.274 CR 0550; rev 1; Current version: 9.1.0.

3GPP TR 36.777 V15.0.0 (Dec. 2017); Technical Report; 3rd Generation Partnership Project; Technical Specification Group Radio Access Network; Study on Enhanced LTE Support for Aerial Vehicles; (Release 15).

3GPP TR 23.754 V0.3.0 (2020-096); Technical Report; 3rd Generation Partnership Project; Technical Specification Group Services and System Aspects; Study on supporting Unmanned Aerial Systems (UAS) connectivity, Identification and tracking; (Release 17).

3GPP TR 23.754 V0.1.1 (Jan. 2020); Technical Report; 3rd Generation Partnership Project; Technical Specification Group Services and System Aspects; Study on supporting Unmanned Aerial Systems (UAS) connectivity, Identification and tracking; (Release 17).

S2-2004086; SA WG2 Temporary Document; SA WG2 Meeting #139E; Jun. 1-Jun. 12, 2020; Source: Samsung; Title: KI #2, New Sol: Network Assisted Flight Path Authorization; Document for: Approval; Agenda Item: 8.7; Work Item / Release: FS_ID_UAS-SA2/ Rel-17.

S2-2006531; SA WG2 Meeting #140E; Aug. 19-Sep. 1, 2020, Electronic, Elbonia; Source: Qualcomm Incorporated, Futurewei, Lenovo, Motorola Mobility, Interdigital, Huawei, Oppo; Title: KI#1, KI#2, KI#3, KI#7, Sol. 5: Update to eliminate editor's notes, clarify additional aspects, and merge in other solutions; Document for: Approval; Agenda Item: 8.7; Work Item / Release: FS_ID_UAS / Rel-17.

S2-2006542; SA WG2 Meeting #140E; Aug. 19-Sep. 1, 2020, Electronic, Elbonia; Source: Qualcomm Incorporated, Interdigital; Title: FS_ID_UAS: Way forward for Various Open Issues; Document for: Approval; Agenda Item: 8.7; Work Item / Release: FS_ID_UAS / Rel-17.

SP-181114; (S2-1813341); TSG SA Meeting #SP-82; Dec. 12-14, 2018, Sorrento, Italy; Source: SA WG2; Title: Study on supporting Unmanned Aerial Systems Connectivity, Identification, and Tracking; Document for: Approval; Agenda Item: 19.

SP-181252 (was SP-181237/SP-181140); 3GPP TSG-SA Meeting #82; Sorrento, ITALY, Dec. 12-14, 2018; Source: SA6; Title: New SID Study on application layer support for UAS service; Document for: Approval; Agenda Item: 19.

International Search Report and Written Opinion of the International Searching Authority dated Mar. 14, 2022 in International Application No. PCT/US2021/052955.

3GPP TR 23.754 V0.2.0 (Jun. 2020); Technical Report; 3rd Generation Partnership Project; Technical Specification Group Services and System Aspects; Study on supporting Unmanned Aerial Systems (UAS) connectivity, Identification and tracking; (Release 17).

Tomaszewski et al.; On 5G Support of Cross-Border UAV Operations; 2020 IEEE International Conference on Communications Workshops (ICC Workshops); IEEE; Jun. 7, 2020 (Jun. 7, 2020).

S3-202416; 3GPP TSG-SA3 Meeting #100-bis-e; e-meeting, Oct. 12-16, 2020; Source: InterDigital; Title: Solution for UAV authentication and authorization using EAP-based PDU secondary authentication; Document for: Approval; Agenda Item: 2.7.

3GPP TR 23.754 V1.0.0 (Sep. 2020); Technical Report; 3rd Generation Partnership Project; Technical Specification Group Services and System Aspects; Study on supporting Unmanned Aerial Systems (UAS) connectivity, Identification and tracking; (Release 17).

Office Action, dated Jun. 24, 2022, in EP Patent Application No. 21806491.3.

* cited by examiner

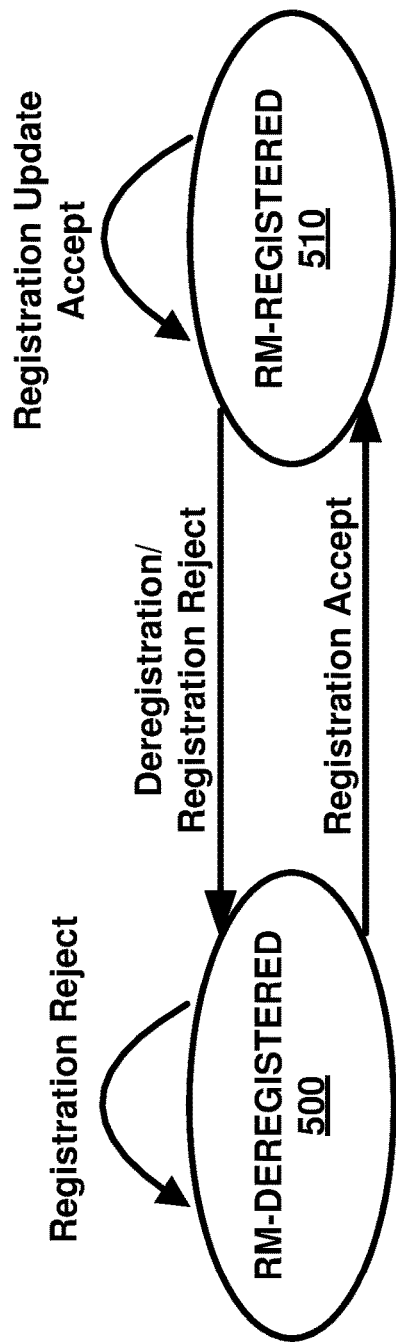
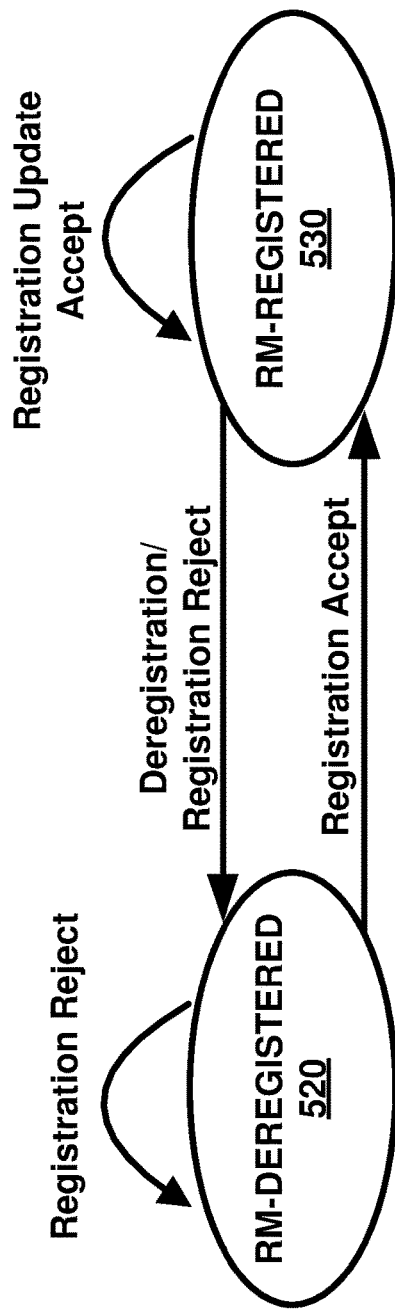
FIG. 5A
FIG. 5B

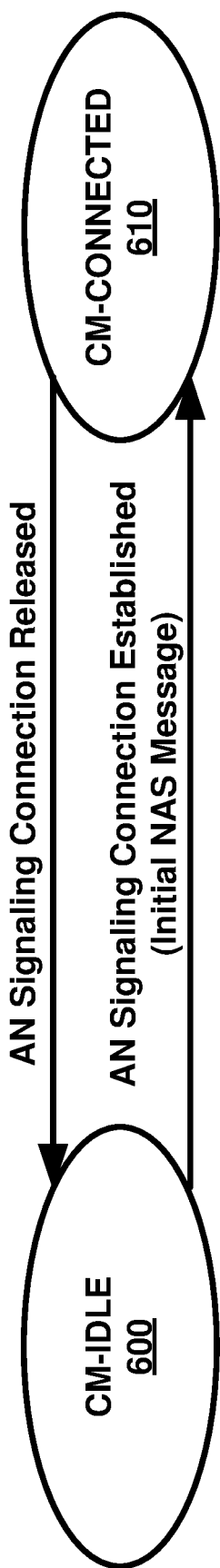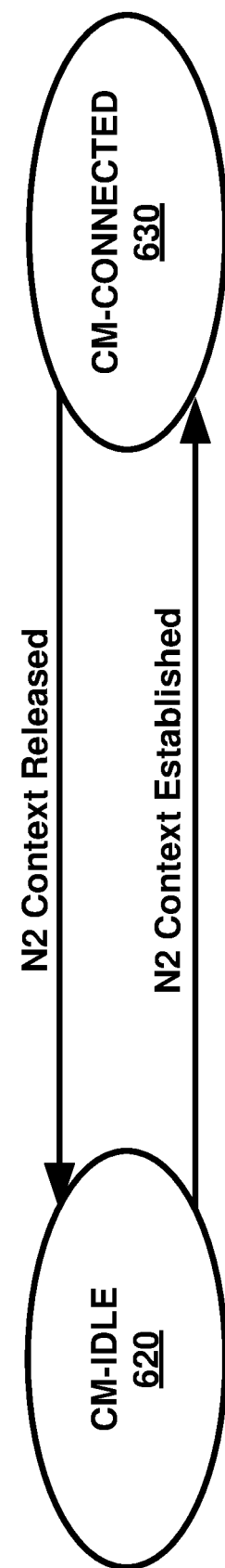

SESSION MANAGEMENT FOR AERIAL SYSTEM

CROSS-REFERENCE TO RELATED APPLICATIONS

This application is a continuation of International Application No. PCT/US2021/052955, filed Sep. 30, 2021, which claims the benefit of U.S. Provisional Application No. 63/086,572, filed Oct. 1, 2020, all of which are hereby incorporated by reference in their entirety.

BRIEF DESCRIPTION OF THE SEVERAL VIEWS OF THE DRAWINGS

Examples of several of the various embodiments of the present invention are described herein with reference to the drawings.

FIG. 5A and FIG. 5B depict two registration management state models in UE 100 and AMF 155 as per an aspect of embodiments of the present disclosure.

FIG. 6A and FIG. 6B depict two connection management state models in UE 100 and AMF 155 as per an aspect of embodiments of the present disclosure.

DETAILED DESCRIPTION OF EXAMPLES

Example embodiments of the present invention enable implementation of enhanced features and functionalities in 4G/5G systems. Embodiments of the technology disclosed herein may be employed in the technical field of 4G/5G systems and network slicing for communication systems. More particularly, the embodiments of the technology disclosed herein may relate to 5G core network and 5G systems for network slicing in communication systems. Throughout the present disclosure, UE, wireless device, terminal, and mobile device are used interchangeably. Throughout the present disclosure, base station, (Radio) Access Network ((R)AN), Next Generation Radio Access Network (NG-RAN), New radio Node B (gNB), Next Generation eNodeB (ng-eNBs) are used interchangeably. Throughout the present disclosure, base station, Radio Access Network (RAN), eNodeB are used interchangeably.

Figure 4:
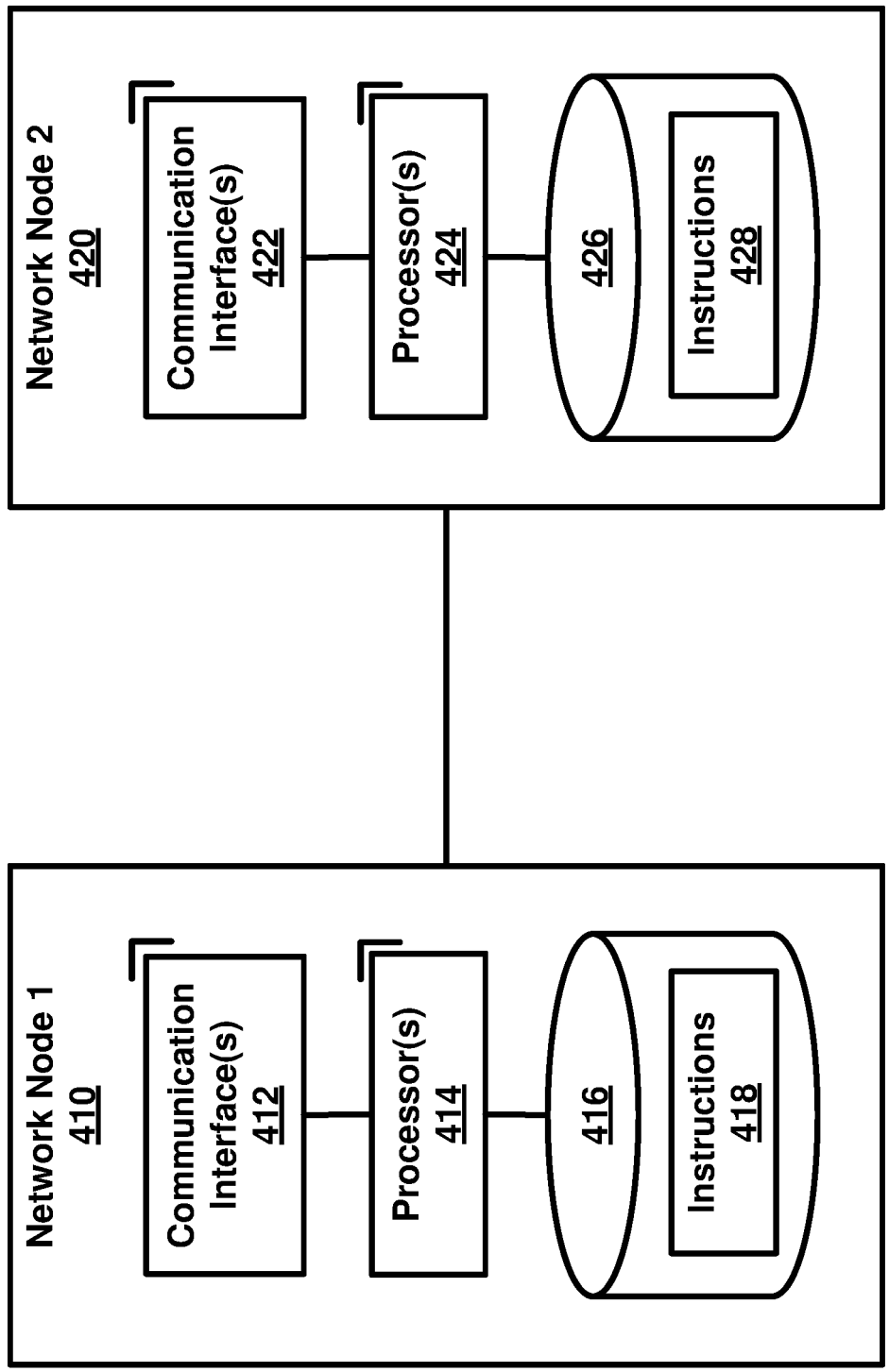
FIG. 4 is a system diagram of an example wireless device as per an aspect of an embodiment of the present disclosure.

Throughout the present disclosure, FNF, SNF, CHF, AMF, SMF, UPF, PCF, UDM, OAM, AF are example network functions which may be implemented either as a network element on a (dedicated) hardware, and/or a network node as depicted FIG. 4, or as a software instance running on a (dedicated) hardware and/or shared hardware, or as a virtualized function instantiated on an appropriate platform.

Figure 1:
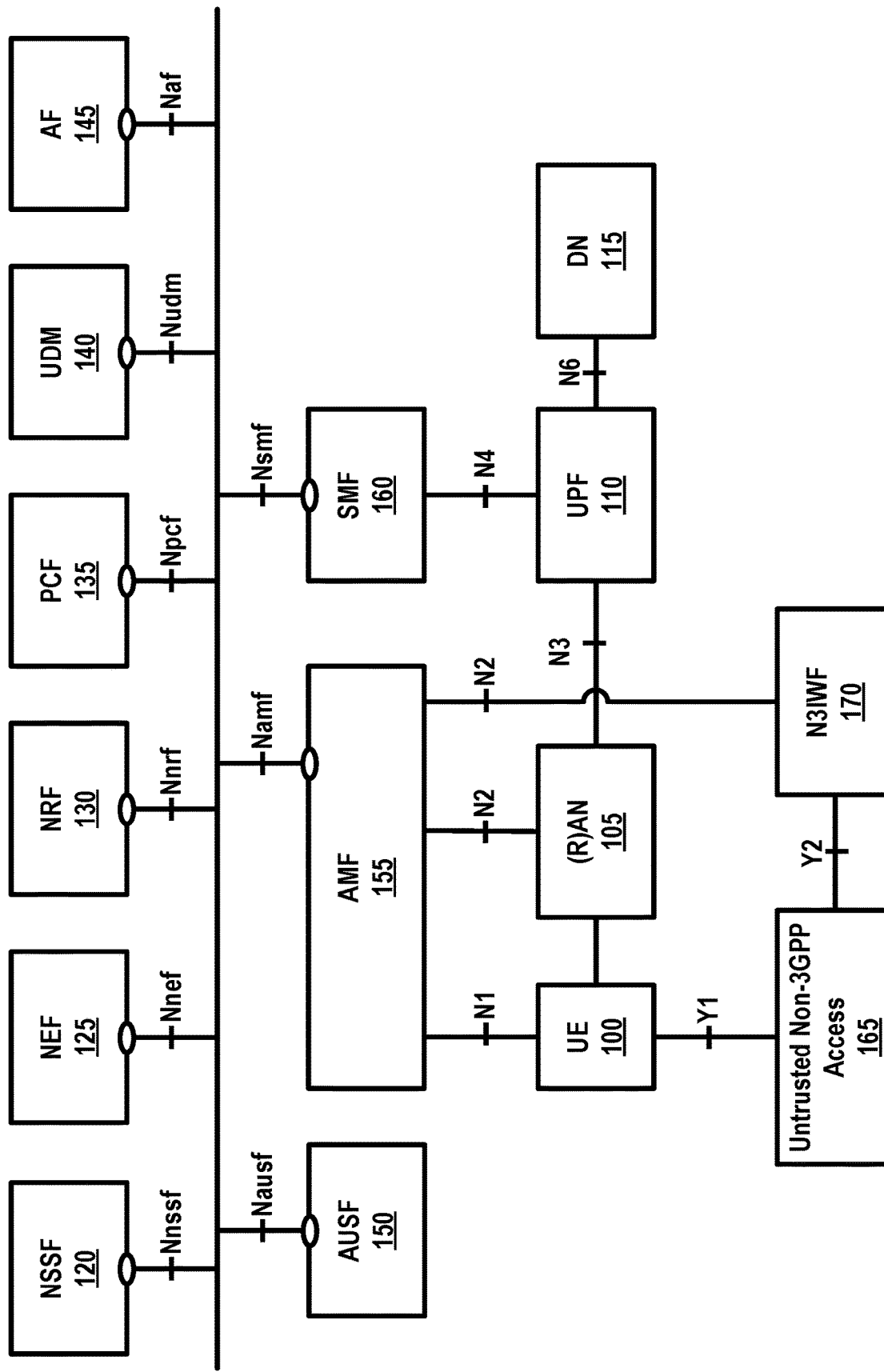
FIG. 1 is a diagram of an example 5G system architecture as per an aspect of an embodiment of the present disclosure.
Figure 2:
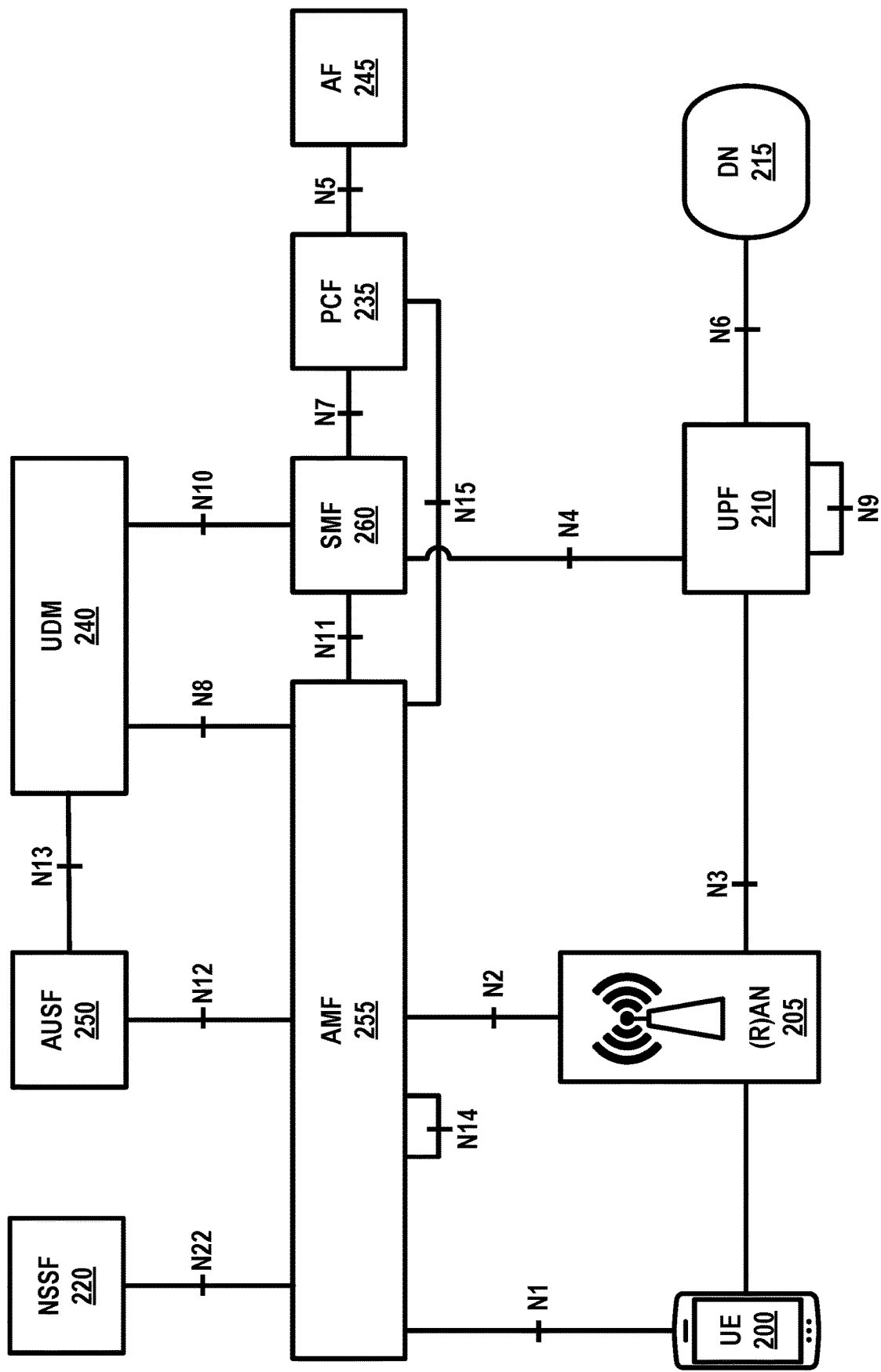
FIG. 2 is a diagram of an example 5G System architecture as per an aspect of an embodiment of the present disclosure.

The following acronyms are used throughout the present disclosure:

3GPP 3'rd generation partnership project
5G 5th generation mobile networks
5GC 5G Core Network
5G-GUTI 5G Globally Unique Temporary Identifier
5GS 5G System
5G-AN 5G Access Network
5QI 5G QoS Indicator
ACK Acknowledgement
AF Application Function
A-GNSS Assisted GNSS
AMBR Aggregate Maximum Bit Rate
AMF Access and Mobility Management Function
AN Access Network
ANDSP Access Network Discovery & Selection Policy
APN Access Point Name
ARP Allocation and Retention Priority
BD Billing Domain
BPS Barometric Pressure Sensor
CCNF Common Control Network Functions
CDR Charging Data Record
CHF Charging Function CIoT Cellular IoT
CN Core Network
CP Control Plane
C-V2X Cellular Vehicle-To-Everything
DAB Digital Audio Broadcasting
DDN Downlink Data Notification
DDoS Distributed Denial of Service
DL Downlink
DN Data Network
DN-AAA Data Network Authentication Authorization and Accounting
DNN Data Network Name
DRX Discontinuous Reception
DTMB Digital Terrestrial Multimedia Broadcast
ECGI E-UTRAN Cell Global Identifier
ECID Enhanced Cell Identity
eNodeB evolved Node B
EPS Evolved Packet System
E-UTRAN Evolved Universal Terrestrial Radio Access Network
FDD Frequency Division Duplex
FNF First Network Function
FQDN Fully Qualified Domain Name
F-TEID Fully Qualified TEID
GAD Geographical Area Description
GMLC Gateway Mobile Location Centre
gNB next generation Node B
gNB-CU-CP gNB Central Unit Control Plane
GNSS Global Navigation Satellite System
GPSI Generic Public Subscription Identifier
GTP GPRS Tunneling Protocol
GUTI Globally Unique Temporary Identifier
GW Gateway
HGMLC Home GMLC
HPLMN Home Public Land Mobile Network
HSS Home subscriber server
HTC Holographic-Type Communication
HTTP Hypertext Transfer Protocol
ID Identifier
IMEI International Mobile Equipment Identity
IMEI DB IMEI Database
IMS IP Multimedia Subsystem
IMSI International Mobile Subscriber Identity
IP Internet Protocol
IP-CAN IP Connectivity Access Network
L2 Layer 2 (data link layer)
L3 Layer 3 (network layer)
LAN local area network
LADN Local Area Data Network
LCS LoCation Services
LI Lawful Intercept
LMC Location Management Component
LMF Location Management Function
LPP LTE Positioning Protocol
LRF location retrieval function
MAC Media Access Control
MEI Mobile Equipment Identifier
MICO Mobile Initiated Connection Only
MME Mobility Management Entity
MO Mobile Originated
MO-LR Mobile Originated Location Request
MSISDN Mobile Subscriber ISDN
MT Mobile Terminating
MT-LR Mobile Terminated Location Request
N3IWF Non-3GPP InterWorking Function
NAI Network Access Identifier
NAS Non-Access Stratum
NAS-MM Non-Access Stratum mobility management
NAS-SM Non-Access Stratum session management
NAT Network address translation
NB-IoT Narrow Band IoT
NCGI NR Cell Global Identity
NEF Network Exposure Function
NF Network Function
NGAP Next Generation Application Protocol
ng-eNB Next Generation eNB
NG-RAN NR Radio Access Network
NI-LR Network Induced Location Request
NR New Radio
NRF Network Repository Function
NRPPa New Radio Positioning Protocol A
NSI Network Slice Instance
NSSAI Network Slice Selection Assistance Information
NSSF Network Slice Selection Function
NWDAF Network Data Analytics Function
OAM Operation Administration and Maintenance
OCS Online Charging System
OFCS Offline Charging System
OTDOA Observed Time Difference of Arrival
PCC Policy and Charging Control
PCF Policy Control Function
PCRF Policy and Charging Rules Function
PDN Packet Data Network
PDU Packet/Protocol Data Unit
PEI Permanent Equipment Identifier
PGW PDN Gateway
PLMN Public Land Mobile Network
PRACH Physical Random Access CHannel
PLMN Public Land Mobile Network
ProSe Proximity-based Services
PSA PDU Session Anchor
RAN Radio Access Network
QFI QoS Flow Identity
QoS Quality of Service
RM Registration Management
RA Random Access
RAN Radio Access Network
RAT Radio Access Technology
RRC Radio Resource Control
RM Registration Management
S1-AP S1 Application Protocol
SBA Service Based Architecture
SEA Security Anchor Function
SCM Security Context Management
SEA Security Anchor Function
SET SUPL Enabled Terminal
SGW Serving Gateway
SI System Information
SIB System Information Block
SLP SUPL Location Platform
SM Session Management
SMF Session Management Function
SMSF SMS Function
S-NSSAI Single Network Slice Selection Assistance information
SS Synchronization Signal
SSC Session and Service Continuity
SUCI Served User Correlation ID
SUPI Subscriber Permanent Identifier
SUPL Secure User Plane Location
TA Tracking Area
TAI Tracking Area Identity
TBS Terrestrial Beacon System
TCP Transmission Control Protocol TEID Tunnel Endpoint Identifier
TMSI Temporary Mobile Subscriber Identity
TNAN Trusted Non-3GPP Access Network
TNGF Trusted Non3GPP Gateway
TRP Transmission and Reception Point
UAS Unmanned Aerial System, Uncrewed Aerial System
UAV Unmanned Aerial Vehicle, Uncrewed Aerial Vehicle
UAVC UAV controller
UDM Unified Data Management
UDP User Datagram Protocol
UDR User Data Repository
UE User Equipment
UL Uplink
UL CL Uplink Classifier
UPF User Plane Function
USS UAS service supplier
UTM UAS traffic management
UPF User Plane Function
V2X Vehicle-To-Everything
VPLMN Visited Public Land Mobile Network
WLAN Wireless Local Area Network
XML Extensible Markup Language Example FIG. 1 and FIG. 2 depict a 5G system comprising of access networks and 5G core network. An example 5G access network may comprise an access network connecting to a 5G core network. An access network may comprise an NG-RAN 105 and/or non-3GPP AN 165. An example 5G core network may connect to one or more 5G access networks 5G-AN and/or NG-RANs. 5G core network may comprise functional elements or network functions as in example FIG. 1 and example FIG. 2 where interfaces may be employed for communication among the functional elements and/or network elements.

Figure 3:
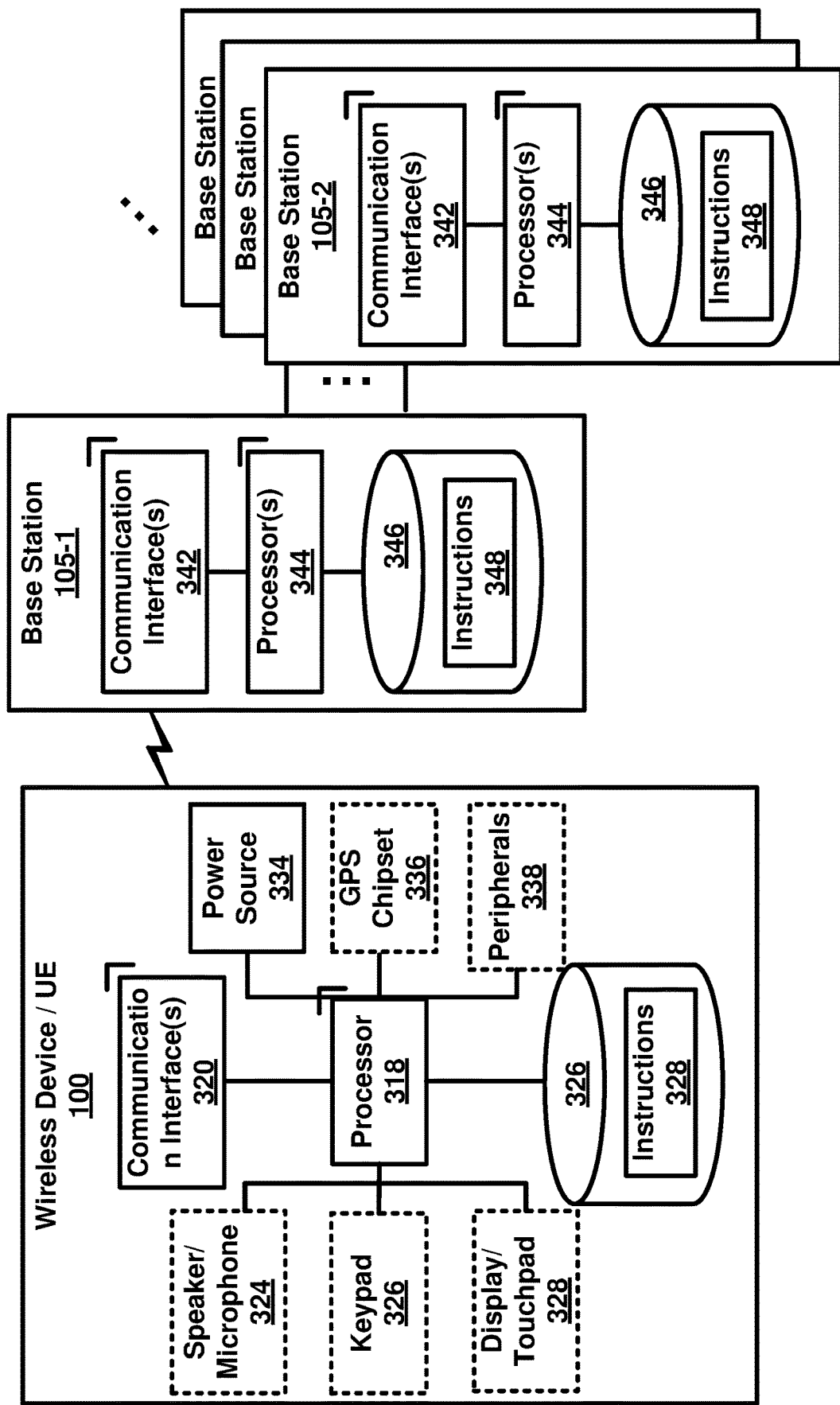
FIG. 3 is a system diagram of an example wireless device and a network node in a 5G system as per an aspect of an embodiment of the present disclosure.

In an example, a network function may be a processing function in a network, which may have a functional behavior and/or interfaces. A network function may be implemented either as a network element on a dedicated hardware, and/or a network node as depicted in FIG. 3 and FIG. 4, or as a software instance running on a dedicated hardware and/or shared hardware, or as a virtualized function instantiated on an appropriate platform.

In an example, access and mobility management function, AMF 155, may include the following functionalities (some of the AMF 155 functionalities may be supported in a single instance of an AMF 155): termination of RAN 105 CP interface (N2), termination of NAS (N1), NAS ciphering and integrity protection, registration management, connection management, reachability management, mobility management, lawful intercept (for AMF 155 events and interface to LI system), provide transport for session management, SM messages between UE 100 and SMF 160, transparent proxy for routing SM messages, access authentication, access authorization, provide transport for SMS messages between UE 100 and SMSF, security anchor function, SEA, interaction with the AUSF 150 and the UE 100, receiving the intermediate key established as a result of the UE 100 authentication process, security context management, SCM, that receives a key from the SEA that it uses to derive access network specific keys, and/or the like.

In an example, the AMF 155 may support non-3GPP access networks through N2 interface with N3IWF 170, NAS signaling with a UE 100 over N3IWF 170, authentication of UEs connected over N3IWF 170, management of mobility, authentication, and separate security context state(s) of a UE 100 connected via non-3GPP access 165 or connected via 3GPP access 105 and non-3GPP access 165 simultaneously, support of a coordinated RM context valid over 3GPP access 105 and non 3GPP access 165, support of CM management contexts for the UE 100 for connectivity over non-3GPP access, and/or the like.

In an example, an AMF 155 region may comprise one or multiple AMF 155 sets. The AMF 155 set may comprise some AMF 155 that serve a given area and/or network slice(s). In an example, multiple AMF 155 sets may be per AMF 155 region and/or network slice(s). Application identifier may be an identifier that may be mapped to a specific application traffic detection rule. Configured NSSAI may be an NSSAI that may be provisioned in a UE 100. DN 115 access identifier (DNAI), for a DNN, may be an identifier of a user plane access to a DN 115. Initial registration may be related to a UE 100 registration in RM-DEREGISTERED 500, 520 states. N2AP UE 100 association may be a logical per UE 100 association between a 5G AN node and an AMF 155. N2AP UE-TNLA-binding may be a binding between a N2AP UE 100 association and a specific transport network layer, TNL association for a given UE 100.

In an example, session management function, SMF 160, may include one or more of the following functionalities (one or more of the SMF 160 functionalities may be supported in a single instance of a SMF 160): session management (e.g. session establishment, modify and release, including tunnel maintain between UPF 110 and AN 105 node), UE 100 IP address allocation & management (including optional authorization), selection and control of UP function(s), configuration of traffic steering at UPF 110 to route traffic to proper destination, termination of interfaces towards policy control functions, control part of policy enforcement and QoS. lawful intercept (for SM events and interface to LI System), termination of SM parts of NAS messages, downlink data notification, initiation of AN specific SM information, sent via AMF 155 over N2 to (R)AN 105, determination of SSC mode of a session, roaming functionality, handling local enforcement to apply QoS SLAs (VPLMN), charging data collection and charging interface (VPLMN), lawful intercept (in VPLMN for SM events and interface to LI System), support for interaction with external DN 115 for transport of signaling for PDU session authorization/authentication by external DN 115, and/or the like.

In an example, a user plane function, UPF 110, may include one or more of the following functionalities (some of the UPF 110 functionalities may be supported in a single instance of a UPF 110): anchor point for Intra-/Inter-RAT mobility (when applicable), external PDU session point of interconnect to DN 115, packet routing & forwarding, packet inspection and user plane part of policy rule enforcement, lawful intercept (UP collection), traffic usage reporting, uplink classifier to support routing traffic flows to a data network, branching point to support multi-homed PDU session(s), QoS handling for user plane, uplink traffic verification (SDF to QoS flow mapping), transport level packet marking in the uplink and downlink, downlink packet buffering, downlink data notification triggering, and/or the like.

In an example, the UE 100 IP address management may include allocation and release of the UE 100 IP address and/or renewal of the allocated IP address. The UE 100 may set a requested PDU type during a PDU session establishment procedure based on its IP stack capabilities and/or configuration. In an example, the SMF 160 may select PDU type of a PDU session. In an example, if the SMF 160 receives a request with PDU type set to IP, the SMF 160 may select PDU type IPv4 or IPv6 based on DNN configuration and/or operator policies. In an example, the SMF 160 may provide a cause value to the UE 100 to indicate whether the other IP version is supported on the DNN. In an example, if the SMF 160 receives a request for PDU type IPv4 or IPv6 and the requested IP version is supported by the DNN the SMF 160 may select the requested PDU type.

In an example embodiment, the 5GC elements and UE 100 may support the following mechanisms: during a PDU session establishment procedure, the SMF 160 may send the IP address to the UE 100 via SM NAS signaling. The IPv4 address allocation and/or IPv4 parameter configuration via DHCPv4 may be employed once PDU session may be established. IPv6 prefix allocation may be supported via IPv6 stateless autoconfiguration, if IPv6 is supported. In an example, 5GC network elements may support IPv6 parameter configuration via stateless DHCPv6.

The 5GC may support the allocation of a static IPv4 address and/or a static IPv6 prefix based on subscription information in a UDM 140 and/or based on the configuration on a per-subscriber, per-DNN basis.

User plane function(s) (UPF 110) may handle the user plane path of PDU sessions. A UPF 110 that provides the interface to a data network may support functionality of a PDU session anchor.

In an example, a policy control function, PCF 135, may support unified policy framework to govern network behavior, provide policy rules to control plane function(s) to enforce policy rules, implement a front end to access subscription information relevant for policy decisions in a user data repository (UDR), and/or the like.

A network exposure function, NEF 125, may provide means to securely expose the services and capabilities provided by the 3GPP network functions, translate between information exchanged with the AF 145 and information exchanged with the internal network functions, receive information from other network functions, and/or the like.

In an example, a network repository function, NRF 130 may support service discovery function that may receive NF discovery request from NF instance, provide information about the discovered NF instances (be discovered) to the NF instance, and maintain information about available NF instances and their supported services, and/or the like.

In an example, an NSSF 120 may select a set of network slice instances serving the UE 100, may determine allowed NSSAI. In an example, the NSSF 120 may determine the AMF 155 set to be employed to serve the UE 100, and/or, based on configuration, determine a list of candidate AMF 155(s) 155 by querying the NRF 130.

In an example, stored data in a UDR may include at least user subscription data, including at least subscription identifiers, security credentials, access and mobility related subscription data, session related subscription data, policy data, and/or the like.

In an example, an AUSF 150 may support authentication server function (AUSF 150).

In an example, an application function (AF), AF 145, may interact with the 3GPP core network to provide services. In an example, based on operator deployment, application functions may be trusted by the operator to interact directly with relevant network functions. Application functions not allowed by the operator to access directly the network functions may use an external exposure framework (e.g., via the NEF 125) to interact with relevant network functions.

In an example, control plane interface between the (R)AN 105 and the 5G core may support connection of multiple different kinds of AN(s) (e.g. 3GPP RAN 105, N3IWF 170 for Un-trusted access 165) to the 5GC via a control plane protocol. In an example, an N2 AP protocol may be employed for both the 3GPP access 105 and non-3GPP access 165. In an example, control plane interface between the (R)AN 105 and the 5G core may support decoupling between AMF 155 and other functions such as SMF 160 that may need to control the services supported by AN(s) (e.g. control of the UP resources in the AN 105 for a PDU session).

In an example, the 5GC may provide policy information from the PCF 135 to the UE 100. In an example, the policy information may comprise: access network discovery and selection policy, UE 100 route selection policy (URSP), SSC mode selection policy (SSCMSP), network slice selection policy (NSSP), DNN selection policy, non-seamless offload policy, and/or the like.

In an example, as depicted in example FIG. 5A and FIG. 5B, the registration management, RM may be employed to register or de-register a UE/user 100 with the network and establish the user context in the network. Connection management may be employed to establish and release the signaling connection between the UE 100 and the AMF 155.

In an example, a UE 100 may register with the network to receive services that require registration. In an example, the UE 100 may update its registration with the network periodically in order to remain reachable (periodic registration update), or upon mobility (e.g., mobility registration update), or to update its capabilities or to re-negotiate protocol parameters.

Figure 8:
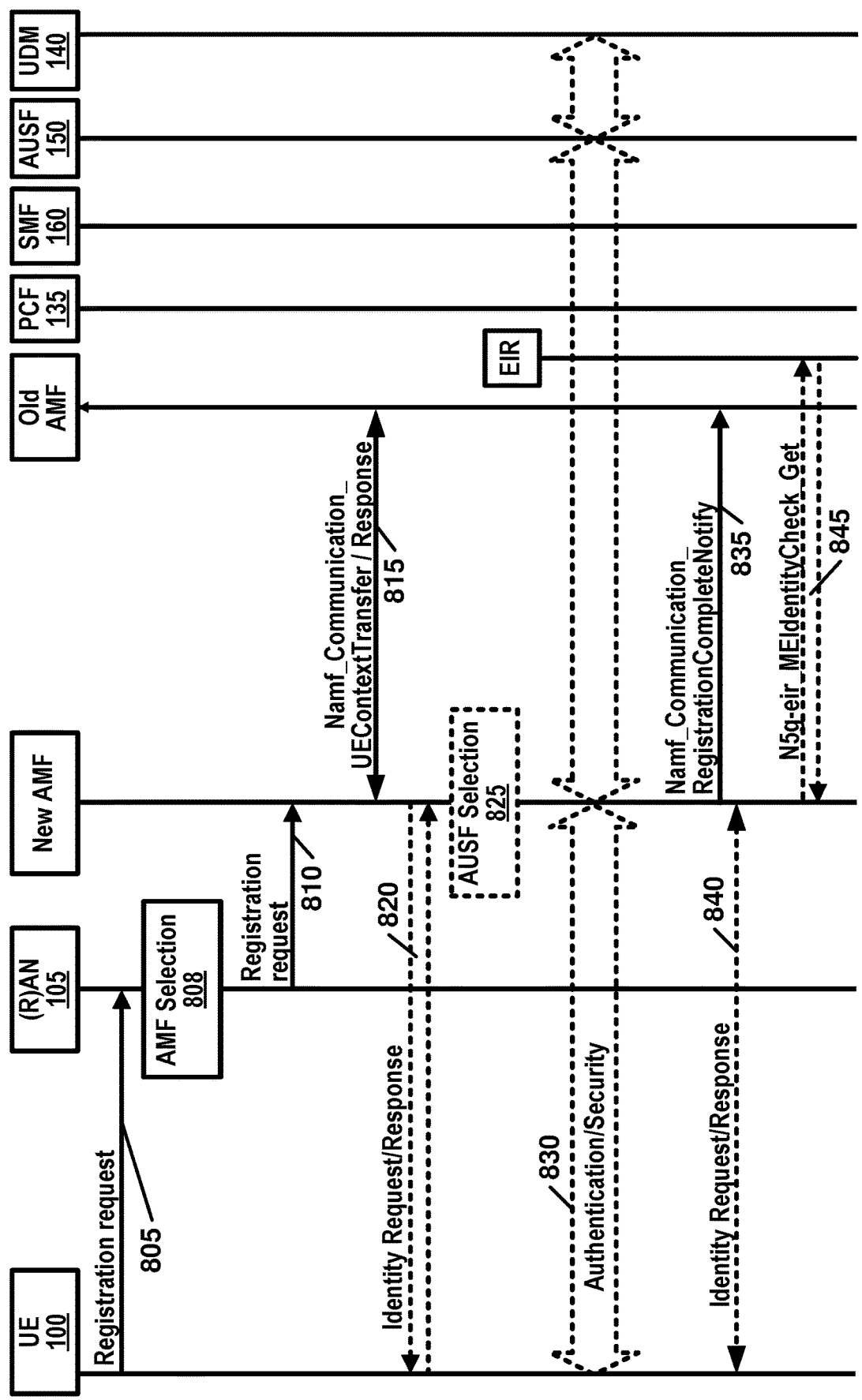
FIG. 8 is an example call flow as per an aspect of an embodiment of the present disclosure.
Figure 9:
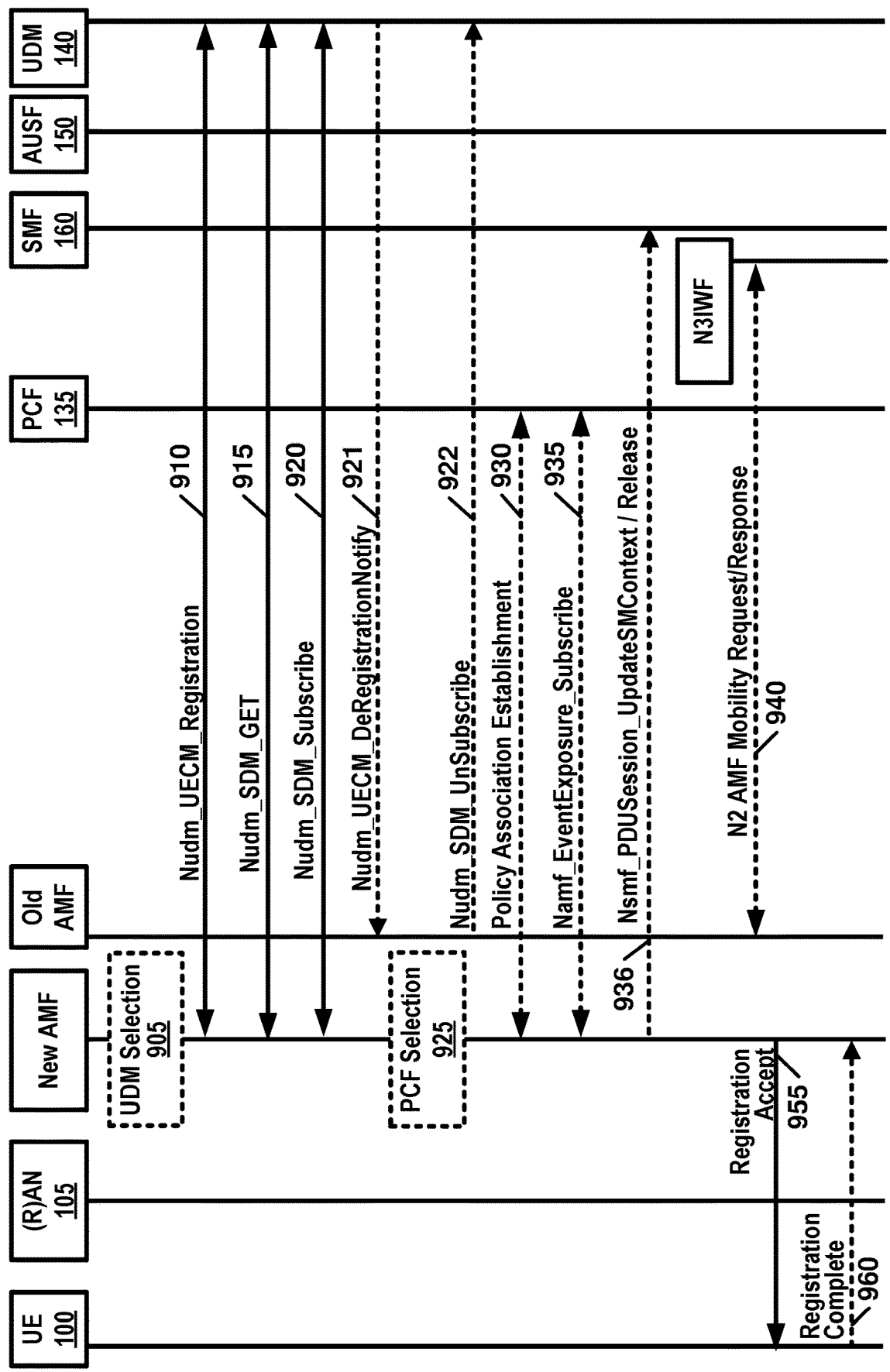
FIG. 9 is an example call flow as per an aspect of an embodiment of the present disclosure.

In an example, an initial registration procedure as depicted in example FIG. 8 and FIG. 9 may involve execution of network access control functions (e.g. user authentication and access authorization based on subscription profiles in UDM 140). Example FIG. 9 is a continuation of the initial registration procedure depicted in FIG. 8. As a result of the initial registration procedure, the identity of the serving AMF 155 may be registered in a UDM 140.

In an example, the registration management, RM procedures may be applicable over both 3GPP access 105 and non 3GPP access 165.

An example FIG. 5A may depict the RM states of a UE 100 as observed by the UE 100 and AMF 155. In an example embodiment, two RM states may be employed in the UE 100 and the AMF 155 that may reflect the registration status of the UE 100 in the selected PLMN: RM-DEREGISTERED 500, and RM-REGISTERED 510. In an example, in the RM DEREGISTERED state 500, the UE 100 may not be registered with the network. The UE 100 context in the AMF 155 may not hold valid location or routing information for the UE 100 so the UE 100 may not be reachable by the AMF 155. In an example, the UE 100 context may be stored in the UE 100 and the AMF 155. In an example, in the RM REGISTERED state 510, the UE 100 may be registered with the network. In the RM-REGISTERED 510 state, the UE 100 may receive services that may require registration with the network.

In an example embodiment, two RM states may be employed in AMF 155 for the UE 100 that may reflect the registration status of the UE 100 in the selected PLMN: RM-DEREGISTERED 520, and RM-REGISTERED 530.

As depicted in example FIG. 6A and FIG. 6B, connection management, CM, may comprise establishing and releasing a signaling connection between a UE 100 and an AMF 155 over N1 interface. The signaling connection may be employed to enable NAS signaling exchange between the UE 100 and the core network. The signaling connection between the UE 100 and the AMF 155 may comprise both the AN signaling connection between the UE 100 and the (R)AN 105 (e.g. RRC connection over 3GPP access) and the N2 connection for the UE 100 between the AN and the AMF 155. In an example, the signaling connection may be a N1 signaling connection. In an example, the signaling connection may be a N1 NAS signaling connection.

As depicted in example FIG. 6A and FIG. 6B, two CM states may be employed for the NAS signaling connectivity of the UE 100 with the AMF 155, CM-IDLE 600, 620 and CM-CONNECTED 610, 630. A UE 100 in CM-IDLE 600 state may be in RM-REGISTERED 510 state and may have no NAS signaling connection established with the AMF 155 over N1. The UE 100 in CM-IDLE 600 state may be in RRC idle state. The UE 100 may perform cell selection, cell reselection, PLMN selection, and/or the like. A UE 100 in CM-CONNECTED 610 state may have a NAS signaling connection with the AMF 155 over N1. In an example, the UE 100 in CM-CONNECTED 610 state may be an RRC connected state. The UE 100 in CM-CONNECTED 610 state may be an RRC inactive state. In an example, a CM state in an AMF and a CM state in a UE may be different. This may be a case when a local state change happens without explicit signaling procedure (e.g., UE context release procedure) between the UE and the AMF. In an example, an RRC state in a UE (e.g., wireless device) and an RRC state in a base station (e.g., gNB, eNB) may be different. This may be a case when a local state change happens without explicit signaling procedure (e.g., RRC release procedure) between the UE and the base station.

In an example embodiment two CM states may be employed for the UE 100 at the AMF 155, CM-IDLE 620 and CM-CONNECTED 630.

In an example, an RRC inactive state may apply to NG-RAN (e.g. it may apply to NR and E-UTRA connected to 5G CN). The AMF 155, based on network configuration, may provide assistance information to the NG RAN 105, to assist the NG RAN's 105 decision whether the UE 100 may be sent to RRC inactive state. When a UE 100 is CM-CONNECTED 610 with RRC inactive state, the UE 100 may resume the RRC connection due to uplink data pending, mobile initiated signaling procedure, as a response to RAN 105 paging, to notify the network that it has left the RAN 105 notification area, and/or the like.

In an example, a NAS signaling connection management may include establishing and releasing a NAS signaling connection. A NAS signaling connection establishment function may be provided by the UE 100 and the AMF 155 to establish the NAS signaling connection for the UE 100 in CM-IDLE 600 state. The procedure of releasing the NAS signaling connection may be initiated by the 5G (R)AN 105 node or the AMF 155.

In an example, reachability management of a UE 100 may detect whether the UE 100 is reachable and may provide the UE 100 location (e.g. access node) to the network to reach the UE 100. Reachability management may be done by paging the UE 100 and the UE 100 location tracking. The UE 100 location tracking may include both UE 100 registration area tracking and UE 100 reachability tracking. The UE 100 and the AMF 155 may negotiate UE 100 reachability characteristics in CM-IDLE 600, 620 state during registration and registration update procedures.

In an example, two UE 100 reachability categories may be negotiated between a UE 100 and an AMF 155 for CM-IDLE 600, 620 state. 1) UE 100 reachability allowing mobile device terminated data while the UE 100 is CM-IDLE 600 mode. 2) Mobile initiated connection only (MICO) mode. The 5GC may support a PDU connectivity service that provides exchange of PDUs between the UE 100 and a data network identified by a DNN. The PDU connectivity service may be supported via PDU sessions that are established upon request from the UE 100.

In an example, a PDU session may support one or more PDU session types. PDU sessions may be established (e.g. upon UE 100 request), modified (e.g. upon UE 100 and 5GC request) and/or released (e.g. upon UE 100 and 5GC request) using NAS SM signaling exchanged over N1 between the UE 100 and the SMF 160. Upon request from an application server, the 5GC may be able to trigger a specific application in the UE 100. When receiving the trigger, the UE 100 may send it to the identified application in the UE 100. The identified application in the UE 100 may establish a PDU session to a specific DNN.

Figure 7:
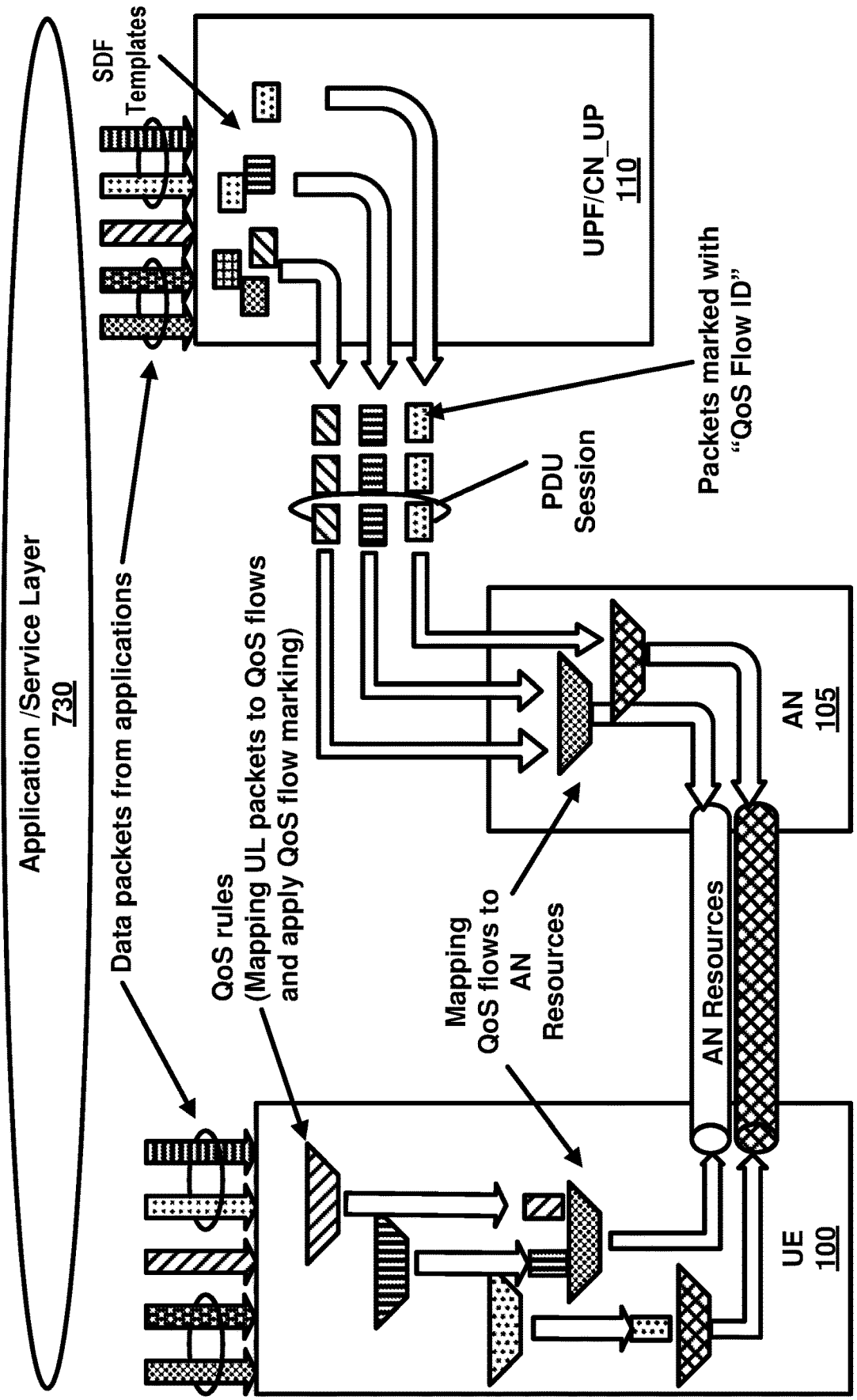
FIG. 7 is diagram for classification and marking traffic as per an aspect of an embodiment of the present disclosure.

In an example, the 5G QoS model may support a QoS flow based framework as depicted in example FIG. 7. The 5G QoS model may support both QoS flows that require a guaranteed flow bit rate and QoS flows that may not require a guaranteed flow bit rate. In an example, the 5G QoS model may support reflective QoS. The QoS model may comprise flow mapping or packet marking at the UPF 110 (CN_UP) 110, AN 105 and/or the UE 100. In an example, packets may arrive from and/or destined to the application/service layer 730 of UE 100, UPF 110 (CN_UP) 110, and/or the AF 145.

In an example, the QoS flow may be a granularity of QoS differentiation in a PDU session. A QoS flow ID, QFI, may be employed to identify the QoS flow in the 5G system. In an example, user plane traffic with the same QFI within a PDU session may receive the same traffic forwarding treatment. The QFI may be carried in an encapsulation header on N3 and/or N9 (e.g. without any changes to the end-to-end packet header). In an example, the QFI may be applied to PDUs with different types of payload. The QFI may be unique within a PDU session.

In an example, the QoS parameters of a QoS flow may be provided to the (R)AN 105 as a QoS profile over N2 at PDU session establishment, QoS flow establishment, or when NG-RAN is used at every time the user plane is activated. In an example, a default QoS rule may be required for every PDU session. The SMF 160 may allocate the QFI for a QoS flow and may derive QoS parameters from the information provided by the PCF 135. In an example, the SMF 160 may provide the QFI together with the QoS profile containing the QoS parameters of a QoS flow to the (R)AN 105.

In an example, 5G QoS flow may be a granularity for QoS forwarding treatment in the 5G system. Traffic mapped to the same 5G QoS flow may receive the same forwarding treatment (e.g. scheduling policy, queue management policy, rate shaping policy, RLC configuration, and/or the like). In an example, providing different QoS forwarding treatment may require separate 5G QoS flows.

In an example, a 5G QoS indicator may be a scalar that may be employed as a reference to a specific QoS forwarding behavior (e.g. packet loss rate, packet delay budget) to be provided to a 5G QoS flow. In an example, the 5G QoS indicator may be implemented in the access network by the 5QI referencing node specific parameters that may control the QoS forwarding treatment (e.g. scheduling weights, admission thresholds, queue management thresholds, link layer protocol configuration, and/or the like).

In an example, edge computing may provide compute and storage resources with adequate connectivity close to the devices generating traffic.

In an example, 5GC may support edge computing and may enable operator(s) and 3rd party services to be hosted close to the UE's access point of attachment. The 5G core network may select a UPF 110 close to the UE 100 and may execute the traffic steering from the UPF 110 to the local data network via a N6 interface. In an example, the selection and traffic steering may be based on the UE's 100 subscription data, UE 100 location, the information from application function AF 145, policy, other related traffic rules, and/or the like. In an example, the 5G core network may expose network information and capabilities to an edge computing application function. The functionality support for edge computing may include local routing where the 5G core network may select a UPF 110 to route the user traffic to the local data network, traffic steering where the 5G core network may select the traffic to be routed to the applications in the local data network, session and service continuity to enable UE 100 and application mobility, user plane selection and reselection, e.g. based on input from application function, network capability exposure where 5G core network and application function may provide information to each other via NEF 125, QoS and charging where PCF 135 may provide rules for QoS control and charging for the traffic routed to the local data network, support of local area data network where 5G core network may provide support to connect to the LADN in a certain area where the applications are deployed, and/or the like.

An example 5G system may be a 3GPP system comprising of 5G access network 105, 5G core network and a UE 100, and/or the like. Allowed NSSAI may be an NSSAI provided by a serving PLMN during e.g. a registration procedure, indicating the NSSAI allowed by the network for the UE 100 in the serving PLMN for the current registration area.

In an example, a PDU connectivity service may provide exchange of PDUs between a UE 100 and a data network. A PDU session may be an association between the UE 100 and the data network, DN 115, that may provide the PDU connectivity service. The type of association may be IP, Ethernet and/or unstructured.

Establishment of user plane connectivity to a data network via network slice instance(s) may comprise the following: performing a RM procedure to select an AMF 155 that supports the required network slices, and establishing one or more PDU session(s) to the required data network via the network slice instance(s).

In an example, the set of network slices for a UE 100 may be changed at any time while the UE 100 may be registered with the network, and may be initiated by the network, or the UE 100.

In an example, a periodic registration update may be UE 100 re-registration at expiry of a periodic registration timer. A requested NSSAI may be a NSSAI that the UE 100 may provide to the network.

In an example, a service based interface may represent how a set of services may be provided/exposed by a given NF.

In an example, a service continuity may be an uninterrupted user experience of a service, including the cases where the IP address and/or anchoring point may change. In an example, a session continuity may refer to continuity of a PDU session. For PDU session of IP type session continuity may imply that the IP address is preserved for the lifetime of the PDU session. An uplink classifier may be a UPF 110 functionality that aims at diverting uplink traffic, based on filter rules provided by the SMF 160, towards data network, DN 115.

In an example, the 5G system architecture may support data connectivity and services enabling deployments to use techniques such as e.g. network function virtualization and/or software defined networking. The 5G system architecture may leverage service-based interactions between control plane (CP) network functions where identified. In 5G system architecture, separation of the user plane (UP) functions from the control plane functions may be considered. A 5G system may enable a network function to interact with other NF(s) directly if required.

In an example, the 5G system may reduce dependencies between the access network (AN) and the core network (CN). The architecture may comprise a converged access-agnostic core network with a common AN-CN interface which may integrate different 3GPP and non-3GPP access types.

In an example, the 5G system may support a unified authentication framework, stateless NFs, where the compute resource is decoupled from the storage resource, capability exposure, and concurrent access to local and centralized services. To support low latency services and access to local data networks, UP functions may be deployed close to the access network.

In an example, the 5G system may support roaming with home routed traffic and/or local breakout traffic in the visited PLMN. An example 5G architecture may be service-based and the interaction between network functions may be represented in two ways. (1) As service-based representation (depicted in example FIG. 1), where network functions within the control plane, may enable other authorized network functions to access their services. This representation may also include point-to-point reference points where necessary. (2) Reference point representation, showing the interaction between the NF services in the network functions described by point-to-point reference point (e.g. N11) between any two network functions.

In an example, a network slice may comprise the core network control plane and user plane network functions, the 5G Radio Access Network; the N3IWF functions to the non-3GPP Access Network, and/or the like. Network slices may differ for supported features and network function implementation. The operator may deploy multiple network slice instances delivering the same features but for different groups of UEs, e.g. as they deliver a different committed service and/or because they may be dedicated to a customer. The NSSF 120 may store the mapping information between slice instance ID and NF ID (or NF address).

In an example, a UE 100 may simultaneously be served by one or more network slice instances via a 5G-AN. In an example, the UE 100 may be served by k network slices (e.g. k=8, 16, etc.) at a time. An AMF 155 instance serving the UE 100 logically may belong to a network slice instance serving the UE 100.

In an example, a PDU session may belong to one specific network slice instance per PLMN. In an example, different network slice instances may not share a PDU session. Different slices may have slice-specific PDU sessions using the same DNN.

An S-NSSAI (Single Network Slice Selection Assistance information) may identify a network slice. An S-NSSAI may comprise a slice/service type (SST), which may refer to the expected network slice behavior in terms of features and services; and/or a slice differentiator (SD). A slice differentiator may be optional information that may complement the slice/service type(s) to allow further differentiation for selecting a network slice instance from potentially multiple network slice instances that comply with the indicated slice/service type. In an example, the same network slice instance may be selected employing different S-NSSAIs. The CN part of a network slice instance(s) serving a UE 100 may be selected by CN.

In an example, subscription data may include the S-NSSAI(s) of the network slices that the UE 100 subscribes to. One or more S-NSSAIs may be marked as default S-NSSAI. In an example, k S-NSSAI may be marked default S-NSSAI (e.g. k=8, 16, etc.). In an example, the UE 100 may subscribe to more than 8 S-NSSAIs.

In an example, a UE 100 may be configured by the HPLMN with a configured NSSAI per PLMN. Upon successful completion of a UE's registration procedure, the UE 100 may obtain from the AMF 155 an Allowed NSSAI for this PLMN, which may include one or more S-NSSAIs.

In an example, the Allowed NSSAI may take precedence over the configured NSSAI for a PLMN. The UE 100 may use the S-NSSAIs in the allowed NSSAI corresponding to a network slice for the subsequent network slice selection related procedures in the serving PLMN.

In an example, the establishment of user plane connectivity to a data network via a network slice instance(s) may comprise: performing a RM procedure to select an AMF 155 that may support the required network slices, establishing one or more PDU sessions to the required data network via the network slice instance(s), and/or the like.

In an example, when a UE 100 registers with a PLMN, if the UE 100 for the PLMN has a configured NSSAI or an allowed NSSAI, the UE 100 may provide to the network in RRC and NAS layer a requested NSSAI comprising the S-NSSAI(s) corresponding to the slice(s) to which the UE 100 attempts to register, a temporary user ID if one was assigned to the UE, and/or the like. The requested NSSAI may be configured-NSSAI, allowed-NSSAI, and/or the like.

In an example, when a UE 100 registers with a PLMN, if for the PLMN the UE 100 has no configured NSSAI or allowed NSSAI, the RAN 105 may route NAS signaling from/to the UE 100 to/from a default AMF 155.

In an example, the network, based on local policies, subscription changes and/or UE 100 mobility, may change the set of permitted network slice(s) to which the UE 100 is registered. In an example, the network may perform the change during a registration procedure or trigger a notification towards the UE 100 of the change of the supported network slices using an RM procedure (which may trigger a registration procedure). The network may provide the UE 100 with a new allowed NSSAI and tracking area list.

In an example, during a registration procedure in a PLMN, in case the network decides that the UE 100 should be served by a different AMF 155 based on network slice(s) aspects, the AMF 155 that first received the registration request may redirect the registration request to another AMF 155 via the RAN 105 or via direct signaling between the initial AMF 155 and the target AMF 155.

In an example, the network operator may provision the UE 100 with network slice selection policy (NSSP). The NSSP may comprise one or more NSSP rules.

In an example, if a UE 100 has one or more PDU sessions established corresponding to a specific S-NSSAI, the UE 100 may route the user data of the application in one of the PDU sessions, unless other conditions in the UE 100 may prohibit the use of the PDU sessions. If the application provides a DNN, then the UE 100 may consider the DNN to determine which PDU session to use. In an example, if the UE 100 does not have a PDU session established with the specific S-NSSAI, the UE 100 may request a new PDU session corresponding to the S-NSSAI and with the DNN that may be provided by the application. In an example, in order for the RAN 105 to select a proper resource for supporting network slicing in the RAN 105, the RAN 105 may be aware of the network slices used by the UE 100.

In an example, an AMF 155 may select an SMF 160 in a network slice instance based on S-NSSAI, DNN and/or other information e.g. UE 100 subscription and local operator policies, and/or the like, when the UE 100 triggers the establishment of a PDU session. The selected SMF 160 may establish the PDU session based on S-NSSAI and DNN.

In an example, in order to support network-controlled privacy of slice information for the slices the UE 100 may access, when the UE 100 is aware or configured that privacy considerations may apply to NSSAI, the UE 100 may not include NSSAI in NAS signaling unless the UE 100 has a NAS security context and the UE 100 may not include NSSAI in unprotected RRC signaling.

In an example, for roaming scenarios, the network slice specific network functions in VPLMN and HPLMN may be selected based on the S-NSSAI provided by the UE 100 during PDU connection establishment. If a standardized S-NSSAI is used, selection of slice specific NF instances may be done by each PLMN based on the provided S-NSSAI. In an example, the VPLMN may map the S-NSSAI of HPLMN to a S-NSSAI of VPLMN based on roaming agreement (e.g., including mapping to a default S-NSSAI of VPLMN). In an example, the selection of slice specific NF instance in VPLMN may be done based on the S-NSSAI of VPLMN. In an example, the selection of any slice specific NF instance in HPLMN may be based on the S-NSSAI of HPLMN.

As depicted in example FIG. 8 and FIG. 9, a registration procedure may be performed by the UE 100 to get authorized to receive services, to enable mobility tracking, to enable reachability, and/or the like.

In an example, the UE 100 may send to the (R)AN 105 an message 805 (comprising AN parameters, RM-NAS registration request (registration type, SUCI or SUPI or 5G-GUTI, last visited TAI (if available), security parameters, requested NSSAI, mapping of requested NSSAI, UE 100 5GC capability, PDU session status, PDU session(s) to be re-activated, Follow on request, MICO mode preference, and/or the like), and/or the like). In an example, in case of NG-RAN, the AN parameters may include e.g. SUCI or SUPI or the 5G-GUTI, the Selected PLMN ID and requested NSSAI, and/or the like. In an example, the AN parameters may comprise establishment cause. The establishment cause may provide the reason for requesting the establishment of an RRC connection. In an example, the registration type may indicate if the UE 100 wants to perform an initial registration (e.g. the UE 100 is in RM-DEREGISTERED state), a mobility registration update (e.g., the UE 100 is in RM-REGISTERED state and initiates a registration procedure due to mobility), a periodic registration update (e.g., the UE 100 is in RM-REGISTERED state and may initiate a registration procedure due to the periodic registration update timer expiry) or an emergency registration (e.g., the UE 100 is in limited service state). In an example, if the UE 100 performing an initial registration (e.g., the UE 100 is in RM-DEREGISTERED state) to a PLMN for which the UE 100 does not already have a 5G-GUTI, the UE 100 may include its SUCI or SUPI in the registration request. The SUCI may be included if the home network has provisioned the public key to protect SUPI in the UE. If the UE 100 received a UE 100 configuration update command indicating that the UE 100 needs to re-register and the 5G-GUTI is invalid, the UE 100 may perform an initial registration and may include the SUPI in the registration request message. For an emergency registration, the SUPI may be included if the UE 100 does not have a valid 5G-GUTI available; the PEI may be included when the UE 100 has no SUPI and no valid 5G-GUTI. In other cases, the 5G-GUTI may be included and it may indicate the last serving AMF 155. If the UE 100 is already registered via a non-3GPP access in a PLMN different from the new PLMN (e.g., not the registered PLMN or an equivalent PLMN of the registered PLMN) of the 3GPP access, the UE 100 may not provide over the 3GPP access the 5G-GUTI allocated by the AMF 155 during the registration procedure over the non-3GPP access. If the UE 100 is already registered via a 3GPP access in a PLMN (e.g., the registered PLMN), different from the new PLMN (e.g. not the registered PLMN or an equivalent PLMN of the registered PLMN) of the non-3GPP access, the UE 100 may not provide over the non-3GPP access the 5G-GUTI allocated by the AMF 155 during the registration procedure over the 3GPP access. The UE 100 may provide the UE's usage setting based on its configuration. In case of initial registration or mobility registration update, the UE 100 may include the mapping of requested NSSAI, which may be the mapping of each S-NSSAI of the requested NSSAI to the S-NSSAIs of the configured NSSAI for the HPLMN, to ensure that the network is able to verify whether the S-NSSAI(s) in the requested NSSAI are permitted based on the subscribed S-NSSAIs. If available, the last visited TAI may be included in order to help the AMF 155 produce registration area for the UE. In an example, the security parameters may be used for authentication and integrity protection. requested NSSAI may indicate the network slice selection assistance information. The PDU session status may indicate the previously established PDU sessions in the UE. When the UE 100 is connected to the two AMF 155 belonging to different PLMN via 3GPP access and non-3GPP access then the PDU session status may indicate the established PDU session of the current PLMN in the UE. The PDU session(s) to be re-activated may be included to indicate the PDU session(s) for which the UE 100 may intend to activate UP connections. A PDU session corresponding to a LADN may not be included in the PDU session(s) to be re-activated when the UE 100 is outside the area of availability of the LADN. The follow on request may be included when the UE 100 may have pending uplink signaling and the UE 100 may not include PDU session(s) to be re-activated, or the registration type may indicate the UE 100 may want to perform an emergency registration.

In an example, if a SUPI is included or the 5G-GUTI does not indicate a valid AMF 155, the (R)AN 105, based on (R)AT and requested NSSAI, if available, may selects 808 an AMF 155. If UE 100 is in CM-CONNECTED state, the (R)AN 105 may forward the registration request message to the AMF 155 based on the N2 connection of the UE. If the (R)AN 105 may not select an appropriate AMF 155, it may forward the registration request to an AMF 155 which has been configured, in (R)AN 105, to perform AMF 155 selection 808.

In an example, the (R)AN 105 may send to the new AMF 155 an N2 message 810 (comprising: N2 parameters, RM-NAS registration request (registration type, SUPI or 5G-GUTI, last visited TAI (if available), security parameters, requested NSSAI, mapping of requested NSSAI, UE 100 5GC capability, PDU session status, PDU session(s) to be re-activated, follow on request, and MICO mode preference), and/or the like). In an example, when NG-RAN is used, the N2 parameters may comprise the selected PLMN ID, location information, cell identity and the RAT type related to the cell in which the UE 100 is camping. In an example, when NG-RAN is used, the N2 parameters may include the establishment cause.

In an example, the new AMF 155 may send to the old AMF 155 a Namf_Communication_UEContextTransfer (complete registration request) 815. In an example, if the UE's 5G-GUTI was included in the registration request and the serving AMF 155 has changed since last registration procedure, the new AMF 155 may invoke the Namf_Communication_UEContextTransfer service operation 815 on the old AMF 155 including the complete registration request IE, which may be integrity protected, to request the UE's SUPI and MM Context. The old AMF 155 may use the integrity protected complete registration request IE to verify if the context transfer service operation invocation corresponds to the UE 100 requested. In an example, the old AMF 155 may transfer the event subscriptions information by each NF consumer, for the UE, to the new AMF 155. In an example, if the UE 100 identifies itself with PEI, the SUPI request may be skipped.

In an example, the old AMF 155 may send to new AMF 155 a response 815 to Namf_Communication_UEContextTransfer (SUPI, MM context, SMF 160 information, PCF ID). In an example, the old AMF 155 may respond to the new AMF 155 for the Namf_Communication_UEContextTransfer invocation by including the UE's SUPI and MM context. In an example, if old AMF 155 holds information about established PDU sessions, the old AMF 155 may include SMF 160 information including S-NSSAI(s), SMF 160 identities and PDU session ID. In an example, if old AMF 155 holds information about active NGAP UE-TNLA bindings to N3IWF, the old AMF 155 may include information about the NGAP UE-TNLA bindings.

In an example, if the SUPI is not provided by the UE 100 nor retrieved from the old AMF 155 the identity request procedure 820 may be initiated by the AMF 155 sending an identity request message to the UE 100 requesting the SUCI.

In an example, the UE 100 may respond with an identity response message 820 including the SUCI. The UE 100 may derive the SUCI by using the provisioned public key of the HPLMN.

In an example, the AMF 155 may decide to initiate UE 100 authentication 825 by invoking an AUSF 150. The AMF 155 may select an AUSF 150 based on SUPI or SUCI. In an example, if the AMF 155 is configured to support emergency registration for unauthenticated SUPIs and the UE 100 indicated registration type emergency registration the AMF 155 may skip the authentication and security setup or the AMF 155 may accept that the authentication may fail and may continue the registration procedure.

In an example, the authentication 830 may be performed by Nudm_UEAuthenticate_Get operation. The AUSF 150 may discover a UDM 140. In case the AMF 155 provided a SUCI to AUSF 150, the AUSF 150 may return the SUPI to AMF 155 after the authentication is successful. In an example, if network slicing is used, the AMF 155 may decide if the registration request needs to be rerouted where the initial AMF 155 refers to the AMF 155. In an example, the AMF 155 may initiate NAS security functions. In an example, upon completion of NAS security function setup, the AMF 155 may initiate NGAP procedure to enable 5G-AN use it for securing procedures with the UE. In an example, the 5G-AN may store the security context and may acknowledge to the AMF 155. The 5G-AN may use the security context to protect the messages exchanged with the UE.

In an example, new AMF 155 may send to the old AMF 155 Namf_Communication_RegistrationCompleteNotify 835. If the AMF 155 has changed, the new AMF 155 may notify the old AMF 155 that the registration of the UE 100 in the new AMF 155 may be completed by invoking the Namf_Communication_RegistrationCompleteNotify service operation. If the authentication/security procedure fails, then the registration may be rejected, and the new AMF 155 may invoke the Namf_Communication_RegistrationCompleteNotify service operation with a reject indication reason code towards the old AMF 155. The old AMF 155 may continue as if the UE 100 context transfer service operation was never received. If one or more of the S-NSSAIs used in the old registration area may not be served in the target registration area, the new AMF 155 may determine which PDU session may not be supported in the new registration area. The new AMF 155 may invoke the Namf_Communication_RegistrationCompleteNotify service operation including the rejected PDU session ID and a reject cause (e.g. the S-NSSAI becomes no longer available) towards the old AMF 155. The new AMF 155 may modify the PDU session status correspondingly. The old AMF 155 may inform the corresponding SMF 160(s) to locally release the UE's SM context by invoking the Nsmf_PDUSession_ReleaseSMContext service operation.

In an example, the new AMF 155 may send to the UE 100 an identity request/response 840 (e.g., PEI). If the PEI was not provided by the UE 100 nor retrieved from the old AMF 155, the identity request procedure may be initiated by AMF 155 sending an identity request message to the UE 100 to retrieve the PEI. The PEI may be transferred encrypted unless the UE 100 performs emergency registration and may not be authenticated. For an emergency registration, the UE 100 may have included the PEI in the registration request.

In an example, the new AMF 155 may initiate ME identity check 845 by invoking the N5g-eir_EquipmentIdentityCheck_Get service operation 845.

In an example, the new AMF 155, based on the SUPI, may select 905 a UDM 140. The UDM 140 may select a UDR instance. In an example, the AMF 155 may select a UDM 140.

In an example, if the AMF 155 has changed since the last registration procedure, or if the UE 100 provides a SUPI which may not refer to a valid context in the AMF 155, or if the UE 100 registers to the same AMF 155 it has already registered to a non-3GPP access (e.g., the UE 100 is registered over a non-3GPP access and may initiate the registration procedure to add a 3GPP access), the new AMF 155 may register with the UDM 140 using Nudm_UECM_Registration 910 and may subscribe to be notified when the UDM 140 may deregister the AMF 155. The UDM 140 may store the AMF 155 identity associated to the access type and may not remove the AMF 155 identity associated to the other access type. The UDM 140 may store information provided at registration in UDR, by Nudr_UDM_Update. In an example, the AMF 155 may retrieve the access and mobility subscription data and SMF 160 selection subscription data using Nudm_SDM_Get 915. The UDM 140 may retrieve this information from UDR by Nudr_UDM_Query (access and mobility subscription data). After a successful response is received, the AMF 155 may subscribe to be notified using Nudm_SDM_Subscribe 920 when the data requested may be modified. The UDM 140 may subscribe to UDR by Nudr_UDM_Subscribe. The GPSI may be provided to the AMF 155 in the subscription data from the UDM 140 if the GPSI is available in the UE 100 subscription data. In an example, the new AMF 155 may provide the access type it serves for the UE 100 to the UDM 140 and the access type may be set to 3GPP access. The UDM 140 may store the associated access type together with the serving AMF 155 in UDR by Nudr_UDM_Update. The new AMF 155 may create an MM context for the UE 100 after getting the mobility subscription data from the UDM 140. In an example, when the UDM 140 stores the associated access type together with the serving AMF 155, the UDM 140 may initiate a Nudm_UECM_DeregistrationNotification 921 to the old AMF 155 corresponding to 3GPP access. The old AMF 155 may remove the MM context of the UE. If the serving NF removal reason indicated by the UDM 140 is initial registration, then the old AMF 155 may invoke the Namf_EventExposure_Notify service operation towards all the associated SMF 160s of the UE 100 to notify that the UE 100 is deregistered from old AMF 155. The SMF 160 may release the PDU session(s) on getting this notification. In an example, the old AMF 155 may unsubscribe with the UDM 140 for subscription data using Nudm_SDM_unsubscribe 922.

In an example, if the AMF 155 decides to initiate PCF 135 communication, e.g. the AMF 155 has not yet obtained access and mobility policy for the UE 100 or if the access and mobility policy in the AMF 155 are no longer valid, the AMF 155 may select 925 a PCF 135. If the new AMF 155 receives a PCF ID from the old AMF 155 and successfully contacts the PCF 135 identified by the PCF ID, the AMF 155 may select the (V-)PCF identified by the PCF ID. If the PCF 135 identified by the PCF ID may not be used (e.g. no response from the PCF 135) or if there is no PCF ID received from the old AMF 155, the AMF 155 may select 925 a PCF 135.

In an example, the new AMF 155 may perform a policy association establishment 930 during registration procedure. If the new AMF 155 contacts the PCF 135 identified by the (V-)PCF ID received during inter-AMF 155 mobility, the new AMF 155 may include the PCF-ID in the Npcf_AMPolicyControl Get operation. If the AMF 155 notifies the mobility restrictions (e.g. UE 100 location) to the PCF 135 for adjustment, or if the PCF 135 updates the mobility restrictions itself due to some conditions (e.g. application in use, time and date), the PCF 135 may provide the updated mobility restrictions to the AMF 155.

In an example, the PCF 135 may invoke Namf_EventExposure_Subscribe service operation 935 for UE 100 event subscription.

In an example, the AMF 155 may send to the SMF 160 a Nsmf_PDUSession_UpdateSMContext 936. In an example, the AMF 155 may invoke the Nsmf_PDUSession_UpdateSMContext if the PDU session(s) to be re-activated is included in the registration request. The AMF 155 may send Nsmf_PDUSession_UpdateSMContext request to SMF 160(s) associated with the PDU session(s) to activate user plane connections of the PDU session(s). The SMF 160 may decide to trigger e.g. the intermediate UPF 110 insertion, removal or change of PSA. In the case that the intermediate UPF 110 insertion, removal, or relocation is performed for the PDU session(s) not included in PDU session(s) to be re-activated, the procedure may be performed without N11 and N2 interactions to update the N3 user plane between (R)AN 105 and 5GC. The AMF 155 may invoke the Nsmf_PDUSession_ReleaseSMContext service operation towards the SMF 160 if any PDU session status indicates that it is released at the UE 100. The AMF 155 may invoke the Nsmf_PDUSession_ReleaseSMContext service operation towards the SMF 160 in order to release any network resources related to the PDU session.

In an example, the new AMF 155 may send to a N3IWF an N2 AMF 155 mobility request 940. If the AMF 155 has changed, the new AMF 155 may create an NGAP UE 100 association towards the N3IWF to which the UE 100 is connected. In an example, the N3IWF may respond to the new AMF 155 with an N2 AMF 155 mobility response 940.

In an example, the new AMF 155 may send to the UE 100 a registration accept 955 (comprising: 5G-GUTI, registration area, mobility restrictions, PDU session status, allowed NSSAI, [mapping of allowed NSSAI], periodic registration update timer, LADN information and accepted MICO mode, IMS voice over PS session supported indication, emergency service support indicator, and/or the like). In an example, the AMF 155 may send the registration accept message to the UE 100 indicating that the registration request has been accepted. 5G-GUTI may be included if the AMF 155 allocates a new 5G-GUTI. If the AMF 155 allocates a new registration area, it may send the registration area to the UE 100 via registration accept message 955. If there is no registration area included in the registration accept message, the UE 100 may consider the old registration area as valid. In an example, mobility restrictions may be included in case mobility restrictions may apply for the UE 100 and registration type may not be emergency registration. The AMF 155 may indicate the established PDU sessions to the UE 100 in the PDU session status. The UE 100 may remove locally any internal resources related to PDU sessions that are not marked as established in the received PDU session status. In an example, when the UE 100 is connected to the two AMF 155 belonging to different PLMN via 3GPP access and non-3GPP access then the UE 100 may remove locally any internal resources related to the PDU session of the current PLMN that are not marked as established in received PDU session status. If the PDU session status information was in the registration request, the AMF 155 may indicate the PDU session status to the UE. The mapping of allowed NSSAI may be the mapping of each S-NSSAI of the allowed NSSAI to the S-NSSAIs of the configured NSSAI for the HPLMN. The AMF 155 may include in the registration accept message 955 the LADN information for LADNs that are available within the registration area determined by the AMF 155 for the UE. If the UE 100 included MICO mode in the request, then AMF 155 may respond whether MICO mode may be used. The AMF 155 may set the IMS voice over PS session supported Indication. In an example, in order to set the IMS voice over PS session supported indication, the AMF 155 may perform a UE/RAN radio information and compatibility request procedure to check the compatibility of the UE 100 and RAN radio capabilities related to IMS voice over PS. In an example, the emergency service support indicator may inform the UE 100 that emergency services are supported, e.g., the UE 100 may request PDU session for emergency services. In an example, the handover restriction list and UE-AMBR may be provided to NG-RAN by the AMF 155.

In an example, the UE 100 may send to the new AMF 155 a registration complete 960 message. In an example, the UE 100 may send the registration complete message 960 to the AMF 155 to acknowledge that a new 5G-GUTI may be assigned. In an example, when information about the PDU session(s) to be re-activated is not included in the registration request, the AMF 155 may release the signaling connection with the UE 100. In an example, when the follow-on request is included in the registration request, the AMF 155 may not release the signaling connection after the completion of the registration procedure. In an example, if the AMF 155 is aware that some signaling is pending in the AMF 155 or between the UE 100 and the 5GC, the AMF 155 may not release the signaling connection after the completion of the registration procedure.

Figure 10:
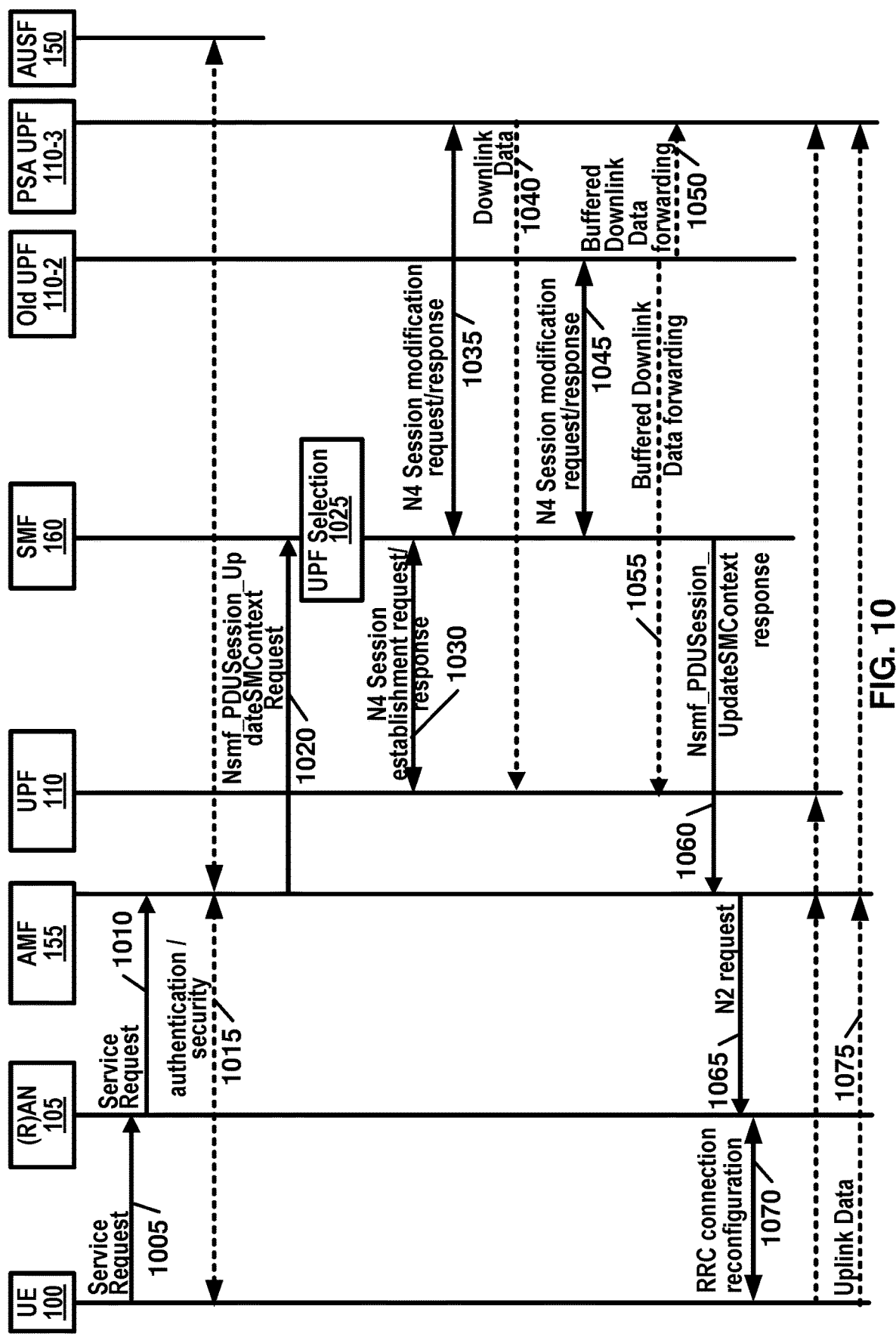
FIG. 10 is an example call flow as per an aspect of an embodiment of the present disclosure.
Figure 11:
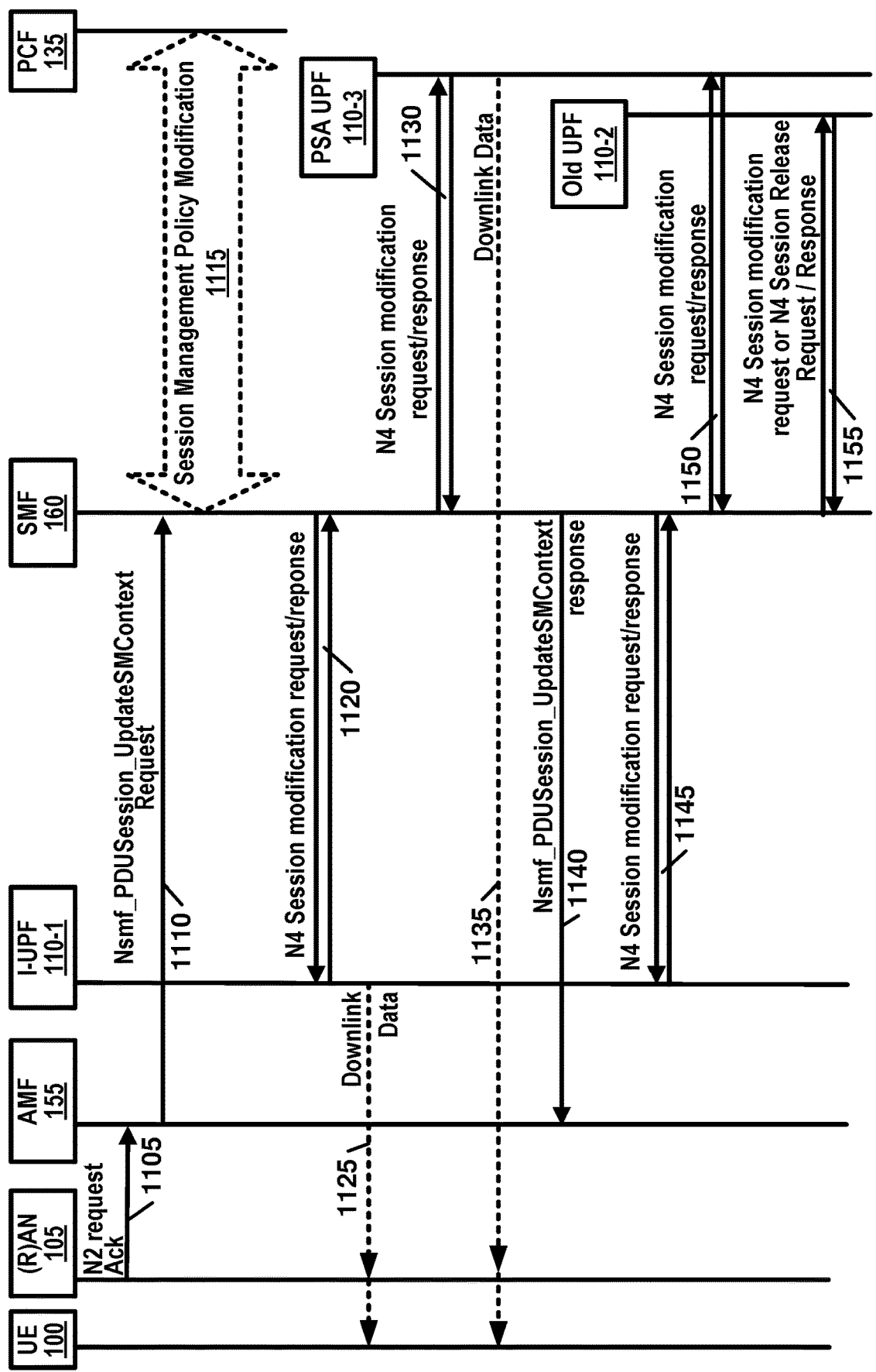
FIG. 11 is an example call flow as per an aspect of an embodiment of the present disclosure.

As depicted in example FIG. 10 and FIG. 11, a service request procedure e.g., a UE 100 triggered service request procedure may be used by a UE 100 in CM-IDLE state to request the establishment of a secure connection to an AMF 155. FIG. 11 is continuation of FIG. 10 depicting the service request procedure. The service request procedure may be used to activate a user plane connection for an established PDU session. The service request procedure may be triggered by the UE 100 or the 5GC, and may be used when the UE 100 is in CM-IDLE and/or in CM-CONNECTED and may allow selectively to activate user plane connections for some of the established PDU sessions.

In an example, a UE 100 in CM IDLE state may initiate the service request procedure to send uplink signaling messages, user data, and/or the like, as a response to a network paging request, and/or the like. In an example, after receiving the service request message, the AMF 155 may perform authentication. In an example, after the establishment of signaling connection to the AMF 155, the UE 100 or network may send signaling messages, e.g. PDU session establishment from the UE 100 to a SMF 160, via the AMF 155.

In an example, for any service request, the AMF 155 may respond with a service accept message to synchronize PDU session status between the UE 100 and network. The AMF 155 may respond with a service reject message to the UE 100, if the service request may not be accepted by the network. The service reject message may include an indication or cause code requesting the UE 100 to perform a registration update procedure. In an example, for service request due to user data, network may take further actions if user plane connection activation may not be successful. In an example FIG. 10 and FIG. 11, more than one UPF, e.g., old UPF 110-2 and PDU session Anchor PSA UPF 110-3 may be involved.

In an example, the UE 100 may send to a (R)AN 105 a message comprising AN parameters, mobility management, MM NAS service request 1005 (e.g., list of PDU sessions to be activated, list of allowed PDU sessions, security parameters, PDU session status, and/or the like), and/or the like. In an example, the UE 100 may provide the list of PDU sessions to be activated when the UE 100 may re-activate the PDU session(s). The list of allowed PDU sessions may be provided by the UE 100 when the service request may be a response of a paging or a NAS notification, and may identify the PDU sessions that may be transferred or associated to the access on which the service request may be sent. In an example, for the case of NG-RAN, the AN parameters may include selected PLMN ID, and an establishment cause. The establishment cause may provide the reason for requesting the establishment of an RRC connection. The UE 100 may send NAS service request message towards the AMF 155 encapsulated in an RRC message to the RAN 105.

In an example, if the service request may be triggered for user data, the UE 100 may identify, using the list of PDU sessions to be activated, the PDU session(s) for which the UP connections are to be activated in the NAS service request message. If the service request may be triggered for signaling, the UE 100 may not identify any PDU session(s). If this procedure may be triggered for paging response, and/or the UE 100 may have at the same time user data to be transferred, the UE 100 may identify the PDU session(s) whose UP connections may be activated in MM NAS service request message, by the list of PDU sessions to be activated.

In an example, if the service request over 3GPP access may be triggered in response to a paging indicating non- 3GPP access, the NAS service request message may identify in the list of allowed PDU sessions the list of PDU sessions associated with the non-3GPP access that may be re-activated over 3GPP. In an example, the PDU session status may indicate the PDU sessions available in the UE 100. In an example, the UE 100 may not trigger the service request procedure for a PDU session corresponding to a LADN when the UE 100 may be outside the area of availability of the LADN. The UE 100 may not identify such PDU session(s) in the list of PDU sessions to be activated, if the service request may be triggered for other reasons.

In an example, the (R)AN 105 may send to AMF 155 an N2 Message 1010 (e.g., a service request) comprising N2 parameters, MM NAS service request, and/or the like. The AMF 155 may reject the N2 message if it may not be able to handle the service request. In an example, if NG-RAN may be used, the N2 parameters may include the 5G-GUTI, selected PLMN ID, location information, RAT type, establishment cause, and/or the like. In an example, the 5G-GUTI may be obtained in RRC procedure and the (R)AN 105 may select the AMF 155 according to the 5G-GUTI. In an example, the location information and RAT type may relate to the cell in which the UE 100 may be camping. In an example, based on the PDU session status, the AMF 155 may initiate PDU session release procedure in the network for the PDU sessions whose PDU session ID(s) may be indicated by the UE 100 as not available.

In an example, if the service request was not sent integrity protected or integrity protection verification failed, the AMF 155 may initiate a NAS authentication/security procedure 1015.

In an example, if the UE 100 triggers the service request to establish a signaling connection, upon successful establishment of the signaling connection, the UE 100 and the network may exchange NAS signaling.

In an example the AMF 155 may send to the SMF 160 a PDU session update context request 1020 e.g., Nsmf_P-DUSession_UpdateSMContext request comprising PDU session ID(s), Cause(s), UE 100 location information, access type, and/or the like.

In an example, the Nsmf_PDUSession_UpdateSMContext request may be invoked by the AMF 155 if the UE 100 may identify PDU session(s) to be activated in the NAS service request message. In an example, the Nsmf_PDUSession_UpdateSMContext request may be triggered by the SMF 160 wherein the PDU session(s) identified by the UE 100 may correlate to other PDU session ID(s) than the one triggering the procedure. In an example, the Nsmf_PDUSession_UpdateSMContext request may be triggered by the SMF 160 wherein the current UE 100 location may be outside the area of validity for the N2 information provided by the SMF 160 during a network triggered service request procedure. The AMF 155 may not send the N2 information provided by the SMF 160 during the network triggered service request procedure.

In an example, the AMF 155 may determine the PDU session(s) to be activated and may send a Nsmf_PDUSession_UpdateSMContext request to SMF 160(*s*) associated with the PDU session(s) with cause set to indicate establishment of user plane resources for the PDU session(s).

In an example, if the procedure may be triggered in response to paging indicating non-3GPP access, and the list of allowed PDU sessions provided by the UE 100 may not include the PDU session for which the UE 100 was paged, the AMF 155 may notify the SMF 160 that the user plane for the PDU session may not be re-activated. The service request procedure may succeed without re-activating the user plane of any PDU sessions, and the AMF 155 may notify the UE 100.

In an example, if the PDU session ID may correspond to a LADN and the SMF 160 may determine that the UE 100 may be outside the area of availability of the LADN based on the UE 100 location reporting from the AMF 155, the SMF 160 may decide to (based on local policies) keep the PDU session, may reject the activation of user plane connection for the PDU session and may inform the AMF 155. In an example, if the procedure may be triggered by a network triggered service request, the SMF 160 may notify the UPF 110 that originated the data notification to discard downlink data for the PDU sessions and/or to not provide further data notification messages. The SMF 160 may respond to the AMF 155 with an appropriate reject cause and the user plane activation of PDU session may be stopped.

In an example, if the PDU session ID may correspond to a LADN and the SMF 160 may determine that the UE 100 may be outside the area of availability of the LADN based on the UE 100 location reporting from the AMF 155, the SMF 160 may decide to (based on local policies) release the PDU session. The SMF 160 may locally release the PDU session and may inform the AMF 155 that the PDU session may be released. The SMF 160 may respond to the AMF 155 with an appropriate reject cause and the user plane Activation of PDU session may be stopped.

In an example, if the UP activation of the PDU session may be accepted by the SMF 160, based on the location info received from the AMF 155, the SMF 160 may check the UPF 110 Selection 1025 Criteria (e.g., slice isolation requirements, slice coexistence requirements, UPF's 110 dynamic load, UPF's 110 relative static capacity among UPFs supporting the same DNN, UPF 110 location available at the SMF 160, UE 100 location information, Capability of the UPF 110 and the functionality required for the particular UE 100 session. In an example, an appropriate UPF 110 may be selected by matching the functionality and features required for a UE 100, DNN, PDU session type (e.g. IPv4, IPv6, ethernet type or unstructured type) and if applicable, the static IP address/prefix, SSC mode selected for the PDU session, UE 100 subscription profile in UDM 140, DNAI was included in the PCC rules, local operator policies, S-NSSAI, access technology being used by the UE 100, UPF 110 logical topology, and/or the like), and may determine to perform one or more of the following: continue using the current UPF(s); may select a new intermediate UPF 110 (or add/remove an intermediate UPF 110), if the UE 100 has moved out of the service area of the UPF 110 that was previously connecting to the (R)AN 105, while maintaining the UPF(s) acting as PDU session anchor; may trigger re-establishment of the PDU session to perform relocation/reallocation of the UPF 110 acting as PDU session anchor, e.g. the UE 100 has moved out of the service area of the anchor UPF 110 which is connecting to RAN 105.

In an example, the SMF 160 may send to the UPF 110 (e.g., new intermediate UPF 110) an N4 session establishment request 1030. In an example, if the SMF 160 may select a new UPF 110 to act as intermediate UPF 110-2 for the PDU session, or if the SMF 160 may select to insert an intermediate UPF 110 for a PDU session which may not have an intermediate UPF 110-2, an N4 session establishment request 1030 message may be sent to the new UPF 110, providing packet detection, data forwarding, enforcement and reporting rules to be installed on the new intermediate UPF. The PDU session anchor addressing information (on N9) for this PDU session may be provided to the intermediate UPF 110-2.

In an example, if a new UPF 110 is selected by the SMF 160 to replace the old (intermediate) UPF 110-2, the SMF 160 may include a data forwarding indication. The data forwarding indication may indicate to the UPF 110 that a second tunnel endpoint may be reserved for buffered DL data from the old I-UPF.

In an example, the new UPF 110 (intermediate) may send to SMF 160 an N4 session establishment response message 1030. In case the UPF 110 may allocate CN tunnel info, the UPF 110 may provide DL CN tunnel info for the UPF 110 acting as PDU session anchor and UL CN tunnel info (e.g., CN N3 tunnel info) to the SMF 160. If the data forwarding indication may be received, the new (intermediate) UPF 110 acting as N3 terminating point may send DL CN tunnel info for the old (intermediate) UPF 110-2 to the SMF 160. The SMF 160 may start a timer, to release the resource in the old intermediate UPF 110-2.

In an example, if the SMF 160 may selects a new intermediate UPF 110 for the PDU session or may remove the old I-UPF 110-2, the SMF 160 may send N4 session modification request message 1035 to PDU session anchor, PSA UPF 110-3, providing the data forwarding indication and DL tunnel information from new intermediate UPF 110.

In an example, if the new intermediate UPF 110 may be added for the PDU session, the (PSA) UPF 110-3 may begin to send the DL data to the new I-UPF 110 as indicated in the DL tunnel information.

In an example, if the service request may be triggered by the network, and the SMF 160 may remove the old I-UPF 110-2 and may not replace the old I-UPF 110-2 with the new I-UPF 110, the SMF 160 may include the data forwarding indication in the request. The data forwarding indication may indicate to the (PSA) UPF 110-3 that a second tunnel endpoint may be reserved for buffered DL data from the old I-UPF 110-2. In this case, the PSA UPF 110-3 may begin to buffer the DL data it may receive at the same time from the N6 interface.

In an example, the PSA UPF 110-3 (PSA) may send to the SMF 160 an N4 session modification response 1035. In an example, if the data forwarding indication may be received, the PSA UPF 110-3 may become as N3 terminating point and may send CN DL tunnel info for the old (intermediate) UPF 110-2 to the SMF 160. The SMF 160 may start a timer, to release the resource in old intermediate UPF 110-2 if there is one.

In an example, the SMF 160 may send to the old UPF 110-2 an N4 session modification request 1045 (e.g., may comprise new UPF 110 address, new UPF 110 DL tunnel ID, and/or the like). In an example, if the service request may be triggered by the network, and/or the SMF 160 may remove the old (intermediate) UPF 110-2, the SMF 160 may send the N4 session modification request message to the old (intermediate) UPF 110-2, and may provide the DL tunnel information for the buffered DL data. If the SMF 160 may allocate new I-UPF 110, the DL tunnel information is from the new (intermediate) UPF 110 may act as N3 terminating point. If the SMF 160 may not allocate a new I-UPF 110, the DL tunnel information may be from the new UPF 110 (PSA) 110-3 acting as N3 terminating point. The SMF 160 may start a timer to monitor the forwarding tunnel. In an example, the old (intermediate) UPF 110-2 may send N4 session modification response message to the SMF 160.

In an example, if the I-UPF 110-2 may be relocated and forwarding tunnel was established to the new I-UPF 110, the old (intermediate) UPF 110-2 may forward its buffered data to the new (intermediate) UPF 110 acting as N3 terminating point. In an example, if the old I-UPF 110-2 may be removed and the new I-UPF 110 may not be assigned for the PDU session and forwarding tunnel may be established to the UPF 110 (PSA) 110-3, the old (intermediate) UPF 110-2 may forward its buffered data to the UPF 110 (PSA) 110-3 acting as N3 terminating point.

In an example, the SMF 160 may send to the AMF 155 an N11 message 1060 e.g., a Nsmf_PDUSession_UpdateSM-Context response (comprising: N1 SM container (PDU session ID, PDU session re-establishment indication), N2 SM information (PDU session ID, QoS profile, CN N3 tunnel info, S-NSSAI), Cause), upon reception of the Nsmf_PDUSession_UpdateSMContext request with a cause including e.g., establishment of user plane resources. The SMF 160 may determine whether UPF 110 reallocation may be performed, based on the UE 100 location information, UPF 110 service area and operator policies. In an example, for a PDU session that the SMF 160 may determine to be served by the current UPF 110, e.g., PDU session anchor or intermediate UPF, the SMF 160 may generate N2 SM information and may send a Nsmf_PDUSession_UpdateSMContext response 1060 to the AMF 155 to establish the user plane(s). The N2 SM information may contain information that the AMF 155 may provide to the RAN 105. In an example, for a PDU session that the SMF 160 may determine as requiring a UPF 110 relocation for PDU session anchor UPF, the SMF 160 may reject the activation of UP of the PDU session by sending Nsmf_PDUSession_UpdateSMContext response that may contain N1 SM container to the UE 100 via the AMF 155. The N1 SM container may include the corresponding PDU session ID and PDU session re-establishment indication.

Upon reception of the Namf_EventExposure_Notify from the AMF 155 to the SMF 160, with an indication that the UE 100 is reachable, if the SMF 160 may have pending DL data, the SMF 160 may invoke the Namf_Communication_N1N2MessageTransfer service operation to the AMF 155 to establish the user plane(s) for the PDU sessions. In an example, the SMF 160 may resume sending DL data notifications to the AMF 155 in case of DL data.

In an example, the SMF 160 may send a message to the AMF 155 to reject the activation of UP of the PDU session by including a cause in the Nsmf_PDUSession_UpdateSMContext response if the PDU session may correspond to a LADN and the UE 100 may be outside the area of availability of the LADN, or if the AMF 155 may notify the SMF 160 that the UE 100 may be reachable for regulatory prioritized service, and the PDU session to be activated may not for a regulatory prioritized service; or if the SMF 160 may decide to perform PSA UPF 110-3 relocation for the requested PDU session.

In an example, the AMF 155 may send to the (R)AN 105 an N2 request message 1065 (e.g., N2 SM information received from SMF 160, security context, AMF 155 signaling connection ID, handover restriction list, MM NAS service accept, list of recommended cells/TAs/NG-RAN node identifiers). In an example, the RAN 105 may store the security context, AMF 155 signaling connection Id, QoS information for the QoS flows of the PDU sessions that may be activated and N3 tunnel IDs in the UE 100 RAN 105 context. In an example, the MM NAS service accept may include PDU session status in the AMF 155. If the activation of UP of a PDU session may be rejected by the SMF 160, the MM NAS service accept may include the PDU session ID and the reason why the user plane resources may not be activated (e.g. LADN not available). Local PDU session release during the session request procedure may be indicated to the UE 100 via the session Status.

In an example, if there are multiple PDU sessions that may involve multiple SMF 160s, the AMF 155 may not wait for responses from all SMF 160s before it may send N2 SM information to the UE 100. The AMF 155 may wait for all responses from the SMF 160s before it may send MM NAS service accept message to the UE 100.

In an example, the AMF 155 may include at least one N2 SM information from the SMF 160 if the procedure may be triggered for PDU session user plane activation. AMF 155 may send additional N2 SM information from SMF 160s in separate N2 message(s) (e.g. N2 tunnel setup request), if there is any. Alternatively, if multiple SMF 160s may be involved, the AMF 155 may send one N2 request message to (R)AN 105 after all the Nsmf_PDUSession_UpdateSMContext response service operations from all the SMF 160s associated with the UE 100 may be received. In such case, the N2 request message may include the N2 SM information received in each of the Nsmf_PDUSession_UpdateSMContext response and PDU session ID to enable AMF 155 to associate responses to relevant SMF 160.

In an example, if the RAN 105 (e.g., NG RAN) node may provide the list of recommended cells/TAs/NG-RAN node identifiers during the AN release procedure, the AMF 155 may include the information from the list in the N2 request. The RAN 105 may use this information to allocate the RAN 105 notification area when the RAN 105 may decide to enable RRC inactive state for the UE 100.

If the AMF 155 may receive an indication, from the SMF 160 during a PDU session establishment procedure that the UE 100 may be using a PDU session related to latency sensitive services, for any of the PDU sessions established for the UE 100 and the AMF 155 has received an indication from the UE 100 that may support the CM-CONNECTED with RRC inactive state, then the AMF 155 may include the UE's RRC inactive assistance information. In an example, the AMF 155 based on network configuration, may include the UE's RRC inactive assistance information.

In an example, the (R)AN 105 may send to the UE 100 a message to perform RRC connection reconfiguration 1070 with the UE 100 depending on the QoS information for all the QoS flows of the PDU sessions whose UP connections may be activated and data radio bearers. In an example, the user plane security may be established.

In an example, if the N2 request may include a MM NAS service accept message, the RAN 105 may forward the MM NAS service accept to the UE 100. The UE 100 may locally delete context of PDU sessions that may not be available in 5GC.

In an example, if the N1 SM information may be transmitted to the UE 100 and may indicate that some PDU session(s) may be re-established, the UE 100 may initiate PDU session re-establishment for the PDU session(s) that may be re-established after the service request procedure may be complete.

In an example, after the user plane radio resources may be setup, the uplink data from the UE 100 may be forwarded to the RAN 105. The RAN 105 (e.g., NG-RAN) may send the uplink data to the UPF 110 address and tunnel ID provided.

In an example, the (R)AN 105 may send to the AMF 155 an N2 request Ack 1105 (e.g., N2 SM information (comprising: AN tunnel info, list of accepted QoS flows for the PDU sessions whose UP connections are activated, list of rejected QoS flows for the PDU sessions whose UP connections are activated)). In an example, the N2 request message may include N2 SM information(s), e.g. AN tunnel info. RAN 105 may respond N2 SM information with separate N2 message (e.g. N2 tunnel setup response). In an example, if multiple N2 SM information are included in the N2 request message, the N2 request Ack may include multiple N2 SM information and information to enable the AMF 155 to associate the responses to relevant SMF 160.

In an example, the AMF 155 may send to the SMF 160 a Nsmf_PDUSession_UpdateSMContext request 1110 (N2 SM information (AN tunnel info), RAT type) per PDU session. If the AMF 155 may receive N2 SM information (one or multiple) from the RAN 105, then the AMF 155 may forward the N2 SM information to the relevant SMF 160. If the UE 100 time zone may change compared to the last reported UE 100 Time Zone, then the AMF 155 may include the UE 100 time zone IE in the Nsmf_PDUSession_UpdateSMContext request message.

In an example, if dynamic PCC is deployed, the SMF 160 may initiate notification about new location information to the PCF 135 (if subscribed) by invoking an event exposure notification operation (e.g., a Nsmf_EventExposure_Notify service operation). The PCF 135 may provide updated policies by invoking a policy control update notification message 1115 (e.g., a Npcf_SMPolicyControl_UpdateNotify operation).

In an example, if the SMF 160 may select a new UPF 110 to act as intermediate UPF 110 for the PDU session, the SMF 160 may initiates an N4 session modification procedure 1120 to the new I-UPF 110 and may provide AN tunnel info. The downlink data from the new I-UPF 110 may be forwarded to RAN 105 and UE 100. In an example, the UPF 110 may send to the SMF 160, an N4 session modification response 1120. In an example, the SMF 160 may send to the AMF 155, a Nsmf_PDUSession_UpdateSMContext response 1140.

In an example, if forwarding tunnel may be established to the new I-UPF 110 and if the timer SMF 160 set for forwarding tunnel may be expired, the SMF 160 may sends N4 session modification request 1145 to new (intermediate) UPF 110 acting as N3 terminating point to release the forwarding tunnel. In an example, the new (intermediate) UPF 110 may send to the SMF 160 an N4 session modification response 1145. In an example, the SMF 160 may send to the PSA UPF 110-3 an N4 session modification request 1150, or N4 session release request. In an example, if the SMF 160 may continue using the old UPF 110-2, the SMF 160 may send an N4 session modification request 1155, providing AN tunnel info. In an example, if the SMF 160 may select a new UPF 110 to act as intermediate UPF 110, and the old UPF 110-2 may not be PSA UPF 110-3, the SMF 160 may initiate resource release, after timer expires, by sending an N4 session release request (release cause) to the old intermediate UPF 110-2.

In an example, the old intermediate UPF 110-2 may send to the SMF 160 an N4 session modification response or N4 session release response 1155. The old UPF 110-2 may acknowledge with the N4 session modification response or N4 session release response message to confirm the modification or release of resources. The AMF 155 may invoke the Namf_EventExposure_Notify service operation to notify the mobility related events, after this procedure may complete, towards the NFs that may have subscribed for the events. In an example, the AMF 155 may invoke the Namf_EventExposure_Notify towards the SMF 160 if the SMF 160 had subscribed for UE 100 moving into or out of area of interest and if the UE's current location may indicate that it may be moving into or moving outside of the area of interest subscribed, or if the SMF 160 had subscribed for LADN DNN and if the UE 100 may be moving into or outside of an area where the LADN is available, or if the UE 100 may be in MICO mode and the AMF 155 had notified an SMF 160 of the UE 100 being unreachable and that SMF 160 may not send DL data notifications to the AMF 155, and the AMF 155 may informs the SMF 160 that the UE 100 is reachable, or if the SMF 160 had subscribed for UE 100 reachability status, then the AMF 155 may notify the UE 100 reachability.

Figure 12:
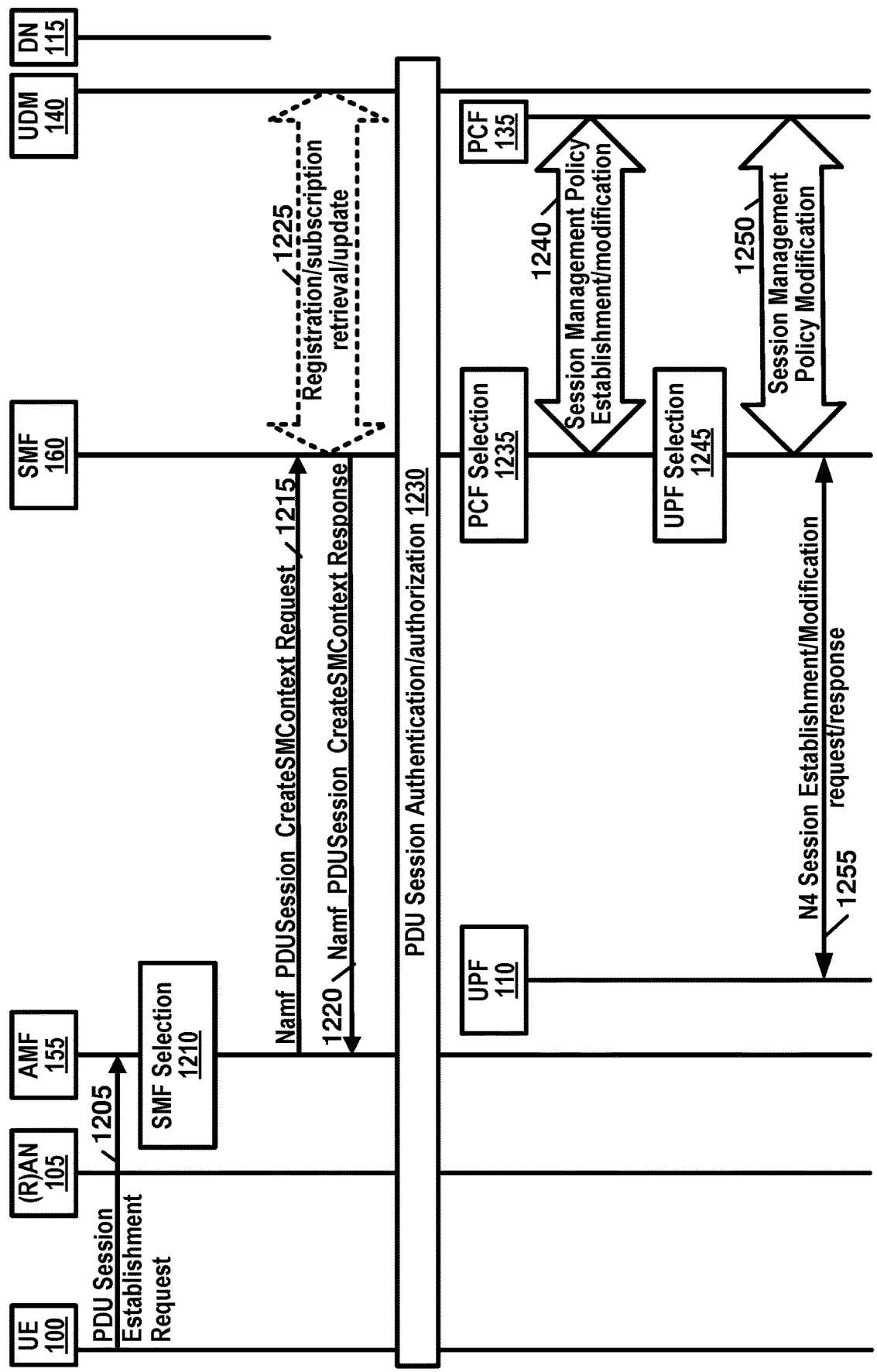
FIG. 12 is an example call flow as per an aspect of an embodiment of the present disclosure.
Figure 13:
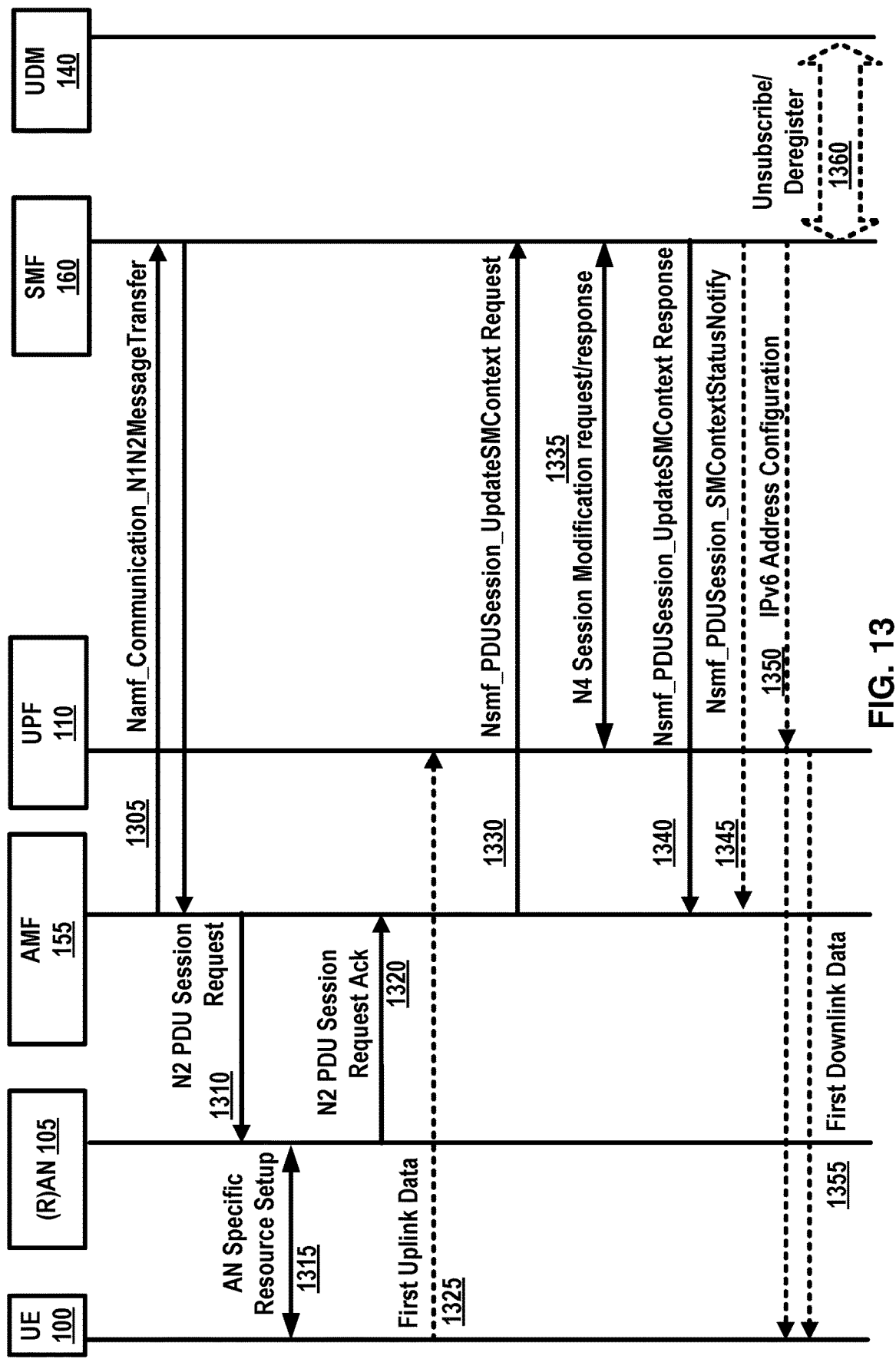
FIG. 13 is an example call flow as per an aspect of an embodiment of the present disclosure.

An example PDU session establishment procedure depicted in FIG. 12 and FIG. 13. In an example embodiment, when the PDU session establishment procedure may be employed, the UE 100 may send to the AMF 155 a NAS Message 1205 (or a SM NAS message) comprising NSSAI, S-NSSAI (e.g., requested S-NSSAI, allowed S-NSSAI, subscribed S-NSSAI, and/or the like), DNN, PDU session ID, request type, old PDU session ID, N1 SM container (PDU session establishment request), and/or the like. In an example, the UE 100, in order to establish a new PDU session, may generate a new PDU session ID. In an example, when emergency service may be required and an emergency PDU session may not already be established, the UE 100 may initiate the UE 100 requested PDU session establishment procedure with a request type indicating emergency request. In an example, the UE 100 may initiate the UE 100 requested PDU session establishment procedure by the transmission of the NAS message containing a PDU session establishment request within the N1 SM container. The PDU session establishment request may include a PDU type, SSC mode, protocol configuration options, and/or the like. In an example, the request type may indicate initial request if the PDU session establishment is a request to establish the new PDU session and may indicate existing PDU session if the request refers to an existing PDU session between 3GPP access and non-3GPP access or to an existing PDN connection in EPC. In an example, the request type may indicate emergency request if the PDU session establishment may be a request to establish a PDU session for emergency services. The request type may indicate existing emergency PDU session if the request refers to an existing PDU session for emergency services between 3GPP access and non-3GPP access. In an example, the NAS message sent by the UE 100 may be encapsulated by the AN in a N2 message towards the AMF 155 that may include user location information and access technology type information. In an example, the PDU session establishment request message may contain SM PDU DN request container containing information for the PDU session authorization by the external DN. In an example, if the procedure may be triggered for SSC mode 3 operation, the UE 100 may include the old PDU session ID which may indicate the PDU session ID of the on-going PDU session to be released, in the NAS message. The old PDU session ID may be an optional parameter which may be included in this case. In an example, the AMF 155 may receive from the AN the NAS message (e.g., NAS SM message) together with user location information (e.g. cell ID in case of the RAN 105). In an example, the UE 100 may not trigger a PDU session establishment for a PDU session corresponding to a LADN when the UE 100 is outside the area of availability of the LADN.

In an example, the AMF 155 may determine that the NAS message or the SM NAS message may correspond to the request for the new PDU session based on that request type indicates initial request and that the PDU session ID may not be used for any existing PDU session(s) of the UE 100. If the NAS message does not contain an S-NSSAI, the AMF 155 may determine a default S-NSSAI for the requested PDU session either according to the UE 100 subscription, if it may contain only one default S-NSSAI, or based on operator policy. In an example, the AMF 155 may perform SMF 160 selection 1210 and select an SMF 160. If the request type may indicate initial request or the request may be due to handover from EPS, the AMF 155 may store an association of the S-NSSAI, the PDU session ID and a SMF 160 ID. In an example, if the request type is initial request and if the old PDU session ID indicating the existing PDU session may be contained in the message, the AMF 155 may select the SMF 160 and may store an association of the new PDU session ID and the selected SMF 160 ID.

In an example, the AMF 155 may send to the SMF 160, an N11 message 1215, e.g., Nsmf_PDUSession_CreateSMContext request (comprising: SUPI or PEI, DNN, S-NSSAI, PDU session ID, AMF 155 ID, request type, N1 SM container (PDU session establishment request), user location information, access type, PEI, GPSI), or Nsmf_PDUSession_UpdateSMContext request (SUPI, DNN, S-NSSAI, PDU session ID, AMF 155 ID, request type, N1 SM container (PDU session establishment request), user location information, access type, RAT type, PEI). In an example, if the AMF 155 may not have an association with the SMF 160 for the PDU session ID provided by the UE 100 (e.g. when request type indicates initial request), the AMF 155 may invoke the Nsmf_PDUSession_CreateSMContext request, but if the AMF 155 already has an association with an SMF 160 for the PDU session ID provided by the UE 100 (e.g. when request type indicates existing PDU session), the AMF 155 may invoke the Nsmf_PDUSession_UpdateSMContext request. In an example, the AMF 155 ID may be the UE's GUAMI which uniquely identifies the AMF 155 serving the UE 100. The AMF 155 may forward the PDU session ID together with the N1 SM container containing the PDU session establishment request received from the UE 100. The AMF 155 may provide the PEI instead of the SUPI when the UE 100 has registered for emergency services without providing the SUPT. In case the UE 100 has registered for emergency services but has not been authenticated, the AMF 155 may indicate that the SUPI has not been authenticated.

In an example, if the request type may indicate neither emergency request nor existing emergency PDU session and, if the SMF 160 has not yet registered and subscription data may not be available, the SMF 160 may register with the UDM 140, and may retrieve subscription data 1225 and subscribes to be notified when subscription data may be modified. In an example, if the request type may indicate existing PDU session or existing emergency PDU session, the SMF 160 may determine that the request may be due to handover between 3GPP access and non-3GPP access or due to handover from EPS. The SMF 160 may identify the existing PDU session based on the PDU session ID. The SMF 160 may not create a new SM context but instead may update the existing SM context and may provide the representation of the updated SM context to the AMF 155 in the response. if the request type may be initial request and if the old PDU session ID may be included in Nsmf_PDUSession_CreateSMContext request, the SMF 160 may identify the existing PDU session to be released based on the old PDU session ID.

In an example, the SMF 160 may send to the AMF 155, the N11 message response 1220, e.g., either a PDU session create/update response, Nsmf_PDUSession_CreateSMContext response 1220 (cause, SM context ID or N1 SM container (PDU session reject(cause))) or a Nsmf_PDUSession_UpdateSMContext response.

In an example, if the SMF 160 may perform secondary authorization/authentication 1230 during the establishment of the PDU session by a DN-AAA server, the SMF 160 may select a UPF 110 and may trigger a PDU session establishment authentication/authorization.

In an example, if the request type may indicate initial request, the SMF 160 may select an SSC mode for the PDU session. The SMF 160 may select one or more UPFs as needed. In case of PDU type IPv4 or IPv6, the SMF 160 may allocate an IP address/prefix for the PDU session. In case of PDU type IPv6, the SMF 160 may allocate an interface identifier to the UE 100 for the UE 100 to build its link-local address. For Unstructured PDU type the SMF 160 may allocate an IPv6 prefix for the PDU session and N6 point-to-point tunneling (based on UDP/IPv6).

In an example, if dynamic PCC is deployed, the may SMF 160 performs PCF 135 selection 1235. If the request type indicates existing PDU session or existing emergency PDU session, the SMF 160 may use the PCF 135 already selected for the PDU session. If dynamic PCC is not deployed, the SMF 160 may apply local policy.

In an example, the SMF 160 may perform a session management policy establishment procedure 1240 to establish a PDU session with the PCF 135 and may get the default PCC Rules for the PDU session. The GPSI may be included if available at the SMF 160. If the request type in 1215 indicates existing PDU session, the SMF 160 may notify an event previously subscribed by the PCF 135 by a session management policy modification procedure and the PCF 135 may update policy information in the SMF 160. The PCF 135 may provide authorized session-AMBR and the authorized 5QI and ARP to SMF 160. The PCF 135 may subscribe to the IP allocation/release event in the SMF 160 (and may subscribe other events).

In an example, the PCF 135, based on the emergency DNN, may set the ARP of the PCC rules to a value that may be reserved for emergency services.

In an example, if the request type in 1215 indicates initial request, the SMF 160 may select an SSC mode for the PDU session. The SMF 160 may select 1245 one or more UPFs as needed. In case of PDU type IPv4 or IPv6, the SMF 160 may allocate an IP address/prefix for the PDU session. In case of PDU type IPv6, the SMF 160 may allocate an interface identifier to the UE 100 for the UE 100 to build its link-local address. For unstructured PDU type the SMF 160 may allocate an IPv6 prefix for the PDU session and N6 point-to-point tunneling (e.g., based on UDP/IPv6). In an example, for Ethernet PDU type PDU session, neither a MAC nor an IP address may be allocated by the SMF 160 to the UE 100 for this PDU session.

In an example, if the request type in 1215 is existing PDU session, the SMF 160 may maintain the same IP address/prefix that may be allocated to the UE 100 in the source network.

In an example, if the request type in 1215 indicates existing PDU session referring to an existing PDU session moved between 3GPP access and non-3GPP access, the SMF 160 may maintain the SSC mode of the PDU session, e.g., the current PDU session Anchor and IP address. In an example, the SMF 160 may trigger e.g. new intermediate UPF 110 insertion or allocation of a new UPF 110. In an example, if the request type indicates emergency request, the SMF 160 may select 1245 the UPF 110 and may select SSC mode 1.

In an example, the SMF 160 may perform a session management policy modification 1250 procedure to report some event to the PCF 135 that has previously subscribed. If request type is initial request and dynamic PCC is deployed and PDU type is IPv4 or IPv6, the SMF 160 may notify the PCF 135 (that has previously subscribed) with the allocated UE 100 IP address/prefix.

In an example, the PCF 135 may provide updated policies to the SMF 160. The PCF 135 may provide authorized session-AMBR and the authorized 5QI and ARP to the SMF 160.

In an example, if request type indicates initial request, the SMF 160 may initiate an N4 session establishment procedure 1255 with the selected UPF 110. The SMF 160 may initiate an N4 session modification procedure with the selected UPF 110. In an example, the SMF 160 may send an N4 session establishment/modification request 1255 to the UPF 110 and may provide packet detection, enforcement, reporting rules, and/or the like to be installed on the UPF 110 for this PDU session. If CN tunnel info is allocated by the SMF 160, the CN tunnel info may be provided to the UPF 110. If the selective user plane deactivation is required for this PDU session, the SMF 160 may determine the Inactivity Timer and may provide it to the UPF 110. In an example, the UPF 110 may acknowledges by sending an N4 session establishment/modification response 1255. If CN tunnel info is allocated by the UPF, the CN tunnel info may be provided to SMF 160. In an example, if multiple UPFs are selected for the PDU session, the SMF 160 may initiate N4 session establishment/modification procedure 1255 with each UPF 110 of the PDU session.

In an example, the SMF 160 may send to the AMF 155 an Namf_Communication_N1N2MessageTransfer 1305 message (comprising PDU session ID, access type, N2 SM information (PDU session ID, QFI(s), QoS profile(s), CN tunnel info, S-NSSAI, session-AMBR, PDU session type, and/or the like), N1 SM container (PDU session establishment accept (QoS Rule(s), selected SSC mode, S-NSSAI, allocated IPv4 address, interface identifier, session-AMBR, selected PDU session type, and/or the like))). In case of multiple UPFs are used for the PDU session, the CN tunnel info may comprise tunnel information related with the UPF 110 that terminates N3. In an example, the N2 SM information may carry information that the AMF 155 may forward to the (R)AN 105 (e.g., the CN tunnel info corresponding to the core network address of the N3 tunnel corresponding to the PDU session, one or multiple QoS profiles and the corresponding QFIs may be provided to the (R)AN 105, the PDU session ID may be used by AN signaling with the UE 100 to indicate to the UE 100 the association between AN resources and a PDU session for the UE 100, and/or the like). In an example, a PDU session may be associated to an S-NSSAI and a DNN. In an example, the N1 SM container may contain the PDU session establishment accept that the AMF 155 may provide to the UE 100. In an example, multiple QoS rules and QoS profiles may be included in the PDU session establishment accept within the N1 SM and in the N2 SM information. In an example, the Namf_Communication_N1N2MessageTransfer 1305 may further comprise the PDU session ID and information allowing the AMF 155 to know which access towards the UE 100 to use.

In an example, the AMF 155 may send to the (R)AN 105 an N2 PDU session request 1310 (comprising N2 SM information, NAS message (PDU session ID, N1 SM container (PDU session establishment accept, and/or the like))). In an example, the AMF 155 may send the NAS message 1310 that may comprise PDU session ID and PDU session establishment accept targeted to the UE 100 and the N2 SM information received from the SMF 160 within the N2 PDU session request 1310 to the (R)AN 105.

In an example, the (R)AN 105 may issue AN specific signaling exchange 1315 with the UE 100 that may be related with the information received from SMF 160. In an example, in case of a 3GPP RAN 105, an RRC connection reconfiguration procedure may take place with the UE 100 to establish the necessary RAN 105 resources related to the QoS Rules for the PDU session request 1310. In an example, (R)AN 105 may allocate (R)AN 105 N3 tunnel information for the PDU session. In case of dual connectivity, the master RAN 105 node may assign some (zero or more) QFIs to be setup to a master RAN 105 node and others to the secondary RAN 105 node. The AN tunnel info may comprise a tunnel endpoint for each involved RAN 105 node, and the QFIs assigned to each tunnel endpoint. A QFI may be assigned to either the master RAN 105 node or the secondary RAN 105 node. In an example, (R)AN 105 may forward the NAS message 1310 (PDU session ID, N1 SM container (PDU session establishment accept)) to the UE 100. The (R)AN 105 may provide the NAS message to the UE 100 if the necessary RAN 105 resources are established and the allocation of (R)AN 105 tunnel information are successful.

In an example, the N2 PDU session response 1320 may comprise a PDU session ID, cause, N2 SM information (PDU session ID, AN tunnel info, list of accepted/rejected QFI(s)), and/or the like. In an example, the AN tunnel info may correspond to the access network address of the N3 tunnel corresponding to the PDU session.

In an example, the AMF 155 may forward the N2 SM information received from (R)AN 105 to the SMF 160 via a Nsmf_PDUSession_UpdateSMContext request 1330 (comprising: N2 SM information, request type, and/or the like). In an example, if the list of rejected QFI(s) is included in N2 SM information, the SMF 160 may release the rejected QFI(s) associated QoS profiles.

In an example, the SMF 160 may initiate an N4 session modification procedure 1335 with the UPF 110. The SMF 160 may provide AN tunnel info to the UPF 110 as well as the corresponding forwarding rules. In an example, the UPF 110 may provide an N4 session modification response 1335 to the SMF 160160.

In an example, the SMF 160 may send to the AMF 155 an Nsmf_PDUSession_UpdateSMContext response 1340 (Cause). In an example, the SMF 160 may subscribe to the UE 100 mobility event notification from the AMF 155 (e.g. location reporting, UE 100 moving into or out of area of interest), after this step by invoking Namf_EventExposure_Subscribe service operation. For LADN, the SMF 160 may subscribe to the UE 100 moving into or out of LADN service area event notification by providing the LADN DNN as an indicator for the area of interest. The AMF 155 may forward relevant events subscribed by the SMF 160.

In an example, the SMF 160 may send to the AMF 155, a Nsmf_PDUSession_SMContextStatusNotify (release) 1345. In an example, if during the procedure, any time the PDU session establishment is not successful, the SMF 160 may inform the AMF 155 by invoking Nsmf_PDUSession_SMContextStatusNotify(release) 1345. The SMF 160 may releases any N4 session(s) created, any PDU session address if allocated (e.g. IP address) and may release the association with the PCF 135.

In an example, in case of PDU type IPv6, the SMF 160 may generate an IPv6 Router Advertisement 1350 and may send it to the UE 100 via N4 and the UPF 110.

In an example, if the PDU session may not be established, the SMF 160 may unsubscribe 1360 to the modifications of session management subscription data for the corresponding (SUPI, DNN, S-NSSAI), using Nudm_SDM_Unsubscribe (SUPI, DNN, S-NSSAI), if the SMF 160 is no more handling a PDU session of the UE 100 for this (DNN, S-NSSAI). In an example, if the PDU session may not be established, the SMF 160 may deregister 1360 for the given PDU session using Nudm_UECM_Deregistration (SUPI, DNN, PDU session ID).

Figure 14:
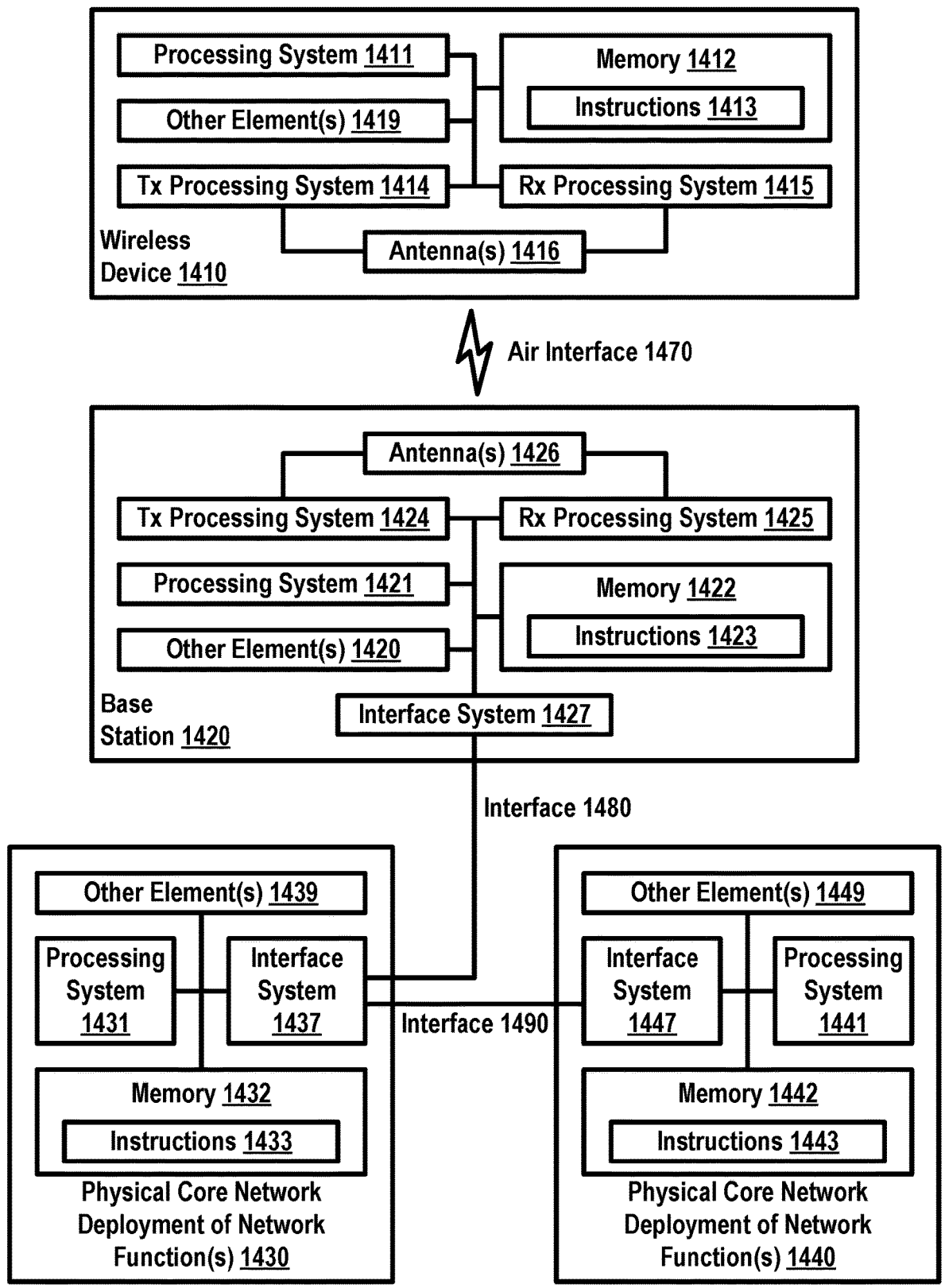
FIG. 14 illustrates an example mobile communication networks as per an aspect of an embodiment of the present disclosure.

FIG. 14 illustrates another example of a mobile communication network in which embodiments of the present disclosure may be implemented. The mobile communication network depicted in FIG. 14 includes a wireless device 1410, a base station 1420, a physical core network deployment of one or more network functions 1430 (henceforth "CN deployment 1430"), and a physical core network deployment of one or more network functions 1440 (henceforth "CN deployment 1440"). The deployment 1430 and the deployment 1440 may be elements of a core network.

The wireless device 1410 may communicate with the base station 1420 over an air interface 1470. The communication direction from the wireless device 1410 to the base station 1420 over the air interface is known as uplink, and the communication direction from the base station 1420 to the wireless device 1410 over the air interface 1470 is known as downlink. Downlink transmissions may be separated from uplink transmissions using FDD, TDD, and/or some combination of the two duplexing techniques. FIG. 14 shows a single wireless device 1410 and a single base station 1420, but it will be understood that the wireless device 1410 may communicate with any number of base stations or other access network components over the air interface 1470, and that the base station 1420 may communicate with any number of wireless devices over the air interface 1470.

The wireless device 1410 may comprise a processing system 1411 and a memory 1412. The memory 1412 may comprise one or more computer-readable media, for example, one or more non-transitory computer readable media. The memory 1412 may include instructions 1413. The processing system 1411 may process and/or execute the instructions 1413. Processing and/or execution of the instructions 1413 may cause the processing system 1411 to perform one or more functions or activities. The memory 1412 may include data (not shown). One of the functions or activities performed by the processing system 1411 may be to store data in the memory 1412 and/or retrieve previously-stored data from the memory 1412. In an example, downlink data received from the base station 1420 may be stored in the memory 1412, and uplink data for transmission to the base station 1420 may be retrieved from the memory 1412. The wireless device 1410 may communicate with the base station 1420 using a transmission processing system 1414 and a reception processing system 1415. The wireless device 1410 may comprise one or more antennas 1416 to access the air interface 1470. Although not shown in FIG. 14, the transmission processing system 1414 and/or the reception processing system 1415 may be coupled to a dedicated memory that is analogous to but separate from the memory 1412, and comprises instructions that may be processed and/or executed to carry out one or more of their respective functionalities.

The wireless device 1410 may comprise one or more other elements 1419. The one or more other elements 1419 may comprise software and/or hardware that provide features and/or functionalities, for example, a speaker, a microphone, a keypad, a display, a touchpad, a satellite transceiver, a universal serial bus (USB) port, a hands-free headset, a frequency modulated (FM) radio unit, a media player, an Internet browser, an electronic control unit (e.g., for a motor vehicle), and/or one or more sensors (e.g., an accelerometer, a gyroscope, a temperature sensor, a radar sensor, a lidar sensor, an ultrasonic sensor, a light sensor, a camera, a global positioning sensor (GPS) and/or the like). The wireless device 1410 may receive user input data from and/or provide user output data to the one or more one or more other elements 1419. The one or more other elements 1419 may comprise a power source. The wireless device 1410 may receive power from the power source and may be configured to distribute the power to the other components in the wireless device 1410. The power source may comprise one or more sources of power, for example, a battery, a solar cell, a fuel cell, or any combination thereof.

The wireless device 1410 may transmit data to the base station 1420 via the air interface 1470. To perform the transmission, the processing system 1411 may implement layer 3 and layer 2 open systems interconnection (OSI) functionality to process the data for uplink transmission. Layer 3 may include a radio resource control layer (RRC). Layer 14 may include a service data application protocol layer (SDAP), a packet data convergence protocol layer (PDCP), a radio link control layer (RLC), and a media access control layer (MAC). The data may be provided to the transmission processing system 1414, which may implement layer 1 OSI functionality. Layer 1 may include a physical layer (PHY). The wireless device 1410 may transmit the data over the air interface 1470 using one or more antennas 1416. For scenarios where the one or more antennas 1416 include multiple antennas, the multiple antennas may be used to perform one or more multi-antenna techniques, such as spatial multiplexing (e.g., single-user multiple-input multiple output (MIMO) or multi-user MIMO), transmit/receive diversity, and/or beamforming.

The wireless device 1410 may receive downlink data from the base station 1420 over the air interface 1470. The downlink data may be received via the one or more antennas 1416. The reception processing system 1415 may implement layer 1 OSI functionality on the received downlink data and may provide the data to the processing system 1411. The processing system 1411 may implement layer 2 and layer 3 OSI functionality to process the received downlink data. The base station 1420 may comprise elements analogous to the elements of the wireless device 1410. The base station 1420 may comprise a processing system 1421 and a memory 1422. The memory 1422 may comprise one or more computer-readable media, for example, one or more non-transitory computer readable media. The memory 1422 may include instructions 1423. The processing system 1421 may process and/or execute the instructions 1423. Processing and/or execution of the instructions 1423 may cause the processing system 1421 to perform one or more functions or activities. The memory 1422 may include data (not shown). One of the functions or activities performed by the processing system 1421 may be to store data in the memory 1422 and/or retrieve previously-stored data from the memory 1422. The base station 1420 may communicate with the wireless device 1410 using a transmission processing system 1424 and a reception processing system 1425. The base station 1420 may comprise one or more antennas 1426 to access the air interface 1470. The processing system 1421 may implement layer 14 and layer 3 OSI functionality. The transmission processing system 1424 and the reception processing system 1425 may implement layer 1 OSI functionality to perform transmission of downlink data and reception of uplink data, respectively.

The base station 1420 may comprise an interface system 1427. The interface system 1427 may communicate with one or more elements of the core network via an interface 1480. The interface 1480 may be wired and/or wireless and the interface system 1427 may include one or more components suitable for communicating via the interface 1480. In FIG. 14, the interface 1480 connects the base station 1420 to a single CN deployment 1430, but it will be understood that the wireless device 1410 may communicate with any number of CN deployments over the interface 1480, and that the CN deployment 1430 may communicate with any number of base stations over the interface 1480. The base station 1420 may comprise one or more other elements 1429 analogous to one or more of the one or more other elements 1419.

The CN deployment 1430 may comprise one or more network functions (NFs). For example, the CN deployment 1430 may comprise an AMF and/or a UPF analogous to the AMF and UPF depicted in FIG. 1. The CN deployment 1430 may comprise elements analogous to the elements of the wireless device 1410 and the base station 1420, as described above. The CN deployment 1430 may comprise a processing system 1431 and a memory 1432. The memory 1432 may comprise one or more computer-readable media, for example, one or more non-transitory computer readable media. The memory 1432 may include instructions 1433. The processing system 1431 may process and/or execute the instructions 1433. Processing and/or execution of the instructions 1433 may cause the processing system 1431 to perform one or more functions or activities. The memory 1432 may include data (not shown). One of the functions or activities performed by the processing system 1431 may be to store data in the memory 1432 and/or retrieve previously-stored data from the memory 1432. The CN deployment 1430 may access the interface 1480 using an interface system 1437. The CN deployment 1430 may also use the interface system 1437 to access an interface 1490. The CN deployment 1430 may use the interface 1490 to communicate with one or more data networks (analogous to, for example, the DN(s) depicted in FIG. 1 and/or one or more other CN deployments, including the CN deployment 1440 depicted in FIG. 14. The CN deployment 1430 may comprise one or more other elements 1439.

The CN deployment 1440 may comprise elements analogous to the elements of the CN deployment 1430, as described above. The CN deployment 1440 may comprise a processing system 1441 and a memory 1442. The memory 1442 may comprise one or more computer-readable media, for example, one or more non-transitory computer readable media. The memory 1442 may include instructions 1443. The processing system 1441 may process and/or execute the instructions 1443. Processing and/or execution of the instructions 1443 may cause the processing system 1441 to perform one or more functions or activities. The memory 1442 may include data (not shown). One of the functions or activities performed by the processing system 1441 may be to store data in the memory 1442 and/or retrieve previously-stored data from the memory 1442. The CN deployment 1440 may access the interface 1490 using an interface system 1447. The CN deployment 1440 may comprise one or more other elements.

The processing system 1411, the processing system 1421, the processing system 1431, and/or the processing system 1441 may comprise one or more controllers and/or one or more processors. The one or more controllers and/or one or more processors may comprise, for example, a general-purpose processor, a digital signal processor (DSP), a microcontroller, an application specific integrated circuit (ASIC), a field programmable gate array (FPGA) and/or other programmable logic device, discrete gate and/or transistor logic, discrete hardware components, an on-board unit, or any combination thereof. The processing system 1411, the processing system 1421, the processing system 1431, and/or the processing system 1441 may perform signal coding/processing, data processing, power control, input/output processing, and/or any other functionality that may enable the wireless device 1410, base station 1420, CN deployment 1430, and/or CN deployment 1440 to operate in a mobile communications system.

Each CN deployment may comprise one or more network functions. Depending on the context in which the term is used, a network function (NF) may refer to a particular set of functionalities and/or one or more physical elements configured to perform those functionalities (e.g., a processing system and memory comprising instructions that, when executed by the processing system, cause the processing system to perform the functionalities). There are many different types of NF and each type of NF may be associated with a different set of functionalities. Different NFs may be flexibly deployed at different locations (for example, in different physical core network deployments) or in a same location (for example, co-located in the same physical core network deployment). Moreover, physical CN deployment are not limited to implementation of NFs. For example, a particular physical CN deployment may further include a base station or portions therefor and/or a data network or portions thereof. Accordingly, one or more NFs implemented on a particular physical core network deployment may be co-located with one or more non-core elements, including elements of an access network or data network.

Figure 15:
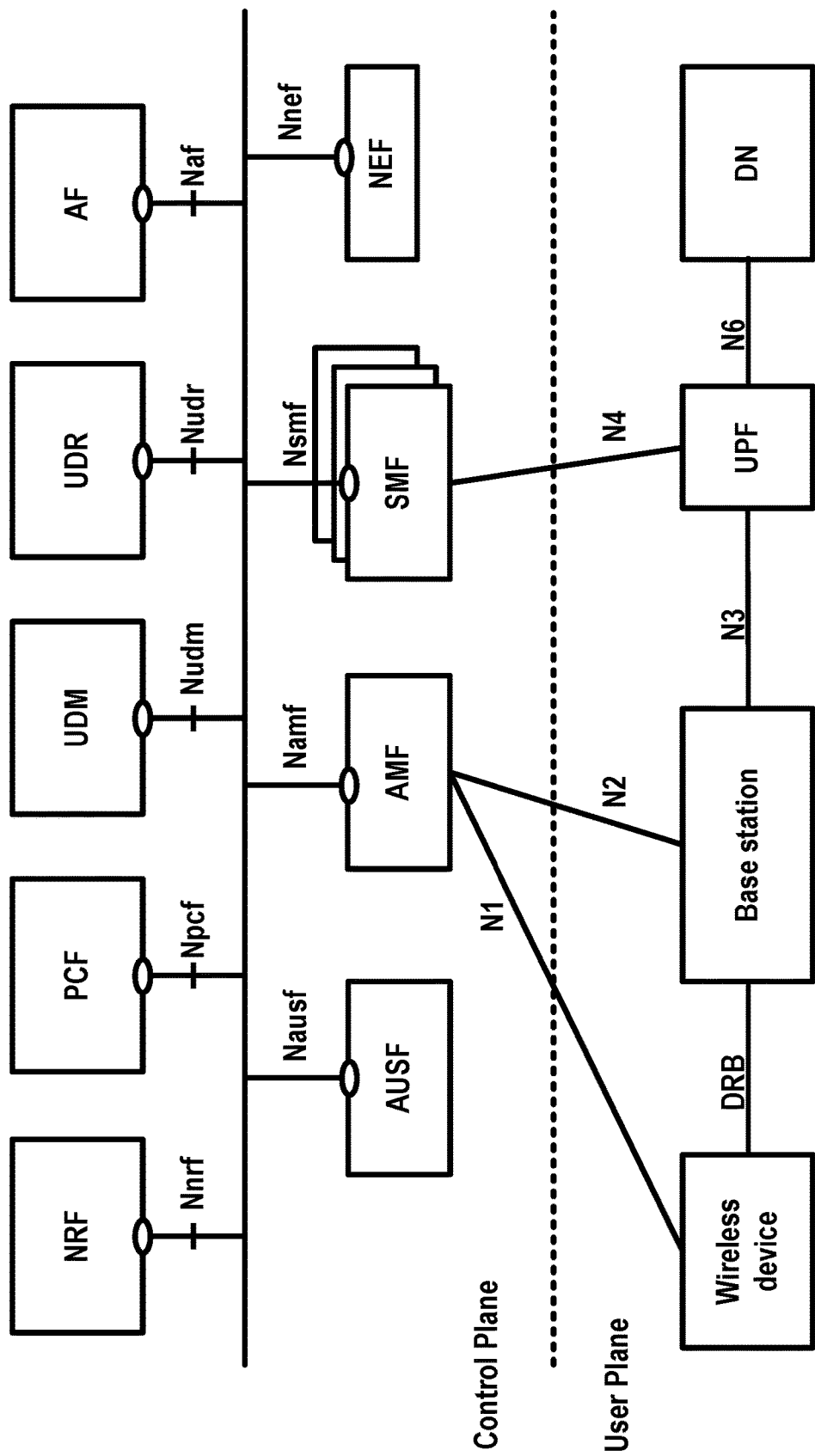
FIG. 15 illustrates a service-based architecture for a 5G network regarding interaction between a control plane (CP) and a user plane (UP).

FIG. 15 illustrates a service-based architecture for a 5G network regarding a control plane (CP) and a user plane (UP) interaction. This illustration may depict logical connections between nodes and functions, and its illustrated connections may not be interpreted as direct physical connections. A wireless device may form a radio access network connection with a bases station, which is connected to a User Plane (UP) Function (UPF) over a network interface providing a defined interface such as an N3 interface. The UPF may provide a logical connection to a data network (DN) over a network interface such as an N6 interface. The radio access network connection between the wireless device and the base station may be referred to as a data radio bearer (DRB).

The DN may be a data network used to provide an operator service, third party service such as the Internet, IP multimedia subsystem (IMS), augmented reality (AR), virtual reality (VR). In some embodiments DN may represent an edge computing network or resource, such as a mobile edge computing (MEC) network.

The wireless device also connects to the AMF through a logical N1 connection. The AMF may be responsible for AA of access requests, as well as mobility management functions. The AMF may perform other roles and functions. In a service-based view, AMF may communicate with other core network control plane functions through a service-based interface denoted as Namf.

The SMF is a network function that may be responsible for the allocation and management of IP addresses that are assigned to a wireless device as well as the selection of a UPF for traffic associated with a particular session of the wireless device. There will be typically multiple SMFs in the network, each of which may be associated with a respective group of wireless devices, base stations or UPFs. The SMF may communicate with other core network functions, in a service based view, through a service based interface denoted as Nsmf. The SMF may also connect to a UPF through a logical interface such as network interface N4.

The authentication server function (AUSF) may provide authentication services to other network functions over a service based Nausf interface. A network exposure function (NEF) can be deployed in the network to allow servers, functions and other entities such as those outside a trusted domain (operator network) to have exposure to services and capabilities within the network. In one such example, the NEF may act like a proxy between an external application server (AS) outside the illustrated network and network functions such as the PCF, the SMF, the UDM and the AMF. The external AS may provide information that may be of use in the setup of the parameters associated with a data session. The NEF may communicate with other network functions through a service based Nnef network interface. The NEF may have an interface to non-3GPP functions.

The Network Repository Function (NRF) may provide network service discovery functionality. The NRF may be specific to the Public Land Mobility Network (PLMN) or network operator, with which it is associated. The service discovery functionality can allow network functions and wireless devices connected to the network to determine where and how to access existing network functions.

The PCF may communicate with other network functions over a service based Npcf interface, and may be used to provide policy and rules to other network functions, including those within the control plane. Enforcement and application of the policies and rules may not be responsibility of the PCF. The responsibility of the functions to which the PCF transmits the policy may be responsibility of the AMF or the SMF. In one such example, the PCF may transmit policy associated with session management to the SMF. This may be used to allow for a unified policy framework with which network behavior can be governed.

The UDM may present a service based Nudm interface to communicate with other network functions. The UDM may provide data storage facilities to other network functions. Unified data storage may allow for a consolidated view of network information that may be used to ensure that the most relevant information can be made available to different network functions from a single resource. This may allow implementation of other network functions easier, as they may not need to determine where a particular type of data is stored in the network. The UDM may employ an interface, such as Nudr to connect to the UDR. The PCF may be associated with the UDM.

The PCF may have a direct interface to the UDR or may use Nudr interface to connection with UDR. The UDM may receive requests to retrieve content stored in the UDR, or requests to store content in the UDR. The UDM may be responsible for functionality such as the processing of credentials, location management and subscription management. The UDR may also support authentication credential processing, user identification handling, access authorization, registration/mobility management, subscription management, and short message service (SMS) management. The UDR may be responsible for storing data provided by the UDM. The stored data is associated with policy profile information (which may be provided by PCF) that governs the access rights to the stored data. In some embodiments, the UDR may store policy data, as well as user subscription data which may include any or all of subscription identifiers, security credentials, access and mobility related subscription data and session related data.

The Application Function (AF) may represent the non-data plane (also referred to as the non-user plane) functionality of an application deployed within a network operator domain and within a 3GPP compliant network. The AF may in internal application server (AS). The AF may interact with other core network functions through a service based Naf interface, and may access network capability exposure information, as well as provide application information for use in decisions such as traffic routing. The AF can also interact with functions such as the PCF to provide application specific input into policy and policy enforcement decisions. In many situations, the AF may not provide network services to other network functions. The AF may be often viewed as a consumer or user of services provided by other network functions. An application (application server) outside of the trusted domain (operator network), may perform many of the same functions as AF through the use of NEF.

The wireless device may communicate with network functions that are in the core network control plane (CN-UP), and the core network user plane (CN-CP). The UPF and the data network (DN) is a part of the CN-UP. The DN may be out of core network domain (cellular network domain). In the illustration (FIG. 15), base station locates in CP-UP side. The base station may provide connectivity both for the CN-CP & CN-UP. AMF, SMF, AUSF, NEF, NRF, PCF, and UDM may be functions that reside within the CN-CP, and are often referred to as control plane functions. If the AF resides in the trusted domain, the AF may communicate with other functions within CN-CP directly via the service based Naf interface.

If the AF resides outside of the trusted domain, the AM may communicate with other functions within CN-CP indirectly via the NEF.

Figure 16:
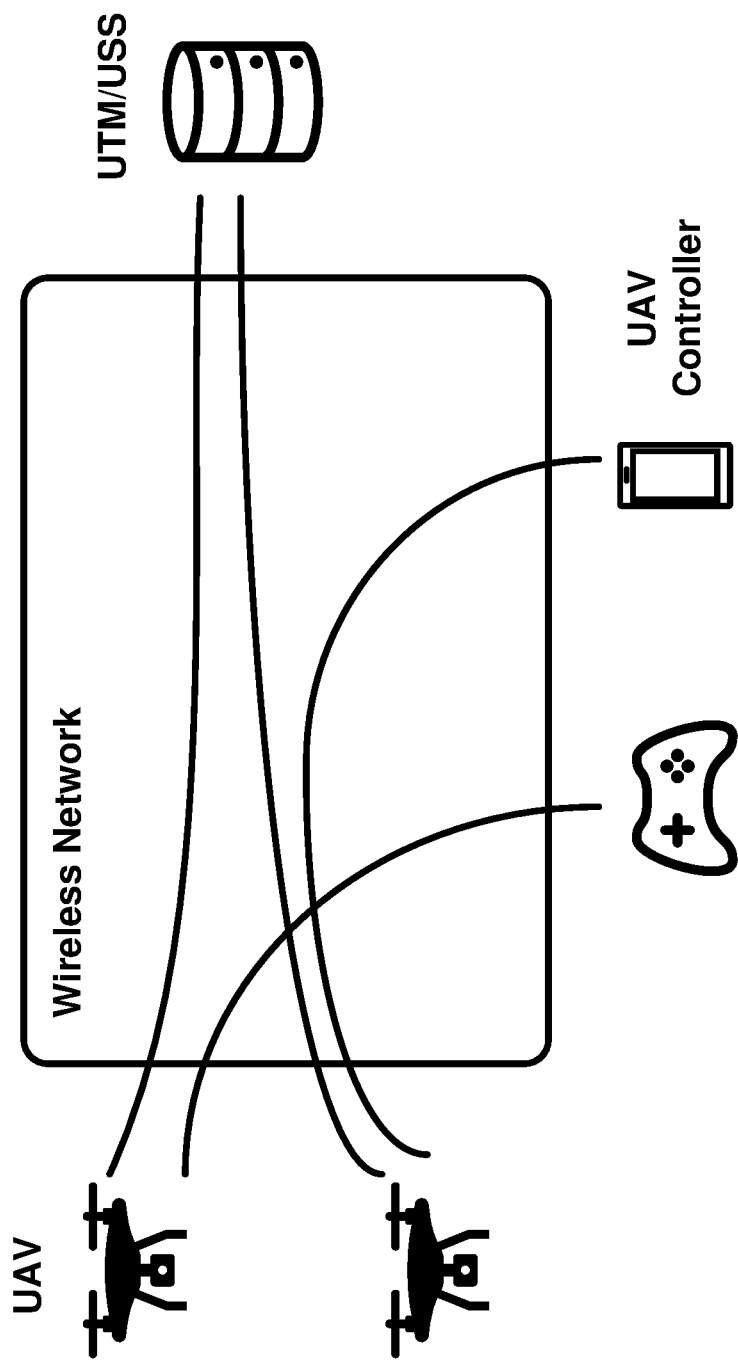
FIG. 16 illustrates an example architecture of a UAS in accordance with embodiments of the present disclosure.

An unmanned and/or uncrewed aerial vehicle (UAV) may be an aircraft without a human pilot or crew on board (e.g., uncrewed) and/or without any passengers (e.g., unmanned). An unmanned and/or uncrewed aerial system (UAS) may be a system for operating the UAV. As illustrated in FIG. 16, the UAS may comprise the UAV, a ground control system (e.g., UAV controller), a camera, a positioning system, and/or any other suitable equipment for operating the UAS. A wireless network (e.g., cellular network, 4G cellular network, 5G cellular network) may enable the ground control system (e.g., UAV controller, UTM, USS) to communicate with the UAV may be one of the components of the UAS.

Figure 17:
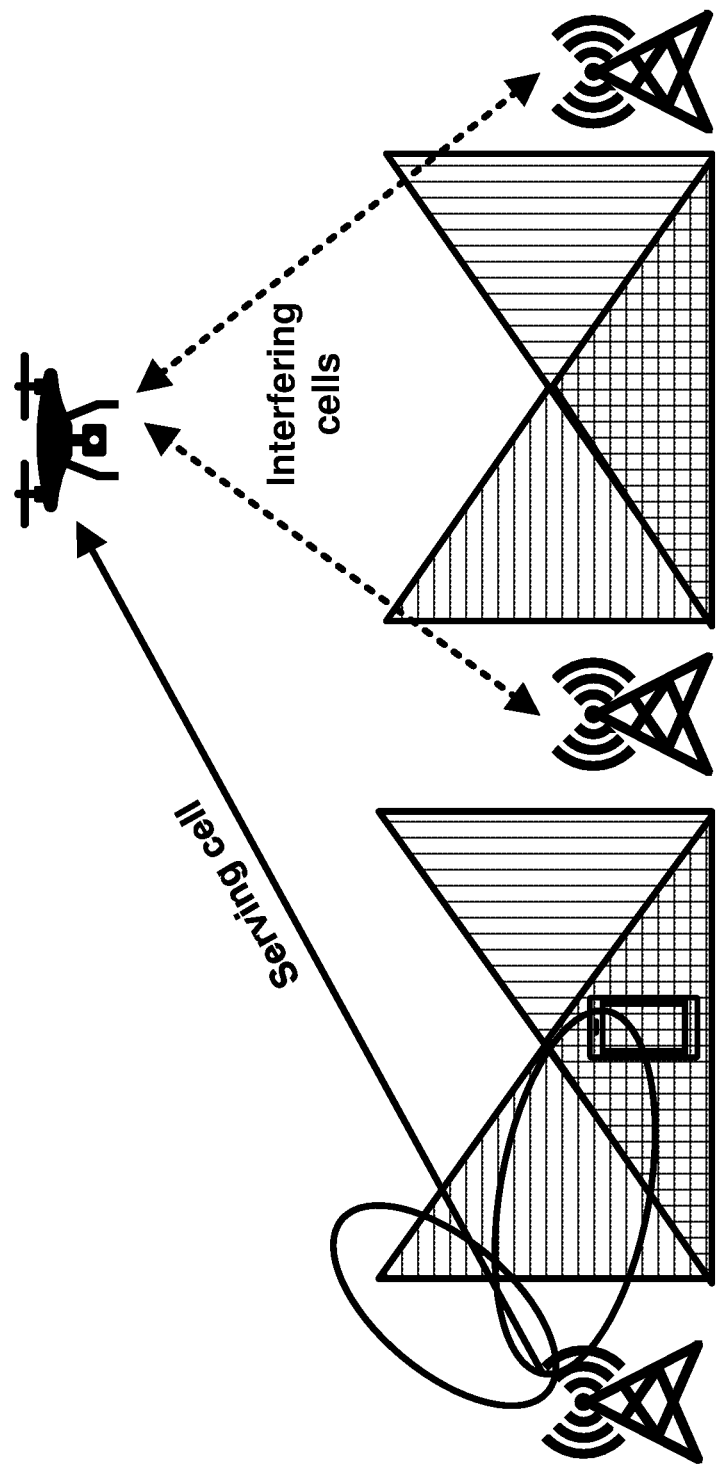
FIG. 17 illustrates an example scenario how a UAV interacts with base stations regarding interference in accordance with embodiments of the present disclosure.

In an example, a wireless device may be the UAV. The wireless device may be an aerial wireless device. The wireless device may fly above the ground. As illustrated in FIG. 17, the wireless device may experience high line-of-sight (LOS) propagation probability. The wireless device may receive downlink (e.g., from a base station to the wireless device) interference from a larger number of cells than a typical terrestrial wireless device does. In the downlink direction, there may be higher probability that the number of neighboring cells causing high level of downlink interference at the wireless device than in the case of terrestrial wireless device. In an example, 16 cells causing high level of downlink direction interference may be observed by the wireless device at heights of 50 m or above. In an example, antennas of a base station (e.g., eNB, gNB) may be down tilted to serve terrestrial wireless devices. The wireless device may locate above a height of the antennas of the base station. The wireless devices may be served by side lobes of the antennas of the base station. The wireless device may see a stronger signal from a faraway base stations than the one that is geographically closest. The wireless devices may be served by a faraway base station instead of the closest one. Downlink direction pathloss and uplink direction pathloss for the aerial wireless device may differ in some scenarios where reciprocity does not hold (e.g., due to different side lobe orientations in uplink and downlink, or different channel characteristic in a frequency domain division deployment (FDD).

Base stations of the wireless network and wireless devices may employ radio access network (RAN) functions for an aerial communication service (e.g., UAS, UAV, UAV controller, etc.). Base stations and wireless devices may support radio access network (RAN) functions for an aerial communication service. The RAN functions for the aerial communication service may be an aerial user equipment (UE) communication. In an example, the aerial communication service may be an aerial UE communication. The aerial communication service may support the UAS. The RAN functions for the aerial communication service may comprise a height-based measurement reporting, an interference detection for the aerial UE communication, an interference mitigation for the aerial UE communication, a flight path information reporting, a location reporting for the aerial UE communication, and/or the like.

In an example, the base station may send an RRC message (e.g., RRC configuration message, RRC reconfiguration message) to a wireless device. The RRC message may comprise one or more measurement events regarding the height-based measurement reporting. The one or more measurement event may indicate to the wireless device, a height threshold for the height-based measurement reporting. The wireless device may receive the measurement event comprising the height threshold. The wireless device may send a height report if an altitude of the wireless device is above or below the height threshold. The height report may comprise height of the wireless device, a location of the wireless device, and/or the like.

If received signaling power (e.g. RSRP) of multiple neighboring cells are above certain levels for a wireless device, the wireless device may experience or introduce interference. For interference detection, the base station may configure radio resource management (RRM) event that triggers measurement report when individual (per cell) RSRP values for a configured number of cells (e.g., 8, 16) fulfill the configured event. The configured event may be for the interference detection. The RRM event may be A3, A4 or A5. The wireless device may send a measurement report in response to determine that the RRM event occurs.

In an example, for the interference mitigation, the base station may configure with a wireless device specific alpha parameter for physical uplink shared channel (PUSCH) power control. The base station may send a radio resource control (RRC) message comprising the alpha parameter for the PUSCH power control. If a wireless device receives the dedicated alpha parameter (e.g., alpha-UE) from the base station, the wireless may apply the dedicated alpha parameter instead of a common alpha parameter.

In an example, a base station may request to a wireless device to report flight path information by sending a user equipment information request message. The flight path information may comprise a number of waypoints defined as 3D locations. The user equipment information message may indicate a maximum number of waypoints and/or whether timestamps are required for the waypoints. The wireless device may receive the user equipment information message. If the wireless device is available to report the flight path, the wireless device may send a user equipment information response message to the base station. The user equipment response message may comprise one or more waypoints and one or more timestamps associated with the one or more waypoints. The base station may use the flight path information for congestion prediction or resource handling to mitigate interference.

In an example, for the location reporting for the aerial UE communication, the base station may request to a wireless device to include a horizontal and vertical speed of the wireless device for location information reporting. The wireless device may send location information reporting to the base station. The location information reporting may comprise the horizontal speed, the vertical speed, and/or the like. The location information may further comprise height of the wireless device.

Remote identification (RID) may be a technology to avoid collision between different UAVs or between manned aircrafts and UAVs. To prevents collision accidents, a federal aviation authority (FAA) may integrate the UAVs into a national airspace system (NAS) by introducing the RID. The RID may be an ability of a UAS in flight to provide identification and tracking information that may be received by other parties and may play a role in identifying and grounding unauthorized UAS in restricted areas. In an example, UAVs above 0.55 lbs. may be mandated to support RID. There may be two types of RID: standard RID and limited RID. For standard RID, a UAV may support a network publishing identification (ID) and a direct broadcast ID. For limited RID, the UAV may support the network publishing ID. For limited RID, the UAV may not support the direct broadcast ID. The network publishing ID may be based on communication via an internet from a RID server provider that interfaces with the UAV. The direct broadcast ID may be based on direct transmission of the RID by a UAV using its onboard direct transmission technology (e.g., Bluetooth, Wi-Fi module). A UAV that supports the limited RID (e.g., does not support the direct broadcast ID) may be not allowed to fly above 400 feet. A UAV that supports the limited RID, network connectivity may be required during the flight. A UAS that supports the standard RID may be allowed to fly above 400 feet and there is no restriction for the network connectivity.

In an example, command and control communication may be a user plane link to deliver message with information of command and control for UAV operation from a UAV controller or a UTM to the UAV. The command and control communication may be C2 communication. The C2 communication comprises three types of communication 1) direct C2 communication, 2) network assisted C2 communication, 3) UTM navigated C2 communication. The direct C2 communication may use the direct communication link between a UAV and a UAV controller. The network assisted C2 communication may use cellular network (e.g., public land mobile network) for a communication between the UAV and the UAV controller. For the UTM navigated C2 communication may use, the UTM may provide a pre-scheduled flight plan to the UAV and the UTM may keep track and verify up to date restrictions or flight plan to the UAV.

Figure 18:
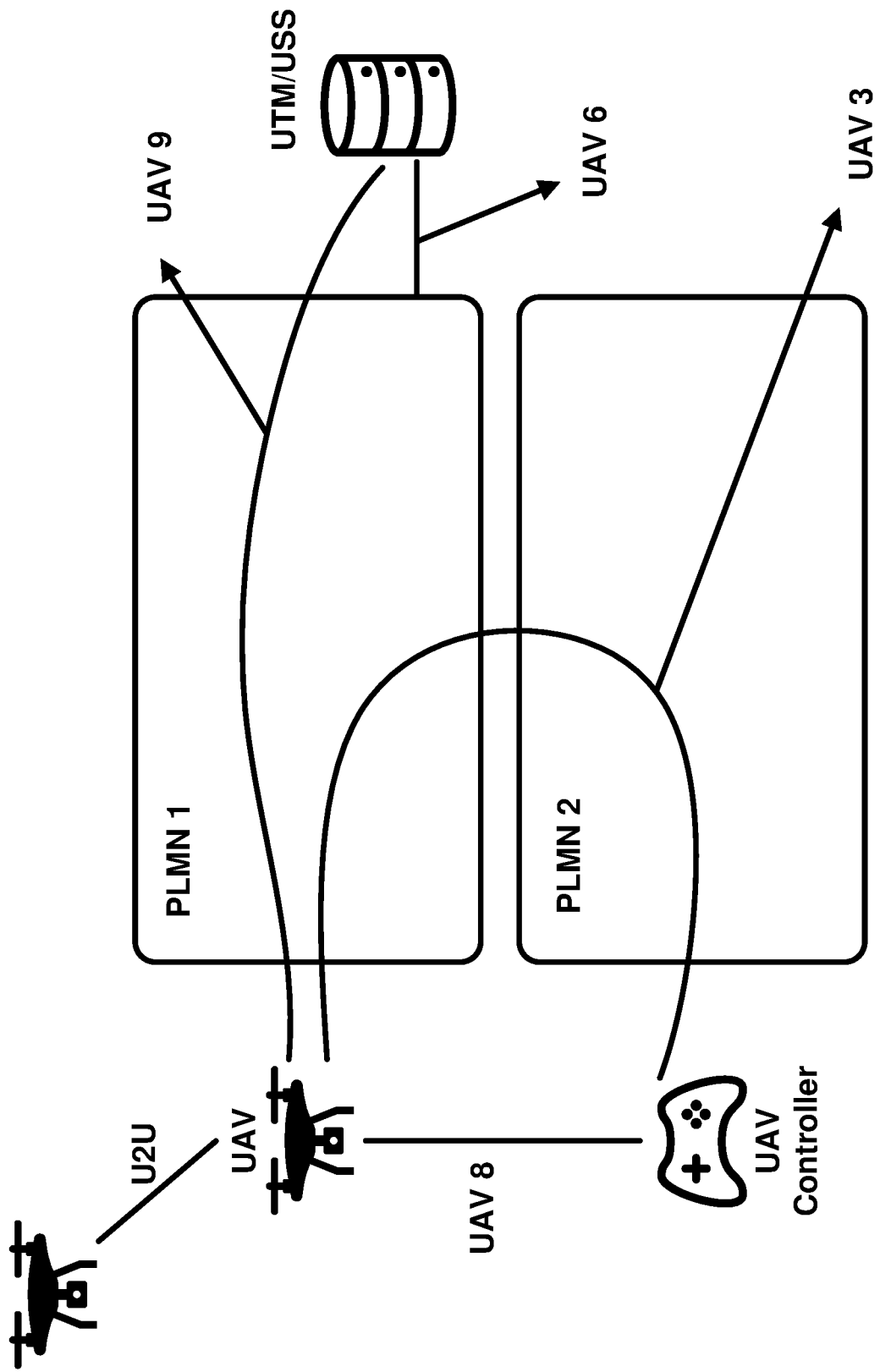
FIG. 18 illustrates an example architecture for a UAS regarding interfaces in accordance with embodiments of the present disclosure.

FIG. 18 shows an example interfaces (e.g., U2U, UAV3, UAV6, UAV8, UAV9) for the UAS with wireless network (e.g. PLMN1, PLMN2). The interface may be a communication connectivity. In an example, U2U interface may be an interface for the direct broadcast ID. UAV8 interface may be an interface for the direct C2 communication between the UAV and the UAV controller. The UAV3 interface may be an interface between the UAV and the UAV controller via wireless network. In an example, the UAV3 may be in intra-PLMN or inter-PLMN. In an example, for the intra-PLMN, the PLMN1 and PLMN2 may be same PLMN. For the inter-PLMN, the PLMN1 and the PLMN2 may be different PLMN. In an example, the UAV9 may be interface between the UAV and a networked UAV controller and the USS/UTM for UAS management (e.g., authentication and/or authorization (AA), transporting C2, RID and tracking of the UAV). In an example, the UAV6 may be interface between the PLMN (e.g. 3GPP network) and a USS/UTM for functionality exposure, support of identification and tracking, and a UAV authentication and/or authorization.

Figure 19:
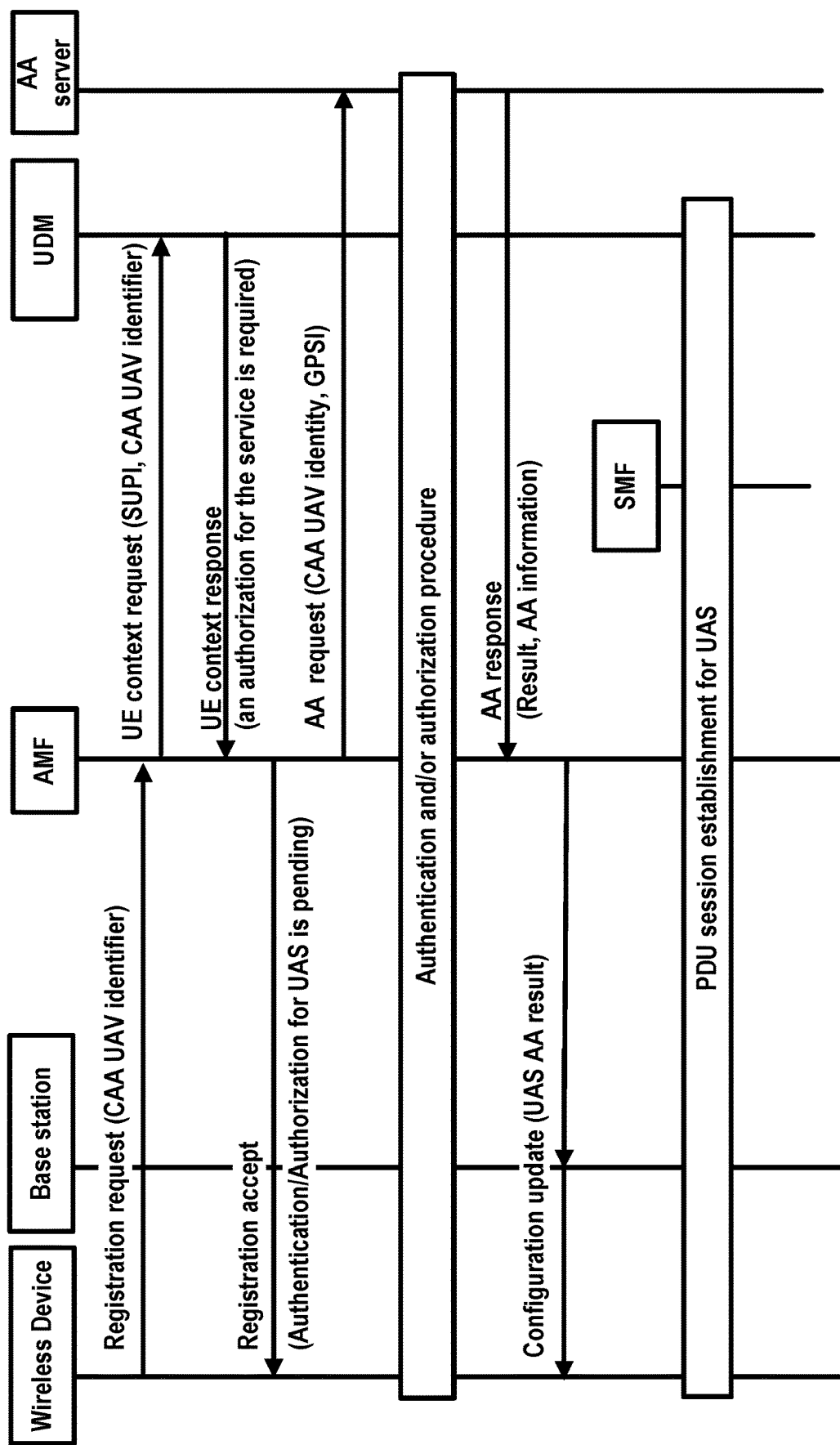
FIG. 19 illustrates an example registration procedure regarding an authentication and/or authorization (AA) for an aerial service in accordance with embodiments of the present disclosure.

As illustrated in FIG. 19, a wireless device may move following the moving path (e.g., flight path) which is illustrated in dot line. In an example, a base station of a 'cell A' may not work due to an outage or malfunction. The wireless device may experience a communication failure while the wireless moves cross the area of the 'cell A'. The communication failure may be short term (e.g., 1 minute, 5 minutes) communication failure. The communication failure may be a communication outage. In an example, there are no available base stations next to a coverage area of a 'cell B'. The wireless device may experience a communication failure after the wireless device leaves the coverage area of the 'cell B' and moves to the right. The communication failure may be long term (e.g., 30 minutes, 1 hour) communication failure.

In an example, the wireless device may send a registration request message to the AMF via the base station. The registration request message may comprise an identity of the wireless device, a capability of the aerial service (e.g., aerial service capability, aerial communication service capability, UAS service capability), slice information, a UAV identifier (e.g., civil aviation authority (CAA) UAV identifier, etc.), and/or the like. In an example, the capability of the aerial service may be whether the wireless device support the RAN functions for the aerial service. In an example, the capability of the aerial service may be whether the wireless device require the aerial service (e.g., acting as a UAV or UAV controller). An aviation domain or functions of the aviation domain may assign the UAV identifier to the wireless device. In an example, the aviation domain may be a UAS traffic management (UTM) or a UAS service supplier (USS). The UAV identifier may be a CAA-level UAV identifier. The UAV identifier may be used for the RID and tracking of the wireless device. The identity of the wireless device may comprise at least one of a SUCI, 5G-GUTI, an international mobile equipment identity (IMEI), an IMEI software version (IMEISV), a shortened version of 5G-GUTI, and/or the like.

In response to receiving the registration request message, the AMF may send a UE context request message to a subscription service (e.g., UDM, etc.). The UE context request message may comprise an identifier of the wireless device, the capability of the UAS, slice information, and/or the like. In an example, the identity of the wireless device may be a subscriber permanent identifier (e.g., IMSI, SUPI) of the wireless device.

In an example, the UDM may receive the UE context request message from the AMF. In response to receiving the UE context request message, the UDM may send a UE context response message comprising subscription information of the wireless device to the AMF. The UDM may determine the subscription information based on an existence of the capability of the aerial service and slice information. In an example, if the capability of the aerial service is present in the UE context request message, the UDM may include UAS subscription information to the subscription information. The subscription information may be subscription data. In an example, the subscription information may indicate whether the wireless device is allowed to get the aerial service. In an example, the subscription information may indicate whether the wireless device is allowed to get the aerial service or not. The subscription information may further indicate whether an authentication and/or an authorization (AA) is required for the aerial service.

The AMF may receive the UE context response message comprising the subscription information. In response to receiving the UE context response message, the AMF may determine whether an authentication and/or an authorization (AA) for the aerial service is required. The determination may be based on the capability provided by the wireless device, subscription information provided by the subscription server, and/or the like. If the capability indicate that the wireless device does not support the aerial service, the AMF may not allow the aerial service and may not perform the AA for the service.

In an example, the subscription information may indicate that the wireless device is allowed to get the aerial service. If the aerial service is allowed for the wireless device, the AMF may check whether the authentication and/or authorization (AA) is required for the wireless device. If the AA is required for the service, the AMF may indicate to the wireless device that the AA for the aerial service is pending. While the AA for the aerial service of the wireless device is pending, the AMF may withhold the RAN function activation associated with the service with the base station and the wireless device.

If the authentication and/or the authorization (AA) for the aerial service is required based on the subscription information, the AMF may perform the AA procedure for the aerial service by sending an AA request message to an AA server. The AA server may be the UTM or the USS. The AMF may send the AA request message to the AA server via a NEF or new network device for the aerial service. The AA request message may comprise the UAV identity, a GPSI, and/or the like. The AA server may use the UAV identity to identify the wireless device inside the AA server or the aviation domain (e.g., UTM/USS). The 3GPP network (e.g., cellular operator) may assign the GPSI for the aerial service. The AA server may use the GPSI for communication with the 3GPP network.

The AA request message may trigger performing the authentication and/or authorization procedure between the AA server and the wireless device. The detailed procedure for the service specific AA procedure is described in FIG. 20. If the service specific AA procedure is completed, the AA server may send an AA response message to the AMF. The AA response message may comprise an AA result, an authorized type, an authorized level, authorized paths, and/or the like. In an example, the AA completion may mean the use of service in application layer between the wireless device and the AA server is ready.

In an example, the AMF may receive an AA response message from the AA server. In response to receiving the AA response message, the AMF may send a configuration update message indicating the AA result (e.g., whether the wireless device is authenticated and/or authorized for the aerial service). If the AA result indicates that the aerial service is not authenticated/authorized for the wireless device (e.g., the AA is failed), the wireless device may not request an establishment of one or more PDU sessions associated with the aerial service. If the AA result indicates that the aerial service is authenticated/authorized for the wireless device (e.g., the AA is succeeded), the wireless device may request an establishment of one or more PDU sessions associated with the aerial service to a SMF. In an example, the AAA-S may be the AA server.

Figure 20:
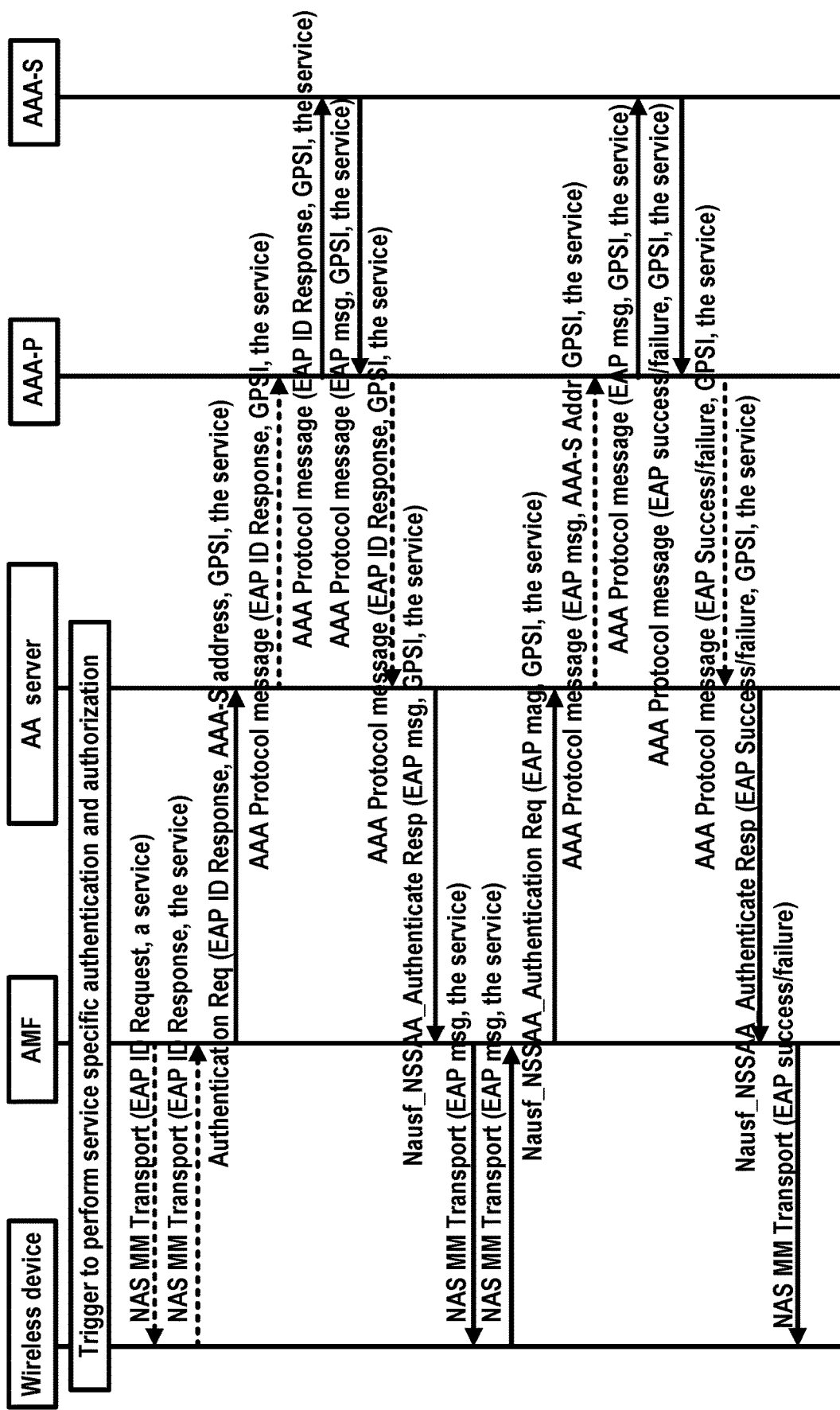
FIG. 20 illustrates example service specific AA procedure in accordance with embodiments of the present disclosure.

FIG. 20 illustrates an example service specific AA procedure. An AMF may trigger the start of the service specific AA procedure for a service. The AMF may be an MME. The AMF may send an extensible authentication protocol (EAP) Identity Request for the service in a NAS MM Transport message including the service name to a wireless device. The wireless device may provide the EAP Identity Response for the service alongside the service name in an NAS MM Transport message towards the AMF. The AMF may send the EAP Identity Response to an AA server in an AA request (EAP Identity Response, AAA-S address, GPSI, a service name) message. If the AAA-P is present (e.g., because the AAA-S belongs to a third party and the operator deploys a proxy towards third parties), the AA server forwards the EAP ID Response message to the AAA-P. Otherwise, the AA server forwards the message directly to the AAA-S. The AA server may use towards the AAA-P or the AAA-S a AAA protocol message of the same protocol supported by the AAA-S. The AAA-P may forward the EAP Identity message to the AAA-S addressable by the AAA-S address together with the service and GPSI. The AAA-S may store the GPSI to create an association with the EAP Identity in the EAP ID response message, so the AAA-S may later use the GPSI to revoke authorization or to trigger reauthentication. EAP-messages may be exchanged with the wireless device. One or more iterations of these steps may occur. If EAP authentication completes, the AAA-S may store the service for which the authorization has been granted, so the AAA-S may decide to trigger reauthentication and/or reauthorization based on its local policies. An EAP-Success/Failure message may be delivered to the AAA-P (or if the AAA-P is not present, directly to the AA server) with GPSI and the service name. If the AAA-P is used, the AAA-P may send a AAA Protocol message including (EAP-Success/Failure, the service name, GPSI) to the AA server. The AA server may send the Authenticate Response (EAP-Success/Failure, the service mane, GPSI) to the AMF. The AMF may transmit a NAS MM Transport message (EAP-Success/Failure) to the wireless device. The AMF may store the EAP result for each service for which the service specific AA procedure executed. In an example, the AAA-S may be the AA server.

In existing technologies, a wireless device (e.g., UAS, UAV, UAV controller, etc.) may request an establishment of one or more sessions (e.g., PDU sessions, PDN connections, etc.). The one or more sessions may be for an aerial service (e.g., aerial system service, UAS service, etc.). To establish the one or more sessions, the wireless device may send the request to a session management entity (SME, e.g., session management function (SMF), mobility management entity (MME), etc.). It may be necessary (e.g., required) to determine an authentication and/or an authorization (AA) of the wireless device (e.g., before the session can be established and/or the request can be accepted by the SME). The AA may require one or more communications between the wireless device and/or network and a traffic manager (e.g., a UAS traffic management (UTM) or UAS service supplier (USS)). When a need (e.g., requirement) for AA for aerial service is introduced, existing techniques for session management (e.g., requesting, establishing, modifying, accepting, rejecting, etc.) may result in delay, ambiguity, and/or signaling overhead. For example, a wireless device may request a session establishment associated with aerial service. At the time of the request, AA may be incomplete and/or the result of the AA procedure may be unknown. As a result, the request may be rejected, re-attempted and re-rejected, accepted after delay, etc. Additionally or alternatively, the request may be accepted without the necessary AA, resulting in an unauthorized and/or inoperable session.

In accordance with example embodiments of the present disclosure, a mobility management function (MMF) (e.g., access and mobility management function (AMF), mobility management entity (MME), etc.) may determine AA of an aerial service of a wireless device. The determining may be based on, for example, a registration request message received from the wireless device, or any other suitable signal or information which prompts the MMF to determine an AA of the wireless device. In an example, the registration or other signal/information may indicate an aerial service (e.g., may include a UAS indicator, UAV identifier of the wireless device, etc.). The MMF may send, to a session management entity (SME) (e.g., serving gateway (S-GW), serving gateway controller (S-GW-C), session management function (SMF), etc.), an indication of the AA of the aerial service of the wireless device. The indication may enable the SME to manage a session of the wireless device without the delays, ambiguities, or signaling overhead associated with existing techniques (e.g., more quickly, more accurately, with less signaling overhead, etc.).

In existing technologies, a wireless device (e.g., UAS, UAV, UAV controller, etc.) may establish one or more sessions (e.g., PDU session, PDN connection) for an aerial service (e.g., aerial system service, UAS service, etc.). To establish the one or more sessions, the wireless device may obtain an authentication and/or an authorization (AA) from a traffic manager (e.g., an UAS traffic management (UTM) or UAS service supplier (USS)). The wireless device may request the one or more sessions associated with the aerial service. The wireless device may be allowed to use the one or more sessions if the wireless device obtains the AA from the traffic manager.

In an example, problems may occur when the AA is failed for the wireless device. The problems may occur when the traffic manager revokes the AA of the wireless device for the UAS. For example, the traffic manager may revoke AA if the wireless device is out of at an authorized area or a subscription of the wireless device expires. If the AA of the wireless device for the UAS is failed, the one or more sessions associated with the UAS may be rejected. If the AA of the wireless device for the UAS is revoked, the one or more sessions associated with the UAS may be released. Existing session reject or release procedure may increase ambiguity to a wireless device and increase signaling exchange to handle the procedure. Accordingly, enhanced session handling procedure for UAS failure or revocation may be required.

In accordance with example embodiments of the present disclosure, a network device (e.g., a SMF, an AMF) may terminate (e.g., release, a rejection of a PDU session establishment, a deregistration) one or more packet data unit (PDU) sessions associated with one or more aerial services of a wireless device. The network function may terminate the one or more PDU sessions associated with the one or more aerial services by sending an indication that an AA for a service of the wireless device is revoked or failed. The network device may terminate the one or more PDU sessions of a wireless device by sending a message indicating that an AA for aerial service of the wireless device is revoked or failed. The network device may terminate the one or more PDU sessions by sending a second message indicating that an AA for a command and control (C2) for the aerial service of the wireless device is revoked or failed. The network device may indicate a level, category, or type of the AA revocation or failure. Based on the different levels of AA revocation (e.g., per aerial service, per C2 service), the wireless device may be able to handle sessions associated with the aerial services without further signaling exchange.

In accordance with example embodiments of the present disclosure, a session management function (SMF) may receive a first message from a network device (e.g., an AMF, a traffic manager). The first message may indicate that an AA for an aerial service for a wireless device is revoked or failed. The SMF may determine to release one or more packet data unit (PDU) sessions based on the first message. The SMF may determine to reject a PDU session establishment based on the first message. The one or more PDU sessions may be associated with the aerial service. The SMF may send a second message indicating the determination to the wireless device. The second message may comprise a cause parameter indicating that the AA for the aerial service of the wireless device is revoked or failed. The example embodiment may allow the SMF to determine that the PDU session release or rejection is associated with the AA for the aerial service. The example embodiment may allow the SMF to determine that the PDU session release or rejection is associated with the AA for the aerial service rather than the network device. Accordingly, the release or rejection may be determined dynamically and intelligently (e.g., if the PDU session is higher priority, the SMF may determine not to release or reject the PDU session).

In accordance with example embodiment of the present disclosure, a wireless device may receive a message requesting a modification of a PDU session from an SMF. The message may comprise a cause parameter indicating, for example, that an AA of the C2 for the UAS is revoked or failed. The message may indicate QoS flows to be deleted from the PDU session. In an example, the indicated QoS flow may be associated with the C2. The example embodiment may decrease an ambiguity of the wireless device by indicating the cause. In the absence of the cause parameter, the wireless device may request a modification of the PDU session to request one or more QoS flows for the C2. Based on the cause parameter, the wireless device may reduce delay and/or signaling overhead by avoiding a futile and/or unnecessary modification request. Based on the cause parameter, the wireless device may request a renewal of credentials for the AA of the C2 to the AA server (e.g., UTM/USS) before requesting the modification.

In accordance with example embodiment of the present disclosure, a mobility management function (MME) may receive a first message requesting an establishment of a packet data network (PDN) connection from a wireless device. The PDN connection may be associated with the aerial service. The MME may send a second message requesting a creation of the PDN connection to a serving gateway (S-GW). The MME may receive a third message indicating a cause parameter that an AA for the aerial service of the wireless device is revoked or failed. The MME may send a fourth message indicating a rejection of the establishment of the PDN connection. The fourth message may comprise the cause. Example embodiment may decrease ambiguity of the wireless device by indicating the cause as the AA for the aerial service of the wireless device being revoked or failed.

In accordance with example embodiment of the present disclosure, an MME may receive a first message requesting a release of a bearer of a wireless device from a service gateway (S-GW). The first message may comprise a cause parameter indicating that an AA for an aerial service for the wireless device is revoked or failed. The MME may determine that the first message may cause a release of a last packet data network (PDN) connection of the wireless device. Based on the determination, the MME may send a second message requesting a detach of the wireless device. The second message may be a detach request message. The second message may comprise the cause parameter indicating that the AA for the aerial service for the wireless device is revoked or failed. Based on the cause parameter, the wireless device may aware that the AA for the aerial service may be required with the UTM or the USS. Example embodiment may decrease ambiguity of the MME by introducing a determination condition of the detach of the wireless device regarding the AA revocation for the aerial service. Example embodiment may decrease signaling overload of the wireless device by indicating the detach cause of the wireless device. Based on the cause parameter that the AA for the aerial service is revoked or failed, the wireless device may not send an attach request to the MME. Based on the cause parameter that the AA for the aerial service is revoked or failed, the wireless device may renew the AA for the aerial service with the UTM/USS.

Figure 21:
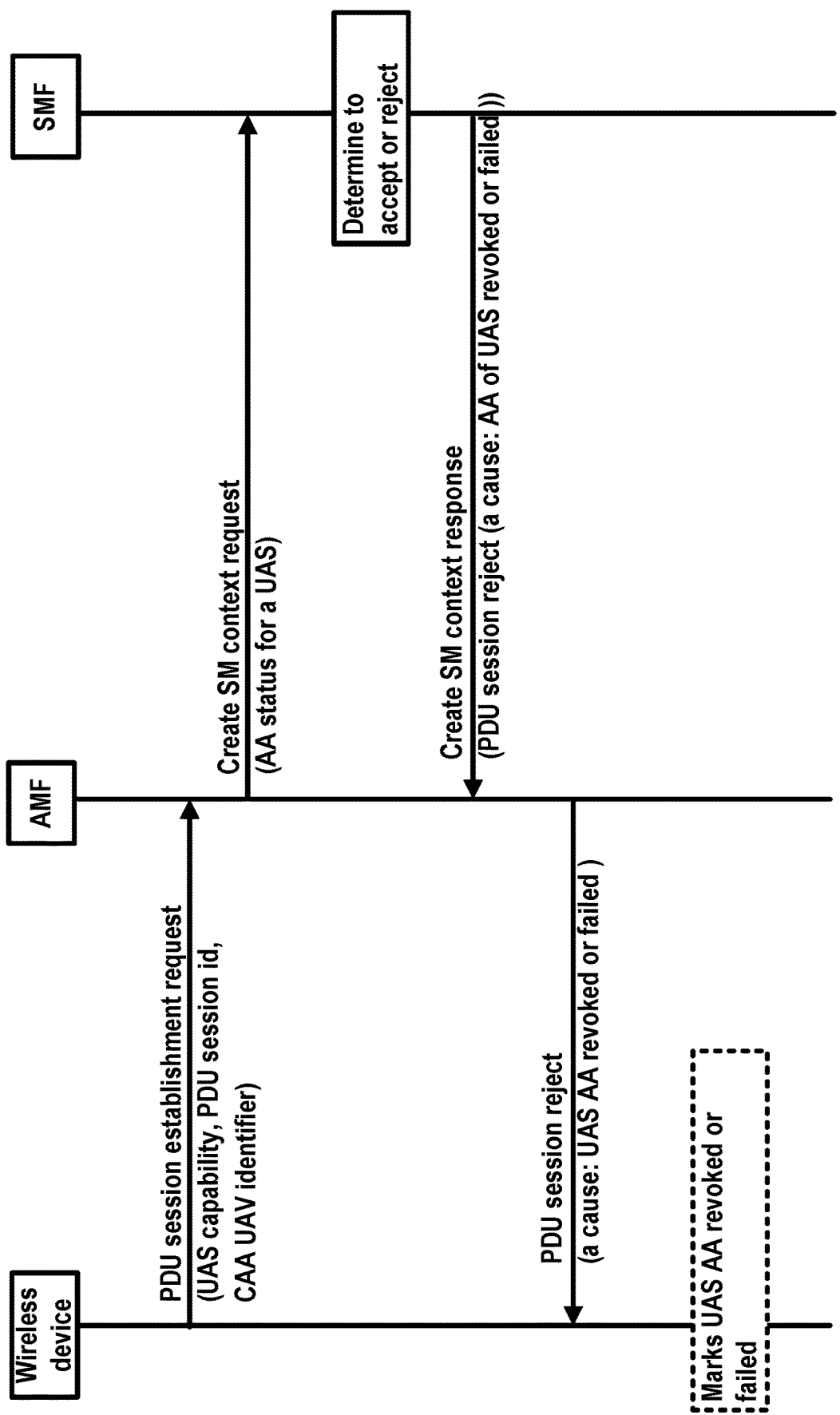
FIG. 21 illustrates an example session handling procedure for 5G network in accordance with embodiments of the present disclosure.
Figure 22:
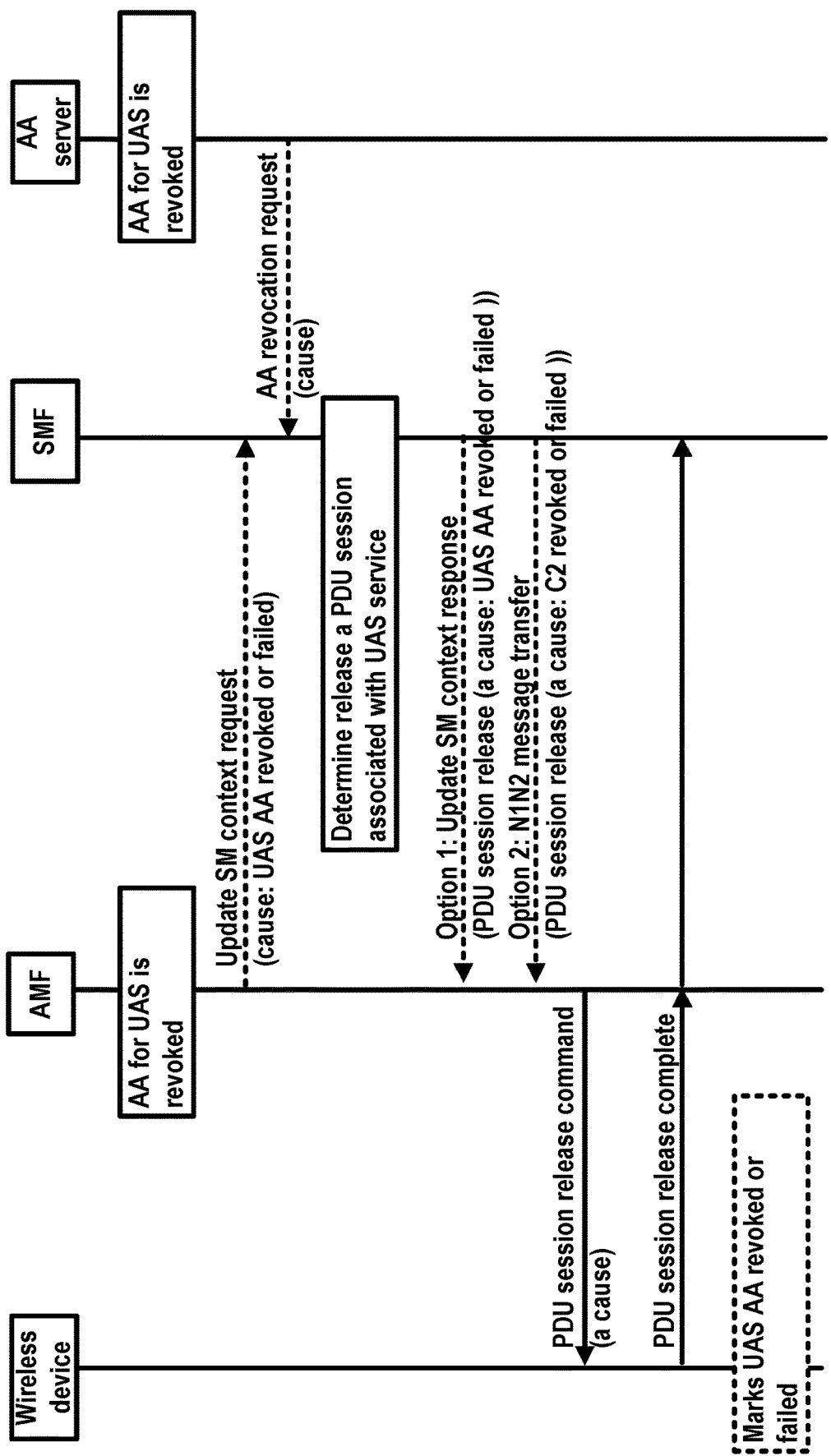
FIG. 22 illustrates an example session handling procedure for 5G network in accordance with embodiments of the present disclosure.

FIG. 21 and FIG. 22 illustrate example session handling procedures for 5G network and a wireless device regarding a revocation/failure of an AA for the aerial service. In an example, the wireless device may register with a 5G network. As illustrated in FIG. 20, the AMF may perform the AA procedure for the aerial service. An SMF may receive a first message indicating that an AA (AA) for an aerial service of a wireless device is revoked or failed from a network device. The first message may be a PDU session create message. The first message may be a PDU session update message. The SMF may determine a rejection one or more PDU sessions establishment. The SMF may determine a release of the one or more PDU sessions of the wireless device. The one or more PDU sessions may be associated with the aerial service. The SMF may send a second message indicating the determination to the wireless device. The second message may comprise a cause parameter indicating that the AA for the aerial service of the wireless device is revoked or failed. The cause parameter may indicate that an AA for a command and control (C2) of the wireless device is revoked or failed. In an example, the wireless device may be a UAV. The wireless device may be a UAV controller.

FIG. 21 illustrates a call flow where an SMF notifies a wireless device of a rejection of an establishment request for one or more PDU sessions based on an AA (AA) status for an aerial service received from a network device. The network device may be an AMF.

The wireless device may send a PDU session establishment request message to the AMF to get aerial services (e.g., communicating with the UTM/USS, C2 session). The PDU session establishment request message may comprise a UAS capability (e.g., a capability of the aerial service, UAS service capability, etc.), a PDU session identity, a UAV identifier, a DNN, S-NSSAI, and/or the like. The DNN and/or the S-NSSAI may be associated with the aerial service. In an example, the DNN may indicate the aerial service or the C2 service. The S-NSSAI may indicate the aerial service or the C2 service.

In response to receiving the PDU session establishment request associated with the aerial service, the AMF may invoke a create session management (SM) context request service with the SMF service by sending a first message (e.g., a create SM context request message, Nsmf_PDUSession_CreateSMContext) to the SMF. The first message may be a create SM context request message. The create SM context request message may comprise an identifier of the wireless device, the DNN, the S-NSSAI, the UAS capability, the PDU session identity, the UAV identifier, SM container comprising the PDU session establishment request message, and/or the like. In an example, the create SM context request message may further comprise an AA (AA) status for the UAS of the wireless device. The AA status for the UAS may indicate whether the wireless device is authenticated and/or authorized for the aerial service. The AA status for the aerial service of the wireless device may comprise a first parameter indicating whether the wireless device is authenticated and/or authorized for the aerial service. The AA status for the aerial service of the wireless device may comprise a second parameter indicating whether the wireless device is authenticated and/or authorized for the C2 for the aerial service.

In an example, the SMF may receive the create SM context request message from the AMF. In an example, the SMF may determine whether to accept or reject the create SM context request based on the AA status for the aerial service. The SMF may determine to accept the create SM context request if the AA status indicates that the wireless device is authenticated and/or authorized for the aerial service. The SMF may determine to reject the create SM context request if the AA status indicates that the wireless device is not authenticated and/or authorized for the aerial service. In an example, the PDU session may be a higher priority PDU session (e.g., emergency PDU session). The SMF may determine to accept the create SM context request if the AA status indicates that the wireless device is not authenticated and/or authorized for the aerial service.

Based on the determination, the SMF may send a create SM context response message to the AMF. The SM context response message may comprise a PDU session accept message. The SMF context response message may comprise a PDU session reject message. The PDU session reject message may comprise a cause parameter indicating the AA for the UAS of the wireless device is revoked or failed. The PDU session reject message may comprise a cause parameter indicating the AA of the C2 for the aerial service is revoked or failed.

In response to receiving the create SM context response message, the AMF may send the PDU session reject message to the wireless device. In response to receiving the PDU session reject message, the wireless device may send an acknowledge message. In response to receiving the cause parameter, the wireless device may update an AA status for the aerial service of the wireless device. The wireless device may not request a PDU session establishment associated with the aerial service. The wireless device may not request a PDU session establishment associated with the aerial service before the AMF indicating the aerial service is (re)authenticated and (re) authorized. This example embodiment may decrease potential PDU session rejections by indicating the AA status for the aerial service to the wireless device.

FIG. 22 illustrates a case that the SMF determines a release of the one or more PDU sessions regarding the revocation or failure of the AA (AA) for the aerial service. In an example, the wireless device may request an establishment of one or more PDU sessions associated with the aerial service. The SMF may accept the establishment one or more PDU sessions associated with the aerial service. Later, the SMF may receive a first message from a network device indicating that the AA for the aerial service of the wireless device is revoked or failed. In response to receiving the first message, the SMF may determine to release the one or more PDU sessions associated with the aerial service. Based on the determination, the SMF may send a second message to the wireless device, to indicate a release of the one or more PDU sessions. The second message may comprise a cause parameter indicating that the AA for the aerial service of the wireless device is revoked or failed. The cause parameter may further indicate that the AA of the C2 for the aerial service of the wireless device is revoked or failed.

In an example, the network device may be an AMF. The first message may be an update session management (SM) context request message (Nsmf_PDUSession_UpdateSM-Context). The update SM context request message may comprise a SM context identity, a user equipment (UE) location information, an indication indicating that the AA for the UAS is revoked or failed. The SM context identity may identify the one or more PDU sessions. The SMF may send an update SM context response message comprising the second message to the AMF. The second message may be a PDU session release command message. The PDU session release command message may comprise one or more PDU session identities, a cause parameter indicating the AA for the aerial service is revoked or failed, and/or the like. In response to receiving the update SM context response message, the AMF may send the PDU session release message to the wireless device. In response to receiving the PDU session release command message, the wireless device may delete information associated with the one or more PDU sessions.

In an example, the network device may be an AA server (e.g., UTM, USS) for the aerial service. The first message may be an AA (AA) revocation request message. The AA revocation request message may comprise an indication indicating that the AA of the aerial service of the wireless device is revoked or failed. The AA revocation request message may further indicate that an AA of a command and control (C2) for the aerial service of the wireless device is revoked or failed. The AA revocation request message may comprise an indication indicating that an AA of a command and control (C2) for the aerial service of the wireless device is revoked or failed. In response to receiving the AA revocation request message, the SMF may determine a release of one or more PDU sessions. Based on the determination, the SMF may invoke message delivery to the AMF by sending a N1N2 message transfer message comprising the second message. In response to receiving the N1N2 message transfer message from the SMF, the AMF may send the second message (e.g., PDU session release command) to the wireless device.

In response to receiving the PDU session release command message, the wireless device may send a PDU session release complete message to the SMF. Based on the cause parameter, the wireless device may update an AA status for the aerial service of the wireless device. The wireless device may not request a PDU session establishment associated with the aerial service. The wireless device may not request a PDU session establishment associated with the aerial service before the AMF indicating the aerial service is (re) authenticated and (re) authorized. This example embodiment may decrease potential PDU session rejections by indicating the AA status for the aerial service to the wireless device.

Figure 23:
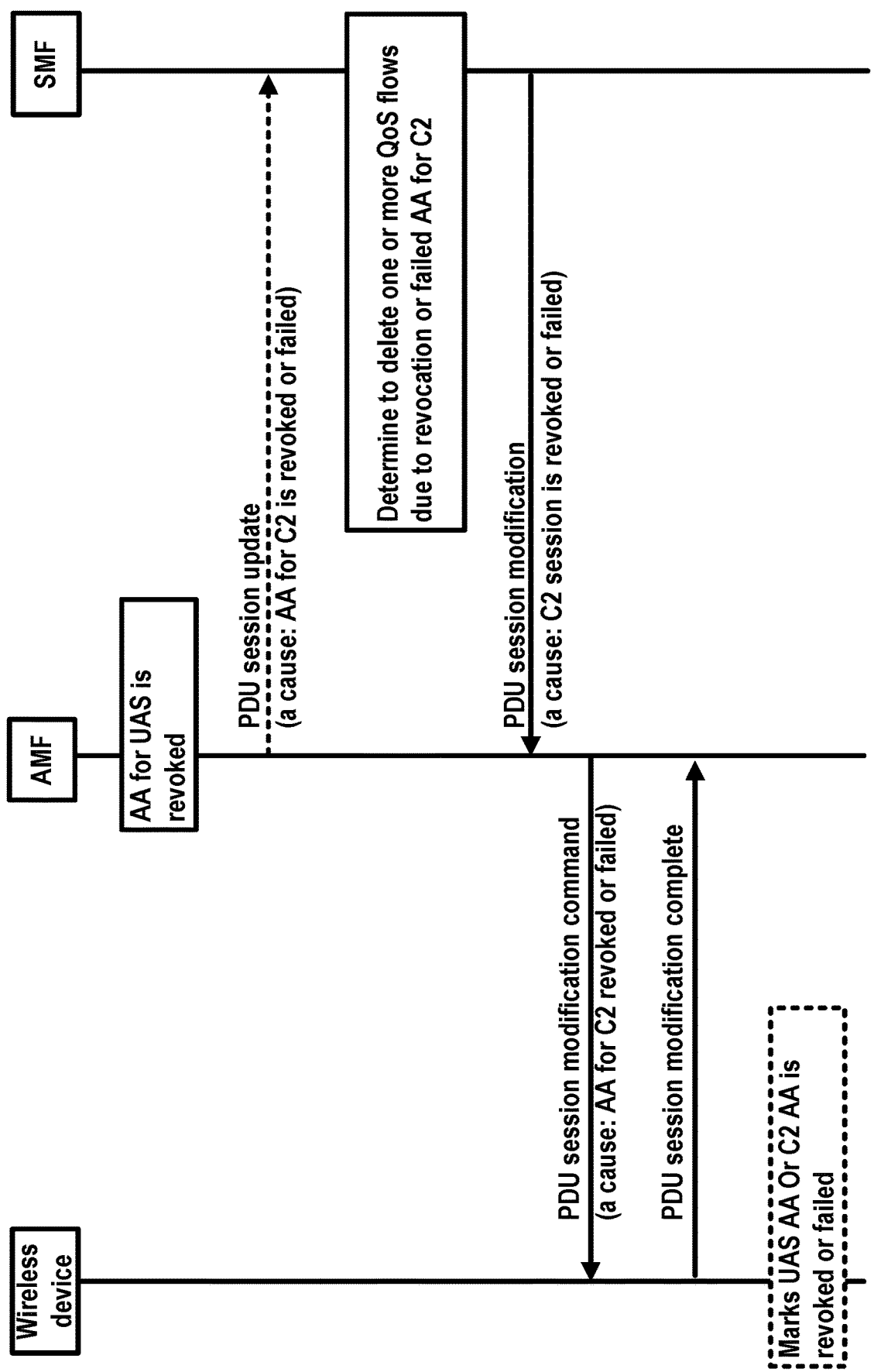
FIG. 23 illustrates an example session modification procedure for a 5G network in accordance with embodiments of the present disclosure.

FIG. 23 illustrates example session modification procedure for a 5G network and a wireless device regarding a revocation/failure of an AA for the aerial service. The wireless device may be a UAV or a UAV controller. An SMF may send a message requesting a modification of a PDU session to a wireless device. The PDU session may be associated with an aerial service. The message may be a PDU session modification command message. The message may comprise a PDU session identity indicating the PDU session, a cause parameter indicating that an AA (AA) of the C2 for the aerial service is revoked or failed, and/or the like. The message may further comprise one or more QoS flows to delete from the PDU session. In an example, the one or more QoS flows may be associated with the C2. The wireless device may receive the message from the SMF. The wireless device may delete the one or more QoS flows based on the message. In response to receiving the message, the wireless device may send a response message (e.g., a PDU session modification complete) to indicate a completion of the modification. Based on the cause parameter, the wireless device may update an AA status of the aerial service that the AA of the C2 is revoked or failed. Based on the cause parameter, the wireless device may not send a PDU session modification request message to get the C2 service.

Based on the cause parameter, the wireless device may not request a modification of the PDU session to request one or more QoS flows for the C2. The example embodiment may decrease signaling exchange by indicating the revocation/failure of the AA of the C2 to the wireless device during the modification procedure.

Figure 24:
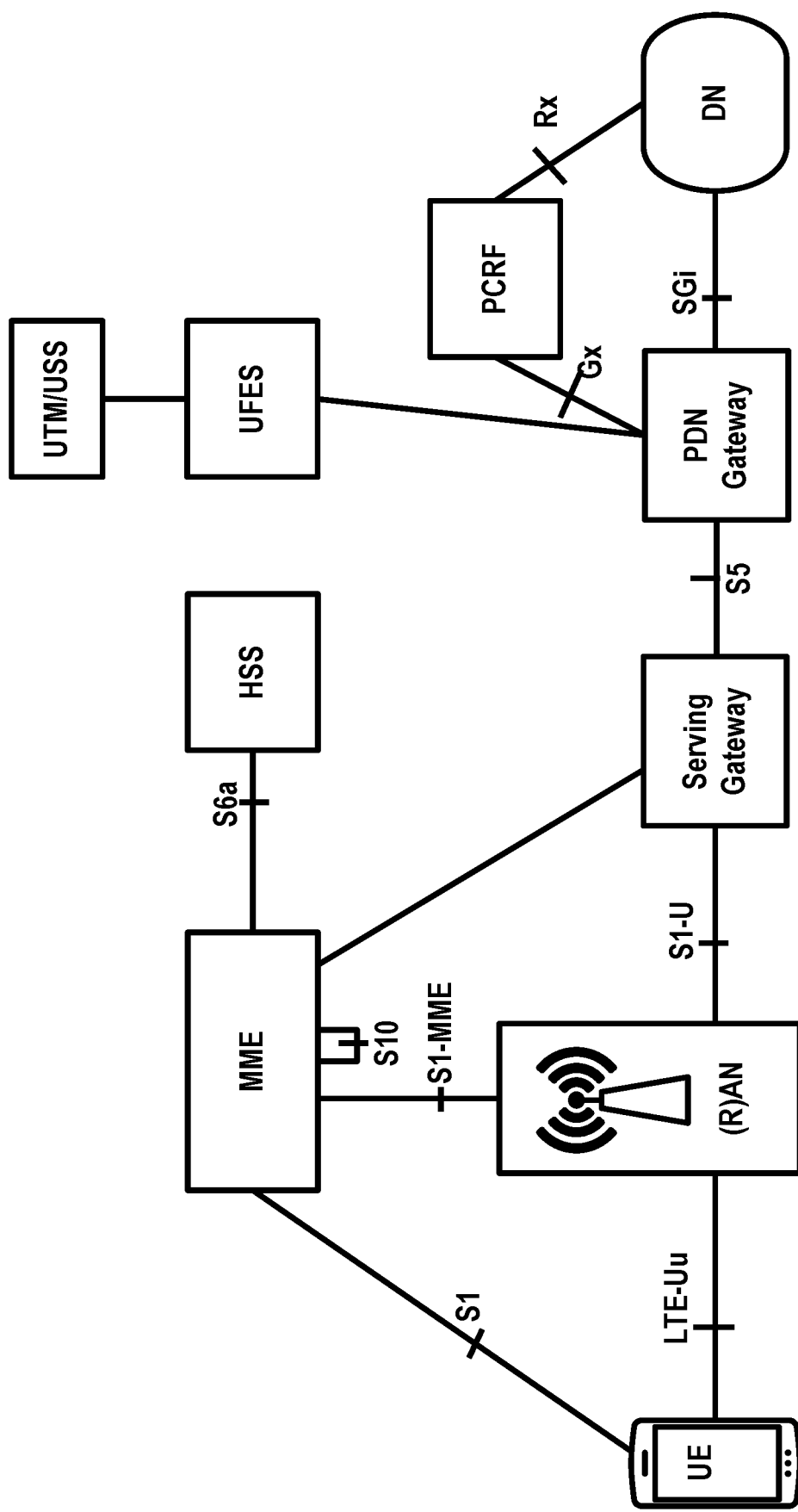
FIG. 24 depicts a 4G system comprising of access networks and 4G core network (e.g., evolved packet system) in accordance with embodiments of the present disclosure.

FIG. 24 depicts a 4G system comprising of access networks and 4G core network (e.g., evolved packet system). An example 4G access network may comprise an access network connecting to a 5G core network. An access network may comprise a RAN. An example 4G core network may connect to one or more 4G access networks. 4G core network may comprise an MME, HSS, gate ways (e.g., S-GW, PDN-GW) and/or the like. The MME may be a node in charge of the functionality of the AMF and SMF of the 5G system. The gate ways may be a node in charge of the functionality of the UPF. The HSS may be a node in charge of the functionality of the UDM. In an example, a wireless device (e.g., UE) may attach to the MME by sending an attach request message to get services from the 4G system. The wireless device may send a PDN connectivity request message to the MME to make sessions with the data network (DN) via the gate ways (e.g., S-GW, PDN-GW).

Figure 25:
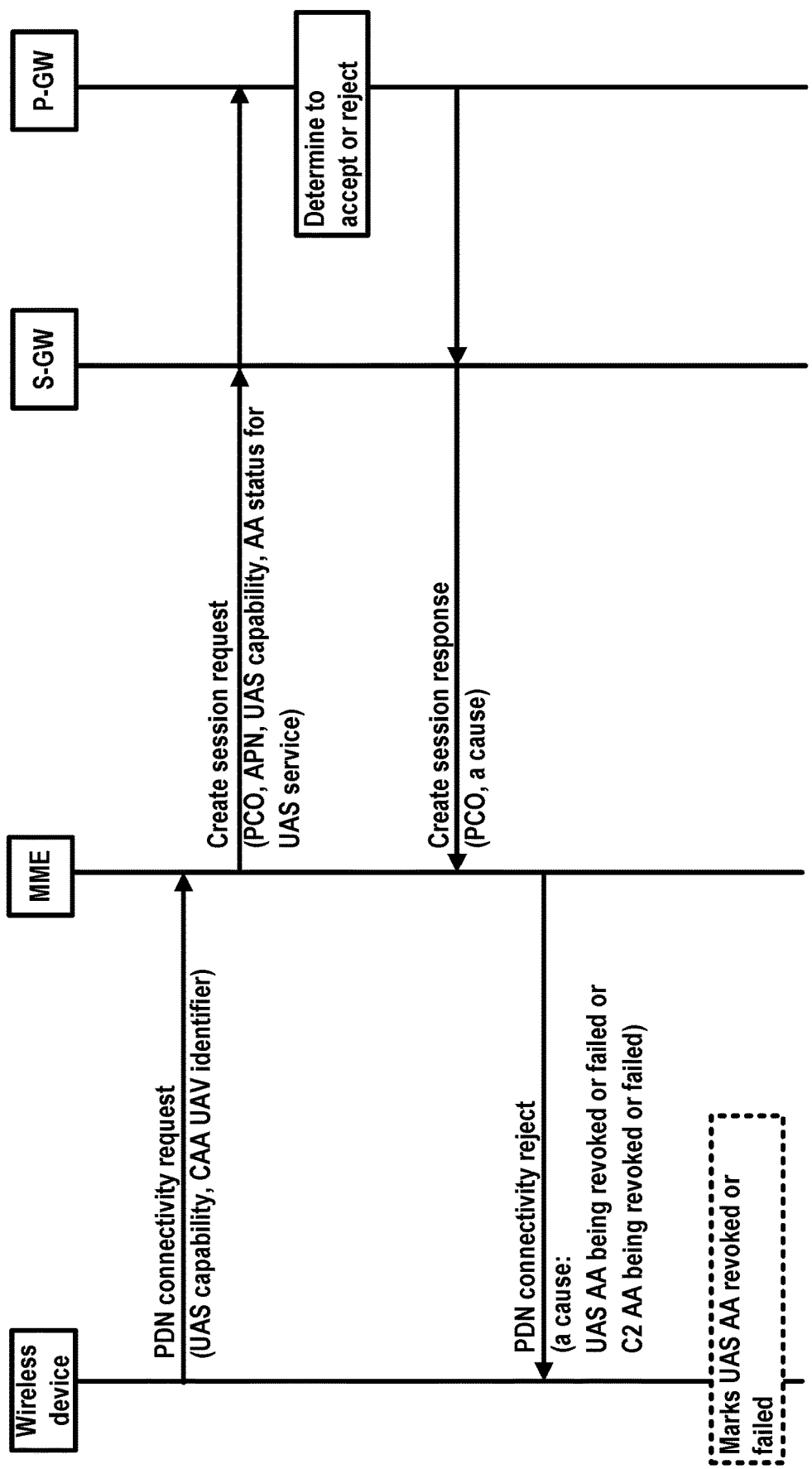
FIG. 25 illustrates an example session handling procedure for 4G network in accordance with embodiments of the present disclosure.

FIG. 25 illustrates an example session handling procedure for 4G network and a wireless device regarding a failure of an AA for the aerial service. In an example, the wireless device may perform an attach procedure by sending an attach request message to the MME. The MME may send an attach accept message to the wireless device in response to receiving the attach request message.

The wireless device may be a UAV. The wireless device may be a UAV controller. The wireless device may send a first message requesting an establishment of a packet data network (PDN) connection associated with an aerial service. The first message may be a PDN connectivity request message to get aerial services (e.g., communicating with the UTM/USS, C2 session/C2 service). The first message may comprise a UAS capability, a UAV identifier, and/or the like. The MME may receive the first message. In response to receiving the first message, the MME may send a second message requesting a creation of the PDN connection to a PDN gateway (P-GW) via a serving gateway (S-GW). The second message may be a create session request message. The second message may comprise protocol configuration option (PCO), an APN, the UAS capability, an AA status for the aerial service. In an example, protocol configuration options (PCO) may comprise information for the AA for the aerial service. The APN may be associated with the aerial service. In an example, the P-GW may perform the AA for the aerial service by sending an AA request message to the AA server (e.g., UTM/USS). The AA request message may comprise the UAV identifier, the PCO, and/or the like. The P-GW may receive an AA response message for the AA request. The AA response message may comprise a result for the AA request. The P-GW may determine whether to accept or reject the creation of the PDN connection. The determination may be based on the result. In an example, if the result indicates that the AA for the aerial service is failed, the P-GW may determine to reject the creation of the PDN connection. Based on the determination, the P-GW may send a third message to the MME via the S-GW. The third message may be a create session response message. The third message may comprise the PCO, the result that the AA for the UAS is failed, and/or the like. In response receiving the third message, the MME may send a fourth message indicating a rejection for the creation of the PDN connection. The fourth message may be based on the third message. The fourth message may be a PDN connectivity reject message. The fourth message may comprise a cause parameter indicating that the AA for the aerial service is failed.

In an example implementation, the first message may be a PDN connection for a C2 service (e.g., C2 session). The first message may comprise second PCO comprising an AA information for the C2 service. The APN of the first message may be associated with the C2 service. The P-GW may perform an AA (AA) for the C2 service by sending an AA request message to the AA server. The AA request message may comprise the UAV identifier, the second PCO, an UAV identifier of a paring UAV device, and/or the like. In an example, the wireless device may be a UAV. If the wireless device is a UAV, the UAV identifier of the paring UAV device may be a UAV identifier of a UAV controller of the wireless device. In an example, the wireless device may be a UAV controller. If the wireless device is a UAV controller, the UAV identifier of the paring UAV device may be a UAV identifier of a UAV of the wireless device. The P-GW may receive an AA response message for the AA request message. The AA response message may comprise a result for the AA request. The P-GW may determine whether to accept or reject the creation of the PDN connection. The determination may be based on the result. In an example, if the result indicates that the AA for the C2 is failed, the P-GW may determine to reject the creation of the PDN connection associated with the C2 service. Based on the determination, the P-GW may send a third message to the MME via the S-GW. The third message may be a create session response message. The third message may comprise the PCO, the result indicating that the AA for the C2 is failed, and/or the like. In response receiving the third message, the MME may send a fourth message indicating a rejection for the creation of the PDN connection. The fourth message may be based on the third message. The fourth message may be a PDN connectivity reject message. The fourth message may comprise a cause parameter. The cause parameter may be based on the result. The cause parameter may indicate that the AA for the C2 is failed.

In an example implementation, a PDN connection associated with the aerial service may be a default PDN connection of the wireless device. If the PDN connection associated with the aerial service is a default PDN connection, the procedure depicted in FIG. 25 may be performed as part of the attach procedure. The attach request message may comprise the first message (e.g., PDN connectivity request). The AA for the aerial service may be failed. If the AA for the UAS is failed, the P-GW may reject the creation of the PDN connection. In response receiving the third message indicating that the creation of the PDN connection is rejected, the MME may send an attach reject message to the wireless device. The attach reject message may comprise the PDN connectivity reject message, a cause value, and/or the like. The cause value may indicate the AA for the aerial service is failed.

Figure 26:
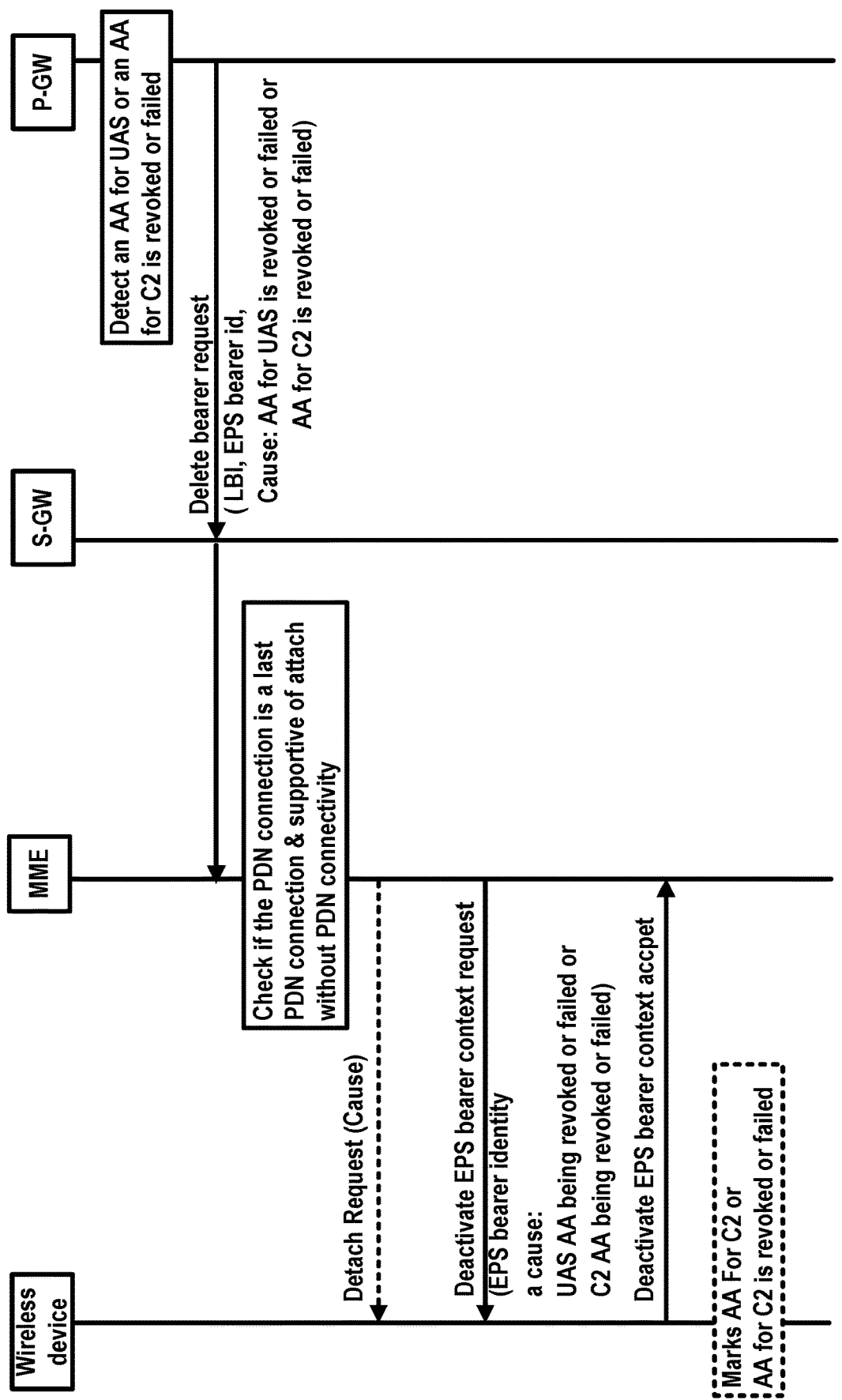
FIG. 26 illustrates an example session handling procedure for 4G network in accordance with embodiments of the present disclosure.

FIG. 26 illustrates an example session handling procedure for 4G network and a wireless device regarding a revocation of the AA for the aerial service and C2 service. The wireless device may have one or more PDN connections associated with the aerial service or C2 service. In an example, a P-GW may detect an AA for the aerial service or an AA for the C2 service is revoked or failed. In response to the detection, the P-GW may trigger a bearer deactivation procedure by sending a first message to an MME via a S-GW. The first message may be a delete bearer request message. The first message may comprise a cause parameter indicating that the AA for the aerial service or the AA for the C2 service is revoked or failed. In response to receiving the first message, the MME may determine that the first message cause a release of a last PDN connection of the wireless device. If the first message causes the release of the last PDN connection, the MME may send to the wireless device, a second message requesting a detach of the wireless device. The second message may be a detach request message. The second message may comprise the cause parameter indicating that the AA for the aerial service is revoked or failed. The second message may comprise the cause parameter indicating that the AA for the C2 service is revoked or failed. In an example, the wireless device or the MME may not support an attach without PDN connectivity. The first message may comprise a linked evolved packet system (EPS) bearer identifier (LBI), one or more EPS bearer identities, the cause parameter, and/or the like. In an example, the cause parameter may further comprise radio access technology (RAT) change from third generation partnership project (3GPP) to non-3GPP. In an example, the wireless device may receive the detach request message indicating that an AA of an aerial service is revoked or failed. The wireless device may send a second attach request message requesting re-authentication and re-authorization for the aerial service. Sending the second attach request message may be based on the indication (e.g., the AA of the aerial service is revoked or failed).

In an example implementation, the MME may determine that the first message may not cause the release of the last PDN connection of the wireless device. Based on the determination, the MME may send a third message requesting a deactivation of the bearer. The third message may comprise the cause parameter. The third message may be a deactivate EPS bearer context request message.

In an example implementation, the MME and the wireless device may support an attach without PDN connectivity. Based on the determination, the MME may send a fourth message requesting a deactivation of the bearer. The fourth message may comprise the cause parameter. The fourth message may be a deactivate EPS bearer context request message. The wireless device may send a deactivate PES bearer context accept message to the MME in response to receiving the fourth message.

In an example, a session management function (SMF) may receive from a network device, a first message indicating that an AA (AA) for an aerial service of a wireless device is revoked or failed. The SMF may determine to release one or more packet data unit (PDU) sessions. The SMF may determine to reject an establishment of the one or more PDU sessions. The determination may be based on the first message. The SMF may send to the wireless device, a second message indicating the determination. The second message may comprise a cause parameter indicating that the AA for the aerial service of the wireless device is revoked or failed.

In accordance with example embodiments, the one or more PDU sessions may be associated with the aerial service.

In accordance with example embodiments, the network device may be an access and mobility management function (AMF). The first message may be a PDU session create message. The first message may comprise a subscriber permanent identifier (SUPI) or a permanent equipment identifier (PEI), a data network name (DNN), an identifier of the AMF, a PDU session identity, a session management container, an indication indicating the AA for the UAS is revoked or failed, and/or the like. The session management container may comprise a PDU session establishment request message.

In accordance with example embodiments, the network device may be an access and mobility management function (AMF). The first message may be a PDU session update message. The first message may comprise a session management (SM) context identity, user equipment (UE) location information, an indication indicating the AA for the UAS is revoked or failed. and/or the like.

In accordance with example embodiments, the SMF may receive from the wireless device, a first non-access stratum (NAS) message requesting an establishment a PDU session for an aerial service. The SMF may send to the wireless device, a second NAS message accepting the establishment of the PDU session for the aerial service. The first NAS message may comprise a civil aviation authority (CAA) unmanned aerial vehicle (UAV) identifier, a PDU session identity, a subscriber permanent identifier (SUPI) or a permanent equipment identifier (PEI), a data network name (DNN), single network slice selection assistance information, and/or the like.

In accordance with example embodiments, the network device may an AA server of the aerial service. The network device may be a UAS traffic management (UTM) server. The network device may be an aerial service supplier (USS) server. The first message may be an AA revocation request message. The AA revocation request message may comprise an indication indicating the AA of aerial service of the wireless device is revoked or failed. The indication may further indicate that an AA for a command and control (C2) of the wireless device is revoked or failed.

In accordance with example embodiments, the wireless device may be an unmanned aerial vehicle (UAV). The wireless device may be an unmanned aerial vehicle (UAV) controller.

In an example, a wireless device may receive from a session management function (SMF), a message requesting a termination of a packet data unit (PDU) session. The message may comprise a cause parameter. The cause parameter may indicate that an AA (AA) for an aerial service of the wireless device is revoked or failed. The cause parameter may indicate that the AA for a command and control (C2) of the wireless device is revoked or failed. The wireless device may send, based on the message, an acknowledge message indicating a completion of the termination.

In accordance with example embodiments, the termination may be a release of an established PDU session. The message is a PDU session release command message.

In accordance with example embodiments, the wireless device may send to the SMF, a first non-access stratum (NAS) message requesting an establishment a PDU session for an aerial service. The wireless device may receive from the SMF, a second NAS message accepting the establishment of the PDU session for the aerial service.

In accordance with example embodiments, the termination may be a rejection of an establishment of the PDU session.

In accordance with example embodiments, the message may be a PDU session reject message.

In accordance with example embodiments, the wireless device may update, and based on the cause parameter, an AA status of the UAS. The AA status of the UAS may comprise at least one of: a first parameter indicating whether the wireless device is authenticated and/or authorized for the aerial service; a second parameter indicating whether the wireless device is authenticated and/or authorized for the C2 for the aerial service.

In an example, a wireless device may receive from a session management function (SMF), a message requesting a release of a first packet data unit (PDU) session. The message may comprise a cause parameter indicating that an AA (AA) for an aerial service is revoked, or that the AA for a command and control (C2) for the aerial service is revoked. Based on the message, the wireless device may send an acknowledge message indicating a completion of the release.

In accordance with example embodiments, the wireless device may determine, not to request an establishment a PDU session associated with the aerial service, in response to the cause parameter indicating that the AA for the aerial service is revoked. The wireless device may determine, not to request an establishment a PDU session associated with the aerial service, in response to the cause parameter indicating that the AA for the C2 for the aerial service is revoked.

In an example, a wireless device may send to an access and access and mobility management function (AMF), a registration request message comprising an aerial service capability. The wireless device may receive from the AMF, a registration reject message indicating an AA (AA) for the aerial service being revoked or failed. The AA for the aerial service further may comprise that an AA (AA) for an aerial service is revoked; or that the AA for a command and control (C2) for the aerial service is revoked.

In an example, a wireless device may receive from a session management function (SMF), a message requesting a modification of a packet data unit (PDU) session. The message may comprise a cause parameter indicating that an AA (AA) for a command and control (C2) of the wireless device is revoked or failed. The wireless device may send based on the message, an acknowledge message indicating a completion of the termination.

In accordance with example embodiments, the cause parameter may further indicate that an AA (AA) for an aerial service is revoked.

In an example, a mobility management entity (MME) may receive from a wireless device, a first message requesting an establishment of a packet data network (PDN) connection associated with an aerial service. The MME may send to a serving gateway (S-GW), a second message requesting a creation of the PDN connection. The MME may receive from the S-GW, a third message indicating a cause parameter that an AA for the aerial service of the wireless device is revoked or failed. The MME may send to the wireless device, a fourth message indicating a rejection of the establishment of the PDN connection. The fourth message may comprise the cause.

In an example, a wireless device may send to a mobility management entity (MME), a first message requesting an establishment of a packet data network (PDN) connection associated with an aerial service. The wireless device may receive from the MME, a second message indicating a rejection of the requesting the establishment. The second message may comprise a cause parameter indicating that an AA for the aerial service of the wireless device is revoked or failed. The first message may be a PDN connectivity request message. The PDN connectivity request message may comprise a capability indication for the aerial service, a civil aviation authority (CAA) unmanned aerial vehicle (UAV) identifier, a packet data name (APN) associated with the aerial service, and/or the like. In an example, an attach request message may comprise the PDN connectivity request message. The second message may be a PDN connectivity reject message. The PDN connectivity reject message may comprise a second cause parameter comprising, a user authentication is failed, an AA for the UAS is failed or revoked, an AA for a command and control (C2) if failed or revoked.

In an example, the second message may be a detach request message. The PDN connection may be a last PDN connection of the wireless device.

In an example, a mobility management entity (MME) may receive from a serving gateway (S-GW), a first message requesting a release of a bearer of a wireless device. The first message may comprise a cause parameter indicating that an AA (AA) for an aerial service of the wireless device is revoked or failed. The MME may determine that the first message causes a release of a last packet data network (PDN) connection of the wireless device. Based on the determination, the MME may send to the wireless device, a second message requesting a detach of the wireless device, the second message comprising the cause parameter. The wireless device of the MME may not support an attach without PDN connectivity. The first message may be a delete bearer request message. The delete bearer request message may comprise a linked evolved packet system (EPS) bearer identifier (LBI), one or more EPS bearer identities, the cause parameter, and/or the like. The cause parameter may comprise an indication indicating that an AA for the aerial service is revoked or failed, an indication indicating that an AA for a command and control (C2) is revoked or failed, or an indication indicating radio access technology (RAT) change from third generation partnership project (3GPP) to non-3GPP.

In an example, the MME may determine, that the first message may not result in the release of the last packet data network (PDN) connection of the wireless device. Based on the determination, the MME may send to the wireless device, a third message requesting a deactivation of the bearer, the third message comprising the cause parameter.

In an example, the MME may determine, that the wireless device and the MME support an attach without PDN connectivity. Based pm the determination, the MME may send to the wireless device, a fourth message requesting a deactivation of the bearer, the fourth message comprising the cause parameter.

In an example, a wireless device may receive from a mobility management entity (MME), a detach request message comprising a cause value indicating an AA of an aerial service for the wireless device is revoked or failed. Based on the cause value, the wireless device may send to the MME, an attach request message requesting a re-authentication and re-authorization for the aerial service. The wireless device may send to the MME, a detach request accept message, wherein the detach request accept message is in response to the receiving.

This disclosure may refer to possible combinations of enumerated elements. For the sake of brevity and legibility, the present disclosure does not explicitly recite each and every permutation that may be obtained by choosing from a set of optional features. The present disclosure is to be interpreted as explicitly disclosing all such permutations. For example, the seven possible combinations of enumerated elements A, B, C consist of: (1) "A"; (2) "B"; (3) "C"; (4) "A and B"; (5) "A and C"; (6) "B and C"; and (7) "A, B, and C". For the sake of brevity and legibility, these seven possible combinations may be described using any of the following interchangeable formulations: "at least one of A, B, and C"; "at least one of A, B, or C"; "one or more of A, B, and C"; "one or more of A, B, or C"; "A, B, and/or C". It will be understood that impossible combinations are excluded. For example, "X and/or not-X" should be interpreted as "X or not-X". It will be further understood that these formulations may describe alternative phrasings of overlapping and/or synonymous concepts, for example, "identifier, identification, and/or ID number".

In this specification, a and an and similar phrases are to be interpreted as at least one and one or more. In this specification, the term "may" is to be interpreted as "may, for example". In other words, the term "may" is indicative that the phrase following the term may is an example of one of a multitude of suitable possibilities that may, or may not, be employed to one or more of the various embodiments. If A and B are sets and every element of A is also an element of B, A is called a subset of B. In this specification, only non-empty sets and subsets are considered. For example, possible subsets of B={cell1, cell2} are: {cell1}, {cell2}, and {cell1, cell2}. In this specification, parameters (Information elements: IEs) may comprise one or more objects, and each of those objects may comprise one or more other objects. For example, if parameter (IE) N comprises parameter (IE) M, and parameter (IE) M comprises parameter (IE) K, and parameter (IE) K comprises parameter (information element) J, then, for example, N comprises K, and N comprises J. In an example embodiment, when one or more messages comprise a plurality of parameters, it implies that a parameter in the plurality of parameters is in at least one of the one or more messages but does not have to be in each of the one or more messages. Many of the elements described in the disclosed embodiments may be implemented as modules. A module is defined here as an isolatable element that performs a defined function and has a defined interface to other elements. The modules described in this disclosure may be implemented in hardware, software in combination with hardware, firmware, wetware (i.e. hardware with a biological element) or a combination thereof, which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above mentioned technologies are often employed in combination to achieve the result of a functional module. Example embodiments of the invention may be implemented using various physical and/or virtual network elements, software defined networking, virtual network functions. The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever. While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above described exemplary embodiments. In particular, it should be noted that, for example purposes, the above explanation has focused on the example(s) using 5G AN. However, one skilled in the art will recognize that embodiments of the invention may also be implemented in a system comprising one or more legacy systems or LTE. The disclosed methods and systems may be implemented in wireless or wireline systems. The features of various embodiments presented in this invention may be combined. One or many features (method or system) of one embodiment may be implemented in other embodiments. A limited number of example combinations are shown to indicate to one skilled in the art the possibility of features that may be combined in various embodiments to create enhanced transmission and reception systems and methods. In addition, it should be understood that any figures which highlight the functionality and advantages, are presented for example purposes. The disclosed architecture is sufficiently flexible and configurable, such that it may be utilized in ways other than that shown. For example, the actions listed in any flowchart may be re-ordered or optionally used in some embodiments. Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way. Finally, it is the applicant's intent that only claims that include the express language means for or step for be interpreted under 35 U.S.C. 112. Claims that do not expressly include the phrase means for or step for are not to be interpreted under 35 U.S.C. 112.

What is claimed is:

1. A method comprising:
receiving, by an access and mobility management function (AMF), from a wireless device, a registration request message for the wireless device;
performing, by the AMF, an authentication and/or authorization procedure for an aerial service of the wireless device;
receiving, by the AMF from the wireless device, a protocol data unit (PDU) session establishment request to establish a PDU session associated with the aerial service; and
sending, by the AMF to a session management function (SMF), based on receiving the PDU session establishment request from the wireless device, a create session management context message comprising an indication of whether the aerial service of the wireless device has been authenticated and/or authorized by an uncrewed aerial system service supplier (USS).

2. The method of claim 1, further comprising receiving, by the AMF from the SMF, an indication of whether to accept the PDU session establishment request.

3. The method of claim 1, further comprising sending, to the wireless device, a protocol data unit session establishment reject message indicating rejection of the PDU session establishment request and comprising a cause value associated with the rejection.

4. The method of claim 1, wherein the create session management context message indicating whether the aerial service of the wireless device is authenticated and/or authorized by the USS is a create session management context request message.

5. The method of claim 1, wherein the registration request message for the wireless device comprises an aerial vehicle identifier of the wireless device.

6. The method of claim 1, wherein the PDU session is for communicating with a service supplier of the aerial service.

7. The method of claim 1, wherein the PDU session is for command and control (C2) communication of the aerial service.

8. The method of claim 1, wherein performing the authentication and/or authorization procedure comprises sending, by the AMF to the USS, an authentication and/or authorization request.

9. The method of claim 8, wherein the authentication and/or authorization request comprises an aerial vehicle identifier of the wireless device.

10. The method of claim 8, wherein the authentication and/or authorization request comprises a generic public subscription identifier (GPSI) of the wireless device.

11. An access and mobility management function (AMF) comprising one or more processors and memory storing instructions that, when executed by the one or more processors, cause the AMF to:
receive, from a wireless device, a registration request message for the wireless device;
perform an authentication and/or authorization procedure for an aerial service of the wireless device;
receive, from the wireless device, a protocol data unit (PDU) session establishment request to establish a PDU session associated with the aerial service; and
send, to a session management function (SMF), based on receiving the PDU session establishment request from the wireless device, a create session management context message comprising an indication of whether the aerial service of the wireless device has been authenticated and/or authorized by an uncrewed aerial system service supplier (USS).

12. The AMF of claim 11, further comprising receiving, by the AMF from the SMF, an indication of whether to accept the PDU session establishment request.

13. The AMF of claim 11, further comprising sending, to the wireless device, a protocol data unit session establishment reject message indicating rejection of the PDU session establishment request and comprising a cause value associated with the rejection.

14. The AMF of claim 11, wherein the create session management context message indicating whether the aerial service of the wireless device is authenticated and/or authorized by the USS is a create session management context request message.

15. The AMF of claim 11, wherein the registration request message for the wireless device comprises an aerial vehicle identifier of the wireless device.

16. The AMF of claim 11, wherein the PDU session is for communicating with a service supplier of the aerial service.

17. The AMF of claim 11, wherein the PDU session is for command and control (C2) communication of the aerial service.

18. The AMF of claim 11, wherein performing the authentication and/or authorization procedure comprises sending, by the AMF to the USS, an authentication and/or authorization request.

19. The AMF of claim 18, wherein the authentication and/or authorization request comprises an aerial vehicle identifier of the wireless device.

20. The AMF of claim 18, wherein the authentication and/or authorization request comprises a generic public subscription identifier (GPSI) of the wireless device.

21. A system comprising:
an access and mobility management function (AMF) comprising: one or more first processors and first memory storing instructions that, when executed by the one or more first processors, cause the AMF to:
receive, from a wireless device, a registration request message for the wireless device;
determine an authentication and/or authorization of an aerial service of the wireless device;
receive, from the wireless device, a protocol data unit (PDU) session establishment request to establish a PDU session associated with the aerial service; and
send, to a session management function (SMF), based on receiving the PDU session establishment request from the wireless device, a create session management context message indicating whether the aerial service of the wireless device has been authenticated and/or authorized by an uncrewed aerial system service supplier (USS); and
the SMF, wherein the SMF comprises: one or more second processors and second memory storing instructions that, when executed by the one or more second processors, cause the SMF to:
receive, from the AMF, the create session management context message comprising the indication of whether the aerial service of the wireless device has been authenticated and/or authorized by the USS; and
determine, based on the whether the aerial service of the wireless device has been authenticated and/or authorized, to accept or reject a session management context request of the wireless device.

* * * * *